(12) United States Patent
Socek et al.

(10) Patent No.: US 10,552,962 B2
(45) Date of Patent: Feb. 4, 2020

(54) FAST MOTION BASED AND COLOR ASSISTED SEGMENTATION OF VIDEO INTO REGION LAYERS

(71) Applicant: Intel Corporation, Santa Clara, CA (US)

(72) Inventors: Daniel Socek, Miami, FL (US); Atul Puri, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 15/499,782

(22) Filed: Apr. 27, 2017

(65) Prior Publication Data

US 2018/0315199 A1 Nov. 1, 2018

(51) Int. Cl.
*G06T 7/215* (2017.01)
*G06T 7/11* (2017.01)

(52) U.S. Cl.
CPC .............. *G06T 7/215* (2017.01); *G06T 7/11* (2017.01); *G06T 2207/10024* (2013.01); *G06T 2207/20016* (2013.01); *G06T 2207/20036* (2013.01); *G06T 2207/20076* (2013.01)

(58) Field of Classification Search
None
See application file for complete search history.

(56) References Cited

U.S. PATENT DOCUMENTS

| | | | | |
|---|---|---|---|---|
| 6,178,265 | B1 * | 1/2001 | Haghighi | H04N 19/51 348/416.1 |
| 2002/0154695 | A1 * | 10/2002 | Cornog | H04N 5/145 375/240.16 |
| 2011/0293180 | A1 | 12/2011 | Criminisi et al. | |
| 2012/0170659 | A1 | 7/2012 | Chaudhury et al. | |
| 2013/0121577 | A1 | 5/2013 | Wang et al. | |
| 2015/0116350 | A1 | 4/2015 | Lin et al. | |
| 2015/0117784 | A1 | 4/2015 | Lin et al. | |

OTHER PUBLICATIONS

Notice of Allowance for U.S. Appl. No. 15/499,776, dated Dec. 13, 2018.
Office Action for U.S. Appl. No. 15/499,776, notified on Jul. 26, 2018.
Bai, X. et al., "Dynamic Color Flow: A Motion Adaptive Model for Object Segmentation in Video", ECCV 2010, European Conference on Computer Vision and Pattern Recognition, pp. 617-630, Sep. 2010, Heraklion, Crete, Greece.
Grundmann, Matthias et al., "Efficient Hierarchical Graph-Based Video Segmentation", CVPR 2010, IEEE Conference on Computer Vision and Pattern Recognition, pp. 2141-2148, Jun. 2010, San Francisco, USA.

(Continued)

*Primary Examiner* — Matthew C Bella
*Assistant Examiner* — Brian D Shin
(74) *Attorney, Agent, or Firm* — Green, Howard & Mughal LLP.

(57) ABSTRACT

Techniques related to improved video frame segmentation based on motion, color, and texture are discussed. Such techniques may include segmenting a video frame of a video sequence based on differencing global motion or dominant motion from local motion in the video frame.

26 Claims, 36 Drawing Sheets

(56) References Cited

OTHER PUBLICATIONS

Guo, Ju et al., "New Video Object Segmentation Technique with Color/Motion Information and Boundary Postprocessing", Applied Intelligence Journal, Mar. 1999.
Lezama, Jose et al., "Track to the Future: Spatio-temporal Video Segmentation with Long-range Motion Cues", CVPR 2011, IEEE Conference on Computer Vision and Pattern Recognition, pp. 3369-3376, Jun. 2011, Colorado Springs, USA.
Papazoglou, A. et al., "Fast Object Segmentation in Unconstrained Video", ICCV 2013, International Conference on Computer Vision, pp. 1777-1784, Dec. 2013, Sydney, Australia.
Zhang, et al., "Video Object Segmentation through Spatially Accurate and Temporally Dense Extraction of Primary Object Regions", CVPR 2013, IEEE Conference on Computer Vision and Pattern Recognition, pp. 628-635, Jun. 2013, Portland, USA.

* cited by examiner (i)

(ii)

(iii)

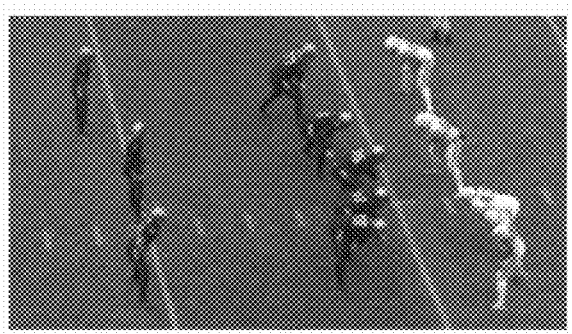 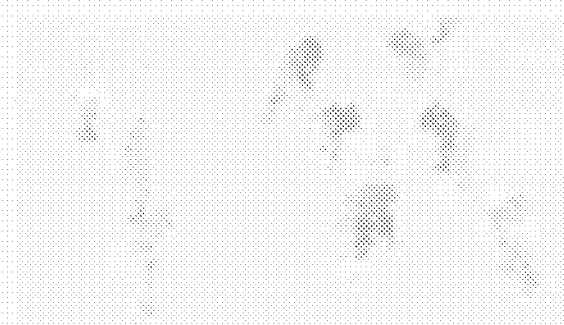
711 (i)     (ii) 712
713 (iii)    FIG. 7B    (iv) 714
 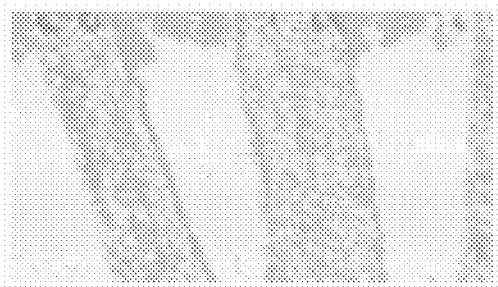
721 (i)     (ii) 722
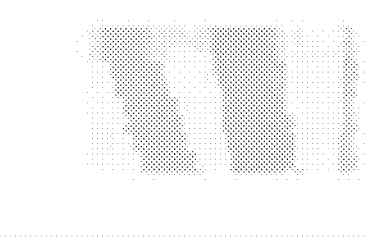 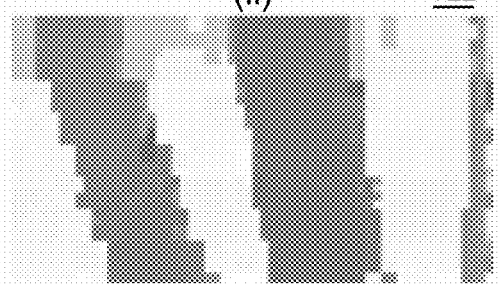
723 (iii)     (iv) 724
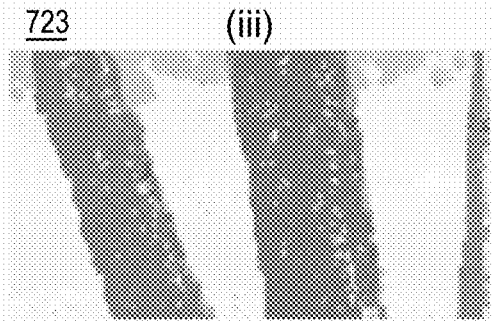
(v)
725    FIG. 7C

1210

1211 1212

(i)         (ii)

1220

1221 1222

(i)         (ii)

(i)

(ii)

(iii)

(iv)

(i)

(ii)

(iii)

(iv)

(i)

(ii)

(iii)

(iv)

(i)

(ii)

(iii)

(iv)

FAST MOTION BASED AND COLOR ASSISTED SEGMENTATION OF VIDEO INTO REGION LAYERS

BACKGROUND

Segmentation of video scenes into meaningful region-layers such that each region-layer represents a grouping of regions or objects that share a number of common spatio-temporal properties has been and remains a difficult task despite considerable effort. The task becomes even more challenging if this segmentation needs to be performed in real-time or even faster, with high reliability, in moderate compute complexity, and with good quality as necessary in a new generation of critical image processing and computer vision applications such as surveillance, autonomous driving, robotics, and real-time video with high quality/compression.

The state of the art in image/video segmentation is not able to provide good quality segmentation consistently on general video scenes in a compute effective manner. If a very large amount of compute resources are not available, to get good quality segmentation such segmentation must still be performed manually or in a semi-automatic manner. This, however, limits its use to non-real time applications where cost and time of manual segmentation can be justified. For real time applications, either a tremendous amount of compute resources have to be provided, alternate mechanisms have to be devised, or poor quality has to be tolerated.

For example, a current technique (please see J. Lezama, K. Alahari, J. Sivic, "Track to the Future: Spatio-temporal Video Segmentation with Long Range Motion Cues," CVPR 2011, IEEE Conference on Computer Vision and Pattern Recognition, pp. 3369-3376, June 2011, Colorado Springs, USA) provides a method for spatio-temporal oversegmentation of video into regions with the goal that the resulting segmented regions respect object boundaries, and at the same time associates object pixels over many video frames in time. For example, in the spatio-temporal domain long range motion cues from past and future frames in terms of "clusters of point-tracks" are associated coherent motion. Furthermore, a clustering solution function that includes reasoning related to occlusion due to use of depth ordering basis, as well as the notion of motion similarity along the tracks. The proposed approach is thus a motion-based graph theoretic approach to video segmentation. Furthermore, the approach uses long range motion cues (including into future), building of long range connections, and tracking. Thus the approach is complex in the amount of compute for high resolution video and uses long range motion and thus requires considerable memory and generates significant delay.

Another approach (please see A. Papazoglou, V. Ferrari, "Fast Object Segmentation in Unconstrained Video," ICCV 2013, International Conference on Computer Vision, pp. 1777-1784, December 2013, Sydney, Australia) is designed for segmentation of each frame into two regions: a foreground region and a background region. The method is fast, automatic, and makes minimal assumptions about content of the video and thus enables handling unconstrained settings including fast moving background, arbitrary object appearance and motion, and further non-rigid deformations of objects. It purports to outperform background subtraction techniques and point-cluster tracking type methods while being faster those approaches. The method does not assume a particular motion model from the objects. It includes a method to determine which pixels are inside an object based on motion boundaries in pairs of subsequent frames such that an initial estimate is refined by integrating information over the whole video and a second stage instantiates an appearance model based on the initial foreground estimate and uses it to refine the spatial accuracy of segmentation and to segment the object in frames where it does not move. While a detailed discussion of the approach is outside the scope of this discussion, the key principles and sample results of the approach are illustrated in FIG. 1.

Yet another approach (please see D. Zhang, O. Javed, M. Shah, "Video Object Segmentation through Spatially Accurate and Temporally Dense Extraction of Primary Object Regions," CVPR 2013, IEEE Conference on Computer Vision and Pattern Recognition, pp. 628-635, June 2013, Portland, USA) for segmentation is object based and first extracts primary object regions and then uses the primary object segments to build object models for optimized segmentation. The approach includes a layered directed acyclic graph (DAG) based framework for detection and segmentation of primary object in video that is based on objects that are spatially cohesive and have locally smooth motion trajectories, which allows it to extract primary object from a set of available proposals based on motion, appearance, and predicted shape across frames. Furthermore, the DAG is initialized with enhanced object proposal set where motion based proposal predictions are used from adjacent frames to expand the set of proposals for a frame. Lastly, the proposal presents a motion scoring function for selecting object proposals that emphasize high optical flow, and proposal boundaries to differentiate moving objects from background. The approach is said to outperform both unsupervised, and supervised state of the art techniques. While a detailed discussion of the approach is again outside the scope of this discussion, the key principles and sample results of the approach are illustrated in FIG. 2. The approach, as it uses a layered DAG, optical flow, dynamic programming and per pixel segmentation is complex with high delay.

Therefore, current techniques have limitations in that they either require high-delay due to operating on a volume of frames, lack flexibility beyond 2 layer segmentation (such as for video conferencing scenes), require a-priori knowledge of parameters needed for segmentation, lack sufficient robustness, are not practical general purpose solutions as they require manual interaction, provide good quality region boundary while offering complexity tradeoffs, are scale complexity depending on how many regions are segmented, or some combination of the aforementioned limitations. Furthermore, none of the techniques discussed provide real-time or faster region segmentation at HD resolution on general purpose resource limited computing devices while achieving acceptable quality.

As such, existing techniques do not provide fast segmentation of video scenes in real time. Such problems may become critical as segmentation of video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 7B illustrates an example of merging motion vector fields;

FIG. 7C illustrates another example of merging motion vector fields;

DETAILED DESCRIPTION

Figure 1:
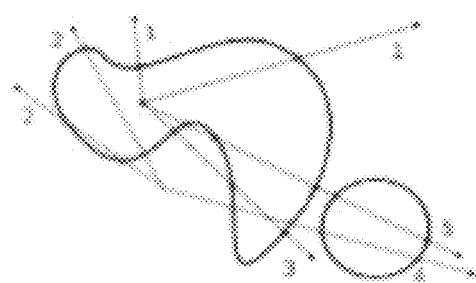
FIG. 1 illustrates a prior art segmentation approach.
Figure 1:
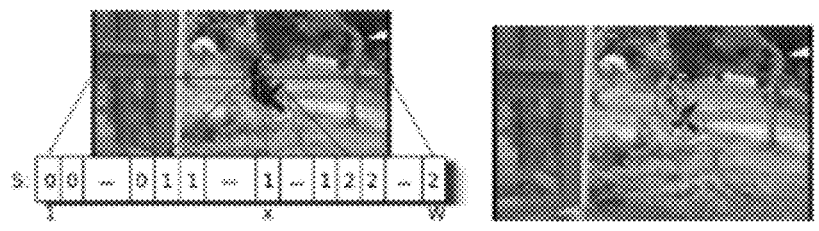
Figure 1:
Figure 1:
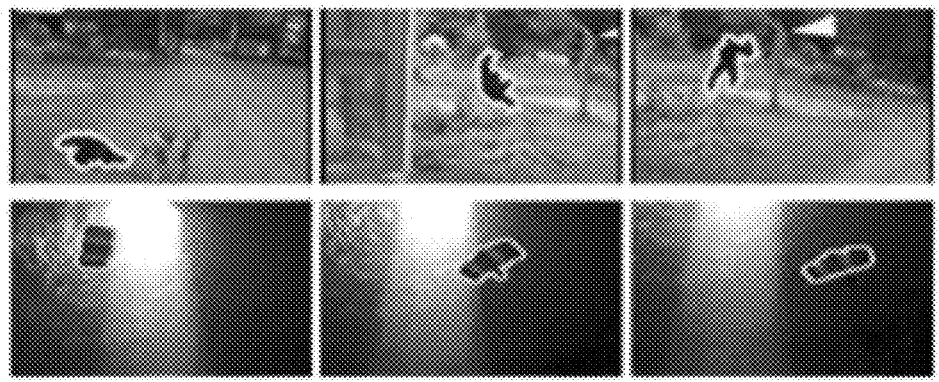
Figure 2:
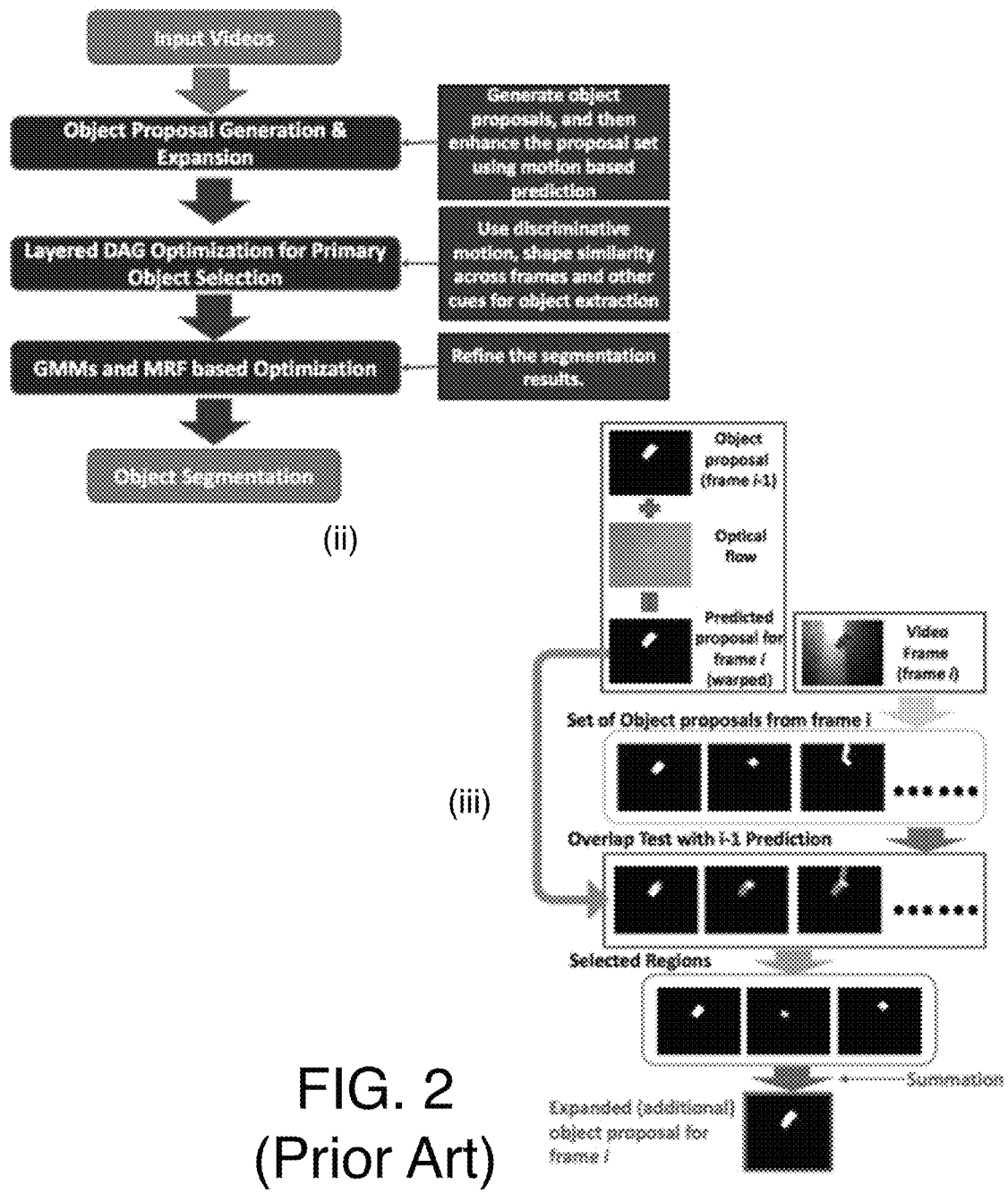
FIG. 2 illustrates another prior art segmentation approach.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to fast motion based segmentation of video scenes. Such techniques may be used in a variety of contexts.

For example, the techniques discussed herein provide fast motion based segmentation of video scenes that have objects moving with global motion. As used herein, the term global motion does not mean that the video scene needs to have a significant region of uniform motion, but instead indicates a scene has a region in which many pixels have very similar (but not necessarily identical) motion. Often, global motion in a scene results from global motion of camera imaging a scene that results in background appearing to have the corresponding global motion, while foreground objects may have their own local motion. For example, a camera imaging a football scene might undergo significant pan to track fast movement of the player (local motion) on the football field (which would appear to have global motion). The discussed techniques are applicable to any scene including indoor video scenes (such as in videoconferencing) where a camera may pan from one speaker to the next speaker. Furthermore, the discussed techniques are not based solely on motion but may also be based partly on color and (to a smaller degree) on texture. As such, the discussed techniques may be referred to as motion based (color assisted) region segmentation.

The techniques discussed herein may address current shortcomings in video scene segmentation as follows: the techniques discussed herein may be used for normal or low delay (e.g., a volume of frames is not needed for operation), are flexible (e.g., may be applied to any video scene and not just videoconferencing scenes), are content adaptive and may adaptively determine best parameters for segmentation, are robust, reliably yielding spatial and temporally consistent region-layers (and regions), are practical (e.g., real time or faster on state of art PC for HD video) (e.g., may not require any pre-segmentation such as interactive selection of regions or background), are of good quality (e.g., providing 4 pixel accuracy region boundaries and complexity tradeoff), and/or are scalable (e.g., if the number of region-layers are increased, there is moderate complexity increase).

Discussion now turns to the basic principles of the techniques discussed herein. For example, the discussed techniques may be based on the principle of fragmentation of each frame of video into some number of (e.g., 2 to 6) region-layers depending on some common properties of the content of the scene. The segmented region-layers may be temporally consistent from frame-to-frame allowing the capability of tracking changes due to motion in regions of region-layers, over time. As used herein, a region-layer is an image plane comprising (e.g., a subset of pixels of a frame) that represent a number of related regions within the frame. Thus an input frame of video say for instance may be segmented into several non-overlapping region-layers such that the segmented region-layers when correctly depth ordered and merged yield reconstruction of the input frame. For example, the primary basis for initial segmentation of a frame into two regions is based on global motion in the scene. Both the global motion region and the non-global-motion region from initial segmentation may optionally undergo examination for further segmentation. The global-motion region segmentation may use either one or multiple color based region splitting. The non-global-motion region segmentation may use color, or motion based region splitting, or multiple color and/or motion based region splitting.

The discussed techniques are applicable to segmentation of general video scenes that have regions with one of three possible types of motion such as global motion, local motion, and dominant (local) motion, with or without presence of a distribution of dominant color pixels. Since a region-layer may include one or more regions, to reduce any confusion resulting from introduction of the term region-layer to represent a grouping of regions, the term region is used. From the context, the use of such terms will be clear as to when reference is made to a region-layer or an individual region.

Figure 3A:
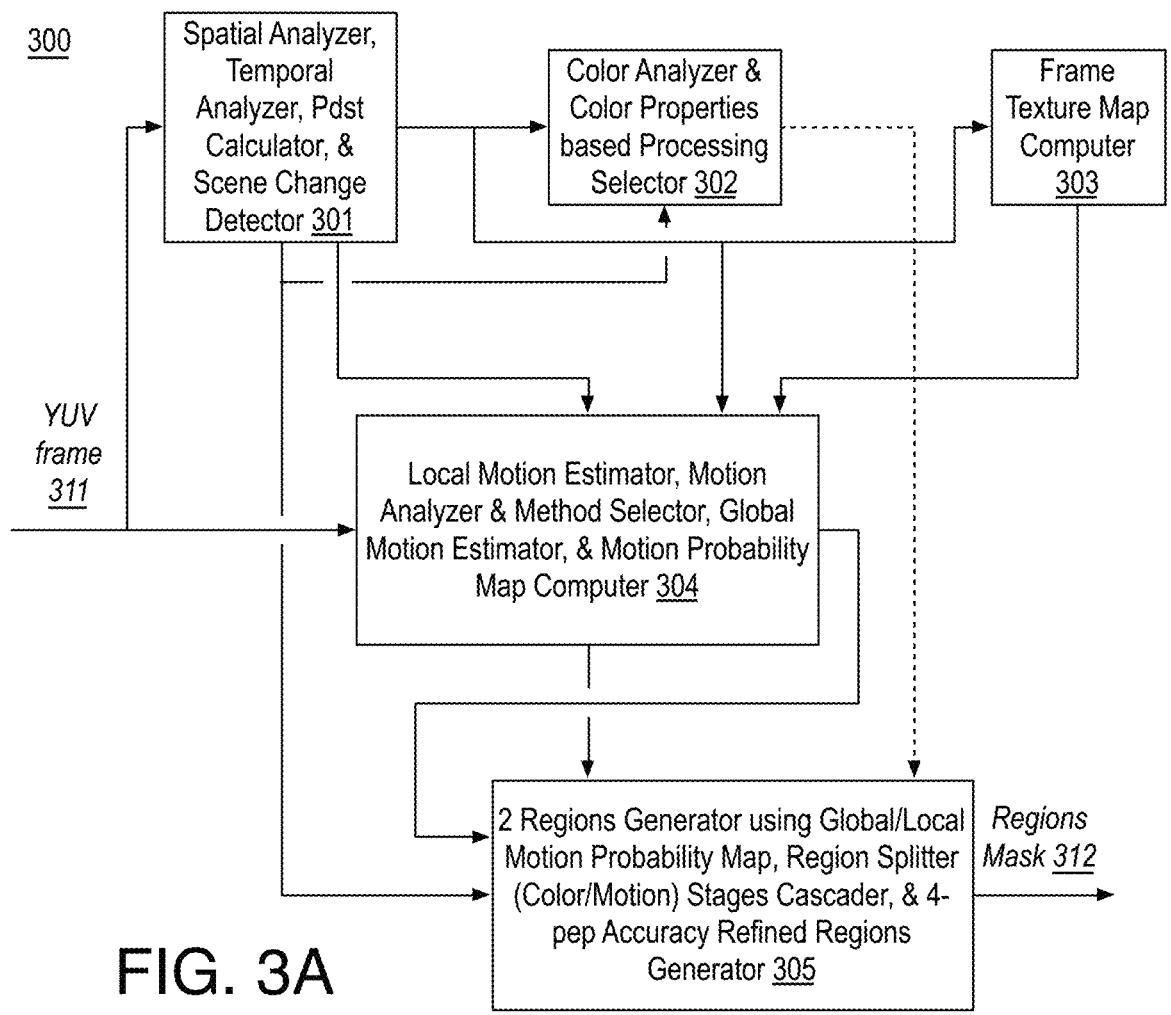
FIG. 3A illustrates an example motion based motion assisted region segmentation system.

FIG. 3A illustrates an example motion based motion assisted region segmentation system 300, arranged in accordance with at least some implementations of the present disclosure. For example, FIG. 3A illustrates a high level system diagram of a motion based color assisted region segmentation system 300. As shown, system 300 may include a number of blocks each of which may be processing-block-groups that perform a number of related operations. For example, system 300 may include a spatial analyzer, temporal analyzer, Pdst (P distance) calculator, and scene change detector 301 (e.g., a processing-block-group that performs content pre-analysis), a color (distribution) analyzer and color properties based processing selector 302 (e.g., a processing-block-group that performs color distribution analysis and method selection), a frame texture map computer 303 (e.g., a processing-block-group that evaluates texture distribution), a local motion estimator, motion analyzer and method selector, global motion estimator, and motion probability map computer 304 (e.g., a processing-block-group that estimates and analyzes motion), and a 2 regions generator using global/local motion probability map, region splitter (color/motion) stages cascader, and 4-pel accuracy refined regions generator 305 (e.g., a processing-block-group that generates segmented regions).

As shown, YUV frames 311 (or frames in any other suitable color space format) to be segmented may be input to spatial analyzer, temporal analyzer, Pdst (P distance) calculator, and scene change detector 301, which performs a number of scene analysis operations. For example, a spatial analyzer may measure or determine parameters that may be used to describe spatial activity/detail. A temporal analyzer may measure or determine parameters that may be used to describe temporal activity/motion. Furthermore, a P-distance calculator may determine which past frame is stable enough to serve as reference frame for estimating motion of the current frame. In some embodiments, to reduce complexity, some of operations may be performed on downsampled video. Finally, a scene change detector may detect hard cuts or scene changes in the video content of YUV frames 311. The scene change detector may be fast as by operating on downsampled content and reliable still reliable due to use of many scene change detection parameters that are trained using machine learning.

Also as shown, texture cues may be computed by frame texture map computer 303, which may include a texture distribution cues computer processing-block-group or the like. Such texture cues may be derived for a frame based on previously computed spatial analysis parameters from spatial analyzer, temporal analyzer, Pdst calculator, and scene change detector 301. Among the many aspects of texture cues that can be used, a map of the frame showing low detail area may be particularly advantageous.

Several of the computed parameters from spatial analyzer, temporal analyzer, Pdst calculator, and scene change detector 301 may be used by color analyzer and color properties based processing selector 302, which may perform measurement of distribution of color in the downsampled frame to compute a dominant color $d_c$. Color analyzer and color properties based processing selector 302 may also determine whether color based splitting should be employed or not and accordingly set a crs flag to either 1 or 0. Furthermore, a color differencing method cdm may be set to default value (e.g., cdm may be set to 0 or the like) as a primary basis used for segmentation is motion rather than color (although color can be used to assist segmentation).

Computation of motion cues may be performed by local motion estimator, motion analyzer and method selector, global motion estimator, and motion probability map computer 304. For example, the local motion estimator may determine block motion estimates such as an 8×8 block motion vector field. A motion analyzer, motion distance method and splitting selector may determine a motion histogram and, based on peaks, determine dominant motion $d_m$, and analyze the difference of the motion vector field both in a magnitude domain and an angle domain by computing the difference, threshold calculation, binarization, morphological clean up followed by determining stability of each approach, to determine a motion differencing method (mdm) to select from the two available choices. A global motion estimator may determine motion parameters based on, for example, a six parameter affine model that may be used for warping prediction and thus motion estimates for pixel (or small-blocks) in regions of global motion. Following determination of local and global motion, a global motion may be mapped to centers of each 8×8 block in an 8×8 block array, and a map of local/global motion probabilities may be determined.

Final processing may be the determination of motion assisted by color based segmentation of the frame into regions or region-layers. Such processing may include sub-steps performed by 2 regions generator using global/local motion probability map, region splitter (color/motion) stages cascader, and 4-pel accuracy refined regions generator 305, which may include several individual processing-blocks such as a 2 regions generator using global/local motion probability map that performs segmentation of global/local motion probability into two to provide a primary segmentation of each frame generating two regions based on motion. The segmented regions (e.g., via global/local motion probability map) may undergo further subdivision into additional regions via a region splitter (color/motion) stages cascader that can use color and/or motion for splitting a region layer into additional regions or region layers. Also, the region splitter (color/motion) stages cascader may use either a single stage of splitting or a cascade of multiple stages to provide segmentation into many more regions. For example, the discussed techniques may be used for segmentation into up to 6 regions. Howeer, there is no limitation to how many regions may be generated. Finally, a 4-pel accuracy refined regions generator may improve border accuracy of segmented regions from 8-pels to 4-pels.

Figure 3B:
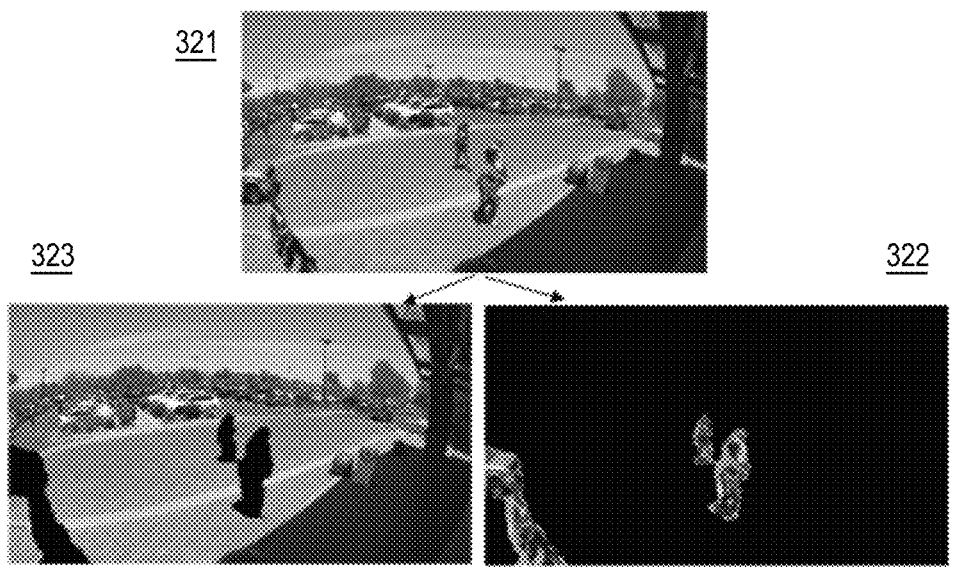
FIG. 3B illustrates an example segmentation of a video frame into a first region layer and a second region layer.

FIG. 3B illustrates an example segmentation of a video frame 321 into a first region layer 322 (e.g., including moving people and a vehicle) and a second region layer 323 (e.g., including remaining parking lot objects), arranged in accordance with at least some implementations of the present disclosure. For example, FIG. 3B illustrates example results of the segmentation of video frame 321 into first region layer 322 and second region layer 323 using the techniques discussed herein.

Figure 4:
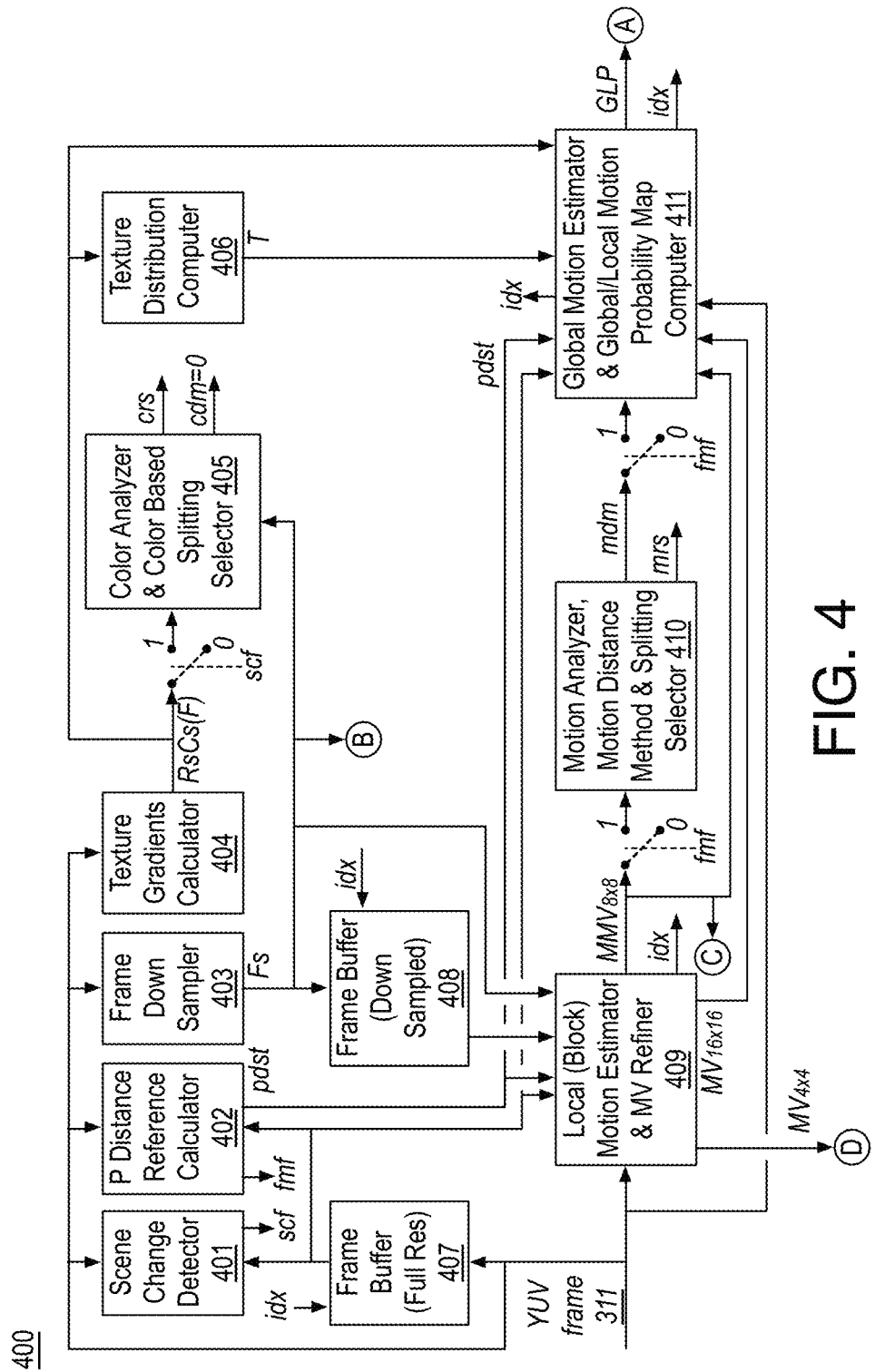
FIG. 4 illustrates an example motion based color assisted region segmentation system.
Figure 4:
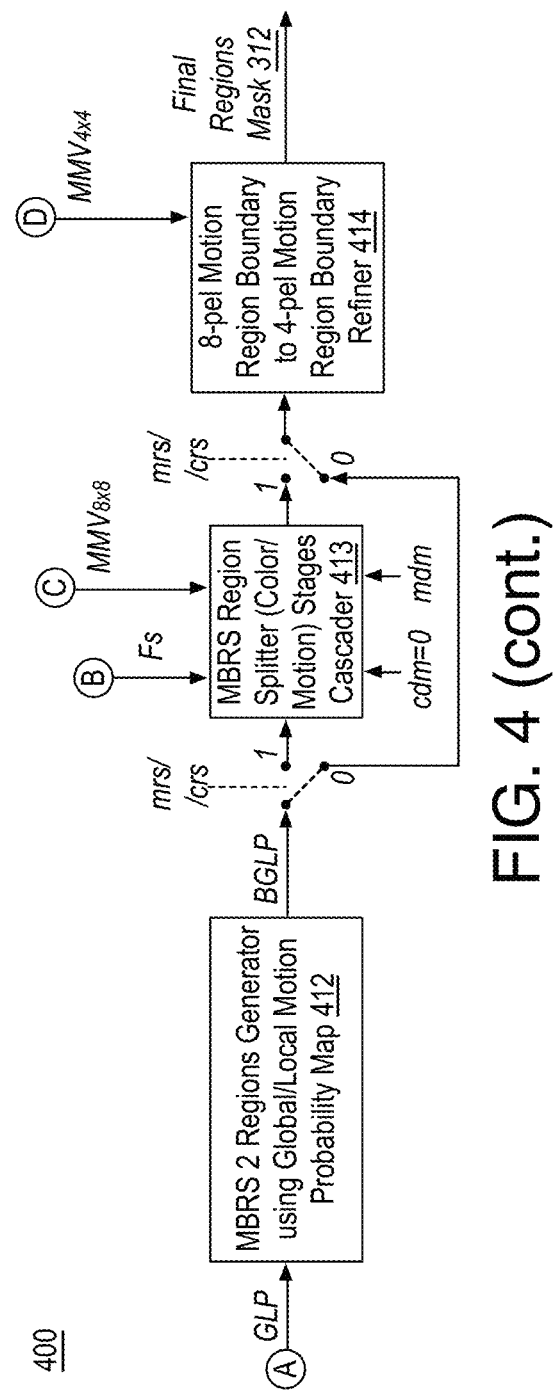

FIG. 4 illustrates an example motion based color assisted region segmentation system 400, arranged in accordance with at least some implementations of the present disclosure. For example, FIG. 4 may provide a detailed system 400 corresponding to the high level system illustrated in FIG. 3A. For example, FIG. 4 provides a further breakdown of processing-block-groups of FIG. 3A into processing-blocks and inter-connections between each of the processing blocks, buffers, as well as control signals.

Before discussing the details of the system of FIG. 4, the overall nomenclature of the various terms employed to describe the operations of this invention are provided below.
Nomenclature of Various Data and Signals Used Herein
b—block size
F—original frame
Fs—subsampled frame
scf—scene change frame
pdst—prediction (P) frame distance
idx—index
$d_c$—dominant color
$d_m$—dominant motion
$t_c$—threshold for dominant color
$t_m$—threshold for dominant motion
$t_b$—threshold for border refinement
$ht_c$—high threshold for color
DCP—Dominant Color probability map; its binarized versions are BDCP, BDCP', BDCP'' BDCP$^a$, BDCP$^b$, BDCP$^c$ GLP—Global/Local Probability map; its binarized versions are BGLP, BGLP1
csm—color separation method
cdm—color differencing method
mdm—motion differencing method
crs—color region splitter
mrs—motion region splitter
fmf—first motion frame (after scene cut to use motion due to pdistance isssues)
cms—color/motion splitting method, also cms2
nas—number of additional segments—its versions are nas2, nas3, nas4
$R_s$—a measure of vertical texture, i.e., vertical (or row) gradient
$C_s$—a measure of horizontal texture, i.e., horizontal (or columns) gradient
$R_sC_s(F)$—a combined measure of $R_sC_s$ based texture for the frame
T—a Texture measure, also represented as T' and T"
H—Histogram
$MD_m$—Motion Difference magnitude; its binarized versions are $BMD_m$ and $BMD'_m$
$MV_{16 \times 16}$—16×16 motion vector array corresponding to a frame
$MV_{8 \times 8}$—8×8 motion vector array corresponding to a frame
$MMV_{8 \times 8}$—updated 8×8 motion vector array after merging of $MV_{16 \times 16}$ and $MV_{8 \times 8}$
$GM_{pars}$—Global Motion parameters
$GMV_{8 \times 8}$—Global motion based 8×8 motion vector array Turning now to FIG. 4, as shown, a YUV frame 311 (F) may be input to system 400 and a number of events may occur, optionally simultaneously. YUV frame 311 (F) may be input to frame buffer (full resolution) 407 (e.g., a frame buffer, BF, of full resolution frames) and YUV frame 311 (F) may be filtered and downsampled by frame down sampler 403 the output of which (e.g., a down sampled frame) Fs is stored in frame buffer (down sampled) 408 (e.g., a frame buffer, BFs, of down sampled frames). Furthermore, YUV frame 311 (F) may be analyzed to determine whether it belongs to a new scene as compared to a previous frame in scene change detector 401, which outputs an scf flag set to 1 when the current frame is a scene change frame (and a 0 or no signal otherwise). YUV frame 311 (F) may be compared against past frames from frame buffer 407 in P distance reference calculator 402 to determine which of the past frames would be the most stable one to use as reference for motion calculations (e.g., which may be signaled as pdst). YUV frame 311 (F) may also be input to texture gradients calculator 404 which may output RsCS(F) as a measure of frame complexity in terms of texture gradients. Such texture gradients measurement RsCS(F) and/or other texture gradient measurements and/or other texture cues may be used by texture distribution computer 406 to determine a map of texture levels (e.g., with emphasis on low texture region) of the entirety of YUV frame 311 (F).

Furthermore, if YUV frame 311 (F) belongs to a new scene, a number of color and motion based parameters may be determined that allow for control of the segmentation process of motion based region segmentation. For example, color based parameters may be determined by color analyzer and color based splitting selector 405. Determination of such color based parameters may include the use of a default color differencing method (e.g., signaled by cdm=0), a determination of whether color should be used as a basis for region splitting (e.g., by use of the value of the crs flag). The use of such parameters on segmentation is discussed herein below.

Discussion now turns to the operation of the three motion related processing-blocks in FIG. 4 including the motion based parameters they generate to control segmentation. The current YUV frame 311 (F) and a previous YUV frame (from buffer) are input to local motion estimator and motion vectors (MV) refiner 409 that may determine, for the current YUV frame 311 (F), 16×16 block motion vectors that may then be refined to 8×8 block-size to produce a non-noisy motion vector field (MMV8×8) suitable for region segmentation. Furthermore, local motion estimator and motion vectors (MV) refiner 409 may also output a 4×4 motion vector field for use in motion region boundary refinement. The 8×8 motion vector field may be input via a first switch controlled by first motion frame (fmf) control that feeds MMV8×8 to motion analyzer, motion distance method and splitting selector 410, the two outputs of which are motion region splitter (mrs) and motion differencing method (mdm) control signals. The mdm signal is input to global motion estimator and global/local motion probability map computer 411 that computes global motion parameters between the current full size YUV frame 311 (F) and a previous frame from frame buffer 407 and derives a motion estimate for center pixels of each 8×8 block for the current YUV frame 311 (F) resulting in a global motion based 8×8 motion field GMV8×8 for the frame. For every 8×8 block, the motion field may be differenced with a corresponding merged motion vector MMV8×8 motion field based on the differencing method such as magnitude difference or angle difference as indicated by the mdm signal. The absolute value of the differenced motion field may then be scaled and output as a calculated global/local motion probability map, GLP.

Next, the global/local motion probability map, GLP, may be input to MBRS 2 regions generator using global/local motion probability map 412 that may determine the segmentation of the frame being processed into two regions and may output the corresponding binarized GLP (BGLP) mask. As shown, the BGLP mask is passed via the first switch controlled by mrs crs control to either to a MBRS regions splitter (color/motion) stages cascader 413 or the BGLP mask bypasses it. MBRS regions splitter (color/motion) stages cascader 413 takes as additional inputs the mdm flag, the cdm=0 flag, the subsampled frame Fs, and 8×8 motion vector field MMV8×8, and splits the local motion region further into several additional regions (e.g., 3 to 6 regions) depending on how many stages of cascade are used and whether both the foreground and the background regions are split or segmented. Depending on whether the merged multi-region mask (at the output of MBRS regions splitter (color/motion) stages cascader 413) or the bypassed BGLP mask are active, the active mask is input via a second switch also controlled by mrs||crs to 8-pel motion region boundary to 4-pel motion region boundary refiner 414, which also takes as additional inputs the subsampled frame Fs and 4×4 motion vector field $MV_{4 \times 4}$. As discussed herein, 8-pel motion region boundary to 4-pel motion region boundary refiner 414 may perform refinement of the 8-pel accuracy boundary region boundary of the segmented regions to 4-pel accuracy and output a refined final regions mask 312.

Discussion now turns to operations of the previously described modules. Scene change detector 401, P distance reference calculator 402, and frame down sampler 403 are general processing blocks known to those of skill in the art and will not be discussed further for the sake of brevity.

As discussed, one or more texture cues as provided by texture gradients calculator 404 may be used to provide increased spatial and temporal stability to color based segmentation of pictures (frames or fields) such that the resulting segmented regions are spatially and temporally consistent. For example, texture gradients calculator 404 may include two components or operations: determination of a spatial activity measure, $R_sC_s$, and a determination of a texture distribution measure or a texture map, T. Both measures $R_sC_s$ and T are described next.

The first measure (e.g., a spatial activity measure) is picture or frame based activity, RsCs, which may be a combined measure of horizontal and vertical gradients of luma (Y) of a picture calculated on, for example, a 4×4 block basis and averaged over the entire picture. For example, the activity of a block $RsCs_{4\times4}$ may be derived from a block-wise average vertical gradient $Rs_{4\times4}$ and a block-wise average horizontal gradient $Cs_{4\times4}$. Such processing may be performed as follows. For a block[i][j] of size 4×4 pixels represented by pel[0 . . . 3][0 . . . 3], horizontal and vertical gradient square sums over each block may first be determined as shown in Equations (1) and (2).

$$HorGradSqSum4\times4[i][j] = \sum_{k=0...3}\sum_{l=0...3} \qquad (1)$$
$$(pel[(i\times b)+k][(j\times b)+l] - pel[(i\times b)+k][(j\times b)+l-1])^2$$

$$VertGradSqSum4\times4[i][j] = \sum_{k=0...3}\sum_{l=0...3} \qquad (2)$$
$$(pel[(i\times b)+k][(j\times b)+l] - pel[(i\times b)+k-1][(j\times b)+l])^2$$

Next, Rs and Cs may be determined for each block (e.g., block=4) using Equations (3) and (4) as follows.

$$Rs_{4\times4}[i][j]=\sqrt{(VertGradSqSum4\times4[i][j])/(b\times b)} \qquad (3)$$

$$Cs_{4\times4}[i][j]=\sqrt{(HorGradSqSum4\times4[i][j])/(b\times b)} \qquad (4)$$

$RsCs_{4\times4}$ may then be determined as shown in Equation (5).

$$RsCs_{4\times4}[i][j]=\sqrt{(Rs_{4\times4}[i][j])^2+(Cs_{4\times4}[i][j])^2} \qquad (5)$$

Furthermore, if RsCs is based on a bigger block size (e.g., a 16×16 size is needed), it may be determined by first determining $Rs_{16\times16}$ (which may be determined directly from $Rs_{4\times4}$) and $Cs_{16\times16}$ (which may be determined directly from $Cs_{4\times4}$) and then determining $RsCs_{16\times16}$ by squaring each of $Rs_{16\times16}$ and $Cs_{16\times16}$, adding, and taking the square root.

Furthermore, picture based global activity RsCs may then be computed from global Rs and global Cs. For example, assuming a number of 4×4 blocks in a picture-width is nh and a number of 4×4 blocks in the picture-height is nv, the global R, and global Cs of a picture may be determined as shown in Equations (6) and (7).

$$Rs = \sqrt{\sum_{i=0...nv}\sum_{j=0...nh}(HorGradSqSum4\times4[i][j])/(b\times b\times nh\times nv)} \qquad (6)$$

$$Cs = \sqrt{\sum_{i=0...nv}\sum_{j=0...nh}(VertGradSqSum4\times4[i][j])/(b\times b\times nh\times nv)} \qquad (7)$$

Picture activity based on global RsCs may then be determined as shown in Equation (8):

$$RsCs=\sqrt{Rs^2+Cs^2} \qquad (8)$$

A second component of the texture cues may be a spatial texture map T that measures the amount of texture and its distribution in the image or frame. Connected flat-area regions, or in general low texture regions may be of special interest so that they may be excluded from motion analysis where they provide unstable results.

Figure 5:
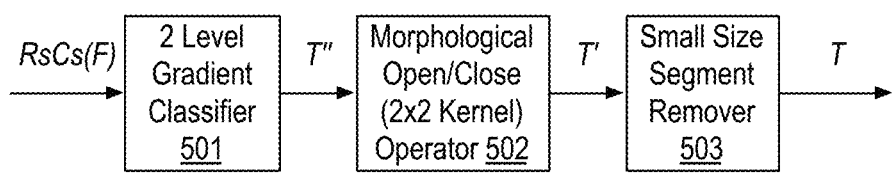
FIG. 5 illustrates a block diagram of an example texture distribution computer.

FIG. 5 illustrates a block diagram of an example texture distribution computer 406, arranged in accordance with at least some implementations of the present disclosure. For example, texture distribution computer 406 may determine a texture map T from a two dimensional $RsCs_{4\times4}$ array of an image or frame of YUV frames 311 (F). As shown, the RsCs(F) (e.g., $RsCs_{4\times4}$) array may first be binarized by 2 level gradient classifier 501 to a two-dimensional T" map. For example, T" map may be generated by providing high texture values to 1 and low texture values to 0 or the like. The two-dimensional T" map may undergo a set of open/close morphological operations by morphological open/close (2×2 kernal) operator 502 to generate a two-dimensional T' map. The two-dimensional T' map may undergo removal of small size segments in small size segments remover 503 processing-block to generate a final 2-dimensional texture map T.

Figure 6A:
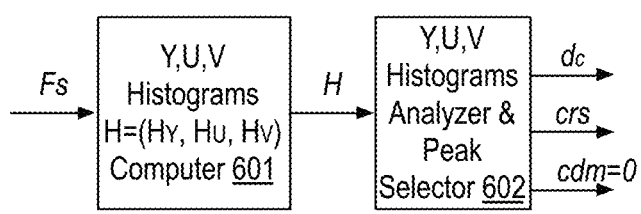
FIG. 6A illustrates a block diagram of an example color analyzer, color distance method and splitting selector.

Discussion now turns to color analysis and color-based splitting determination. FIG. 6A illustrates a block diagram of an example color analyzer, color distance method and splitting selector 405, arranged in accordance with at least some implementations of the present disclosure. For example, color analyzer, color distance method and splitting selector 405 may determine, by color content analysis, the properties and distribution of color, based on which a color region splitting (crs) may be assigned a value of 1 or 0 reflecting the color method to be used. As shown in FIG. 6A, a downsampled frame may be provided to Y,U,V histograms $H=(H_Y, H_U, H_V)$ computer 601, which may, for each of the Y, U, V components of a subsampled frame Fs, generate individual color histograms ($H_Y$, $H_U$, $H_V$) referred to together as H. The histograms may then form an input to a Y,U,V histograms analyzer and peak selector 602, which may determine the dominant color $d_c$ and a color region splitter flag crs (discussed further herein below). The techniques used for dominant color detection are discussed via example further herein below. In an embodiment, there are two choices for crs: if crs=1, color based region splitting is to be performed and, if crs=0, no color based region splitting is to be performed. To determine the value to set for the crs flag, the color histogram may be analyzed for additional dominant color peaks: if additional peaks are found, crs is set to 1 and, if not, crs is set to 0.

Discussion now turns to dominant color determination. First, Y,U,V histograms $H=(H_Y, H_U, H_V)$ computer 601 may generate three histograms, one for each channel of the subsampled YUV 4:4:4 frame. Next, Y,U,V histograms analyzer and peak selector 602 may determine the highest peak (e.g., the most frequently occurring value) of the histograms for each of the Y, U and V channel. This YUV combination color of the peak is determined to be the dominant color, $d_c$.

Figure 6B:
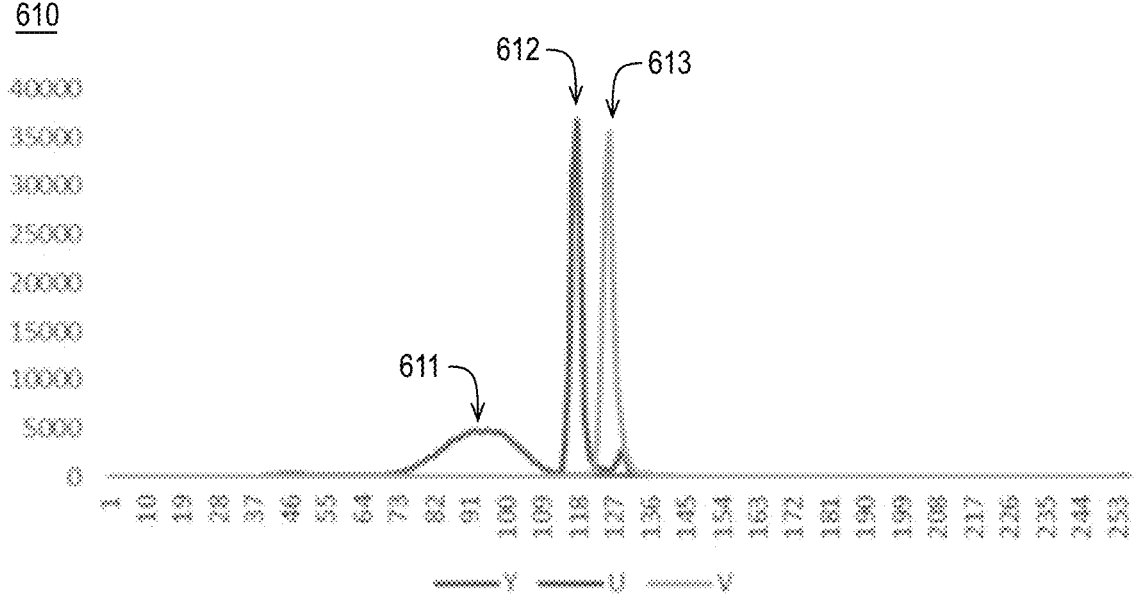
FIGS. 6B and 6C illustrate example $H_Y$, $H_U$, $H_V$ histograms.
Figure 6C:
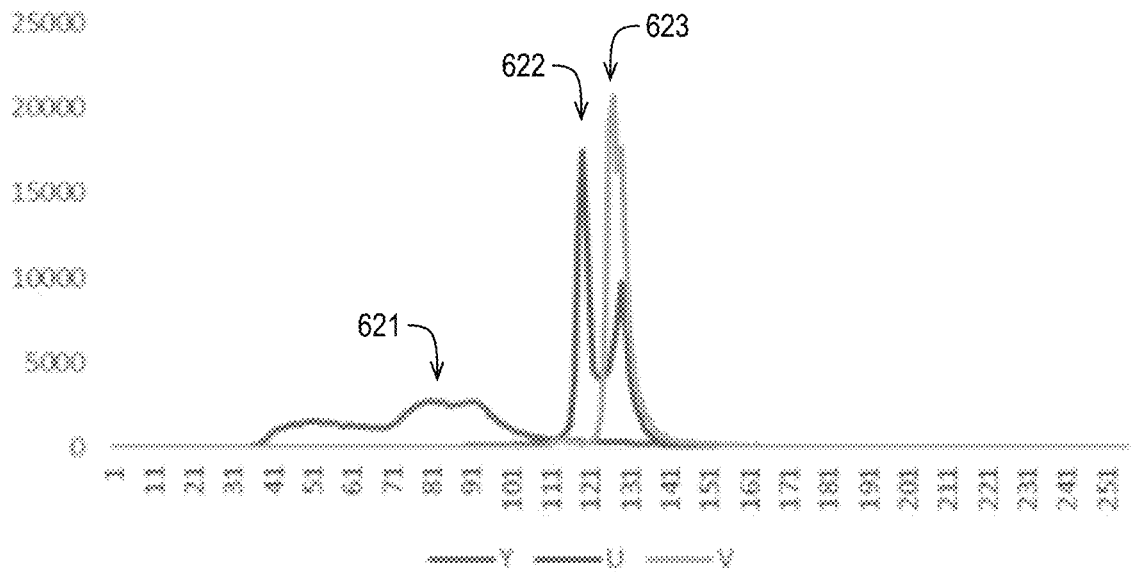

FIGS. 6B and 6C illustrate example $H_Y$, $H_U$, $H_V$ histograms, arranged in accordance with at least some implementations of the present disclosure. For example, FIGS. 6B and 6C illustrate an example $H_Y$, $H_U$, $H_V$ histogram 610 determined based on example YUV 4:4:4 frames of 1080p sequence Touchdown Pass and an example $H_Y$, $H_U$, $H_V$ histogram 620 based on example YUV 4:4:4 frames of 1080p sequence Rush Field Cuts. As shown, $H_Y$, $H_U$, $H_V$ histogram 610 may have a Y peak 611 at 92, a U peak 612 at 117, and a V peak 613 at 125 to provide a dominant color $d_c$ of (92, 117, 125). Similarly, $H_Y$, $H_U$, $H_V$ histogram 620 may have a Y peak 621 at 91, a U peak 622 at 118, and a V peak 623 at 126 to provide a dominant color $d_c$ of (91, 118, 126).

Figure 7A:
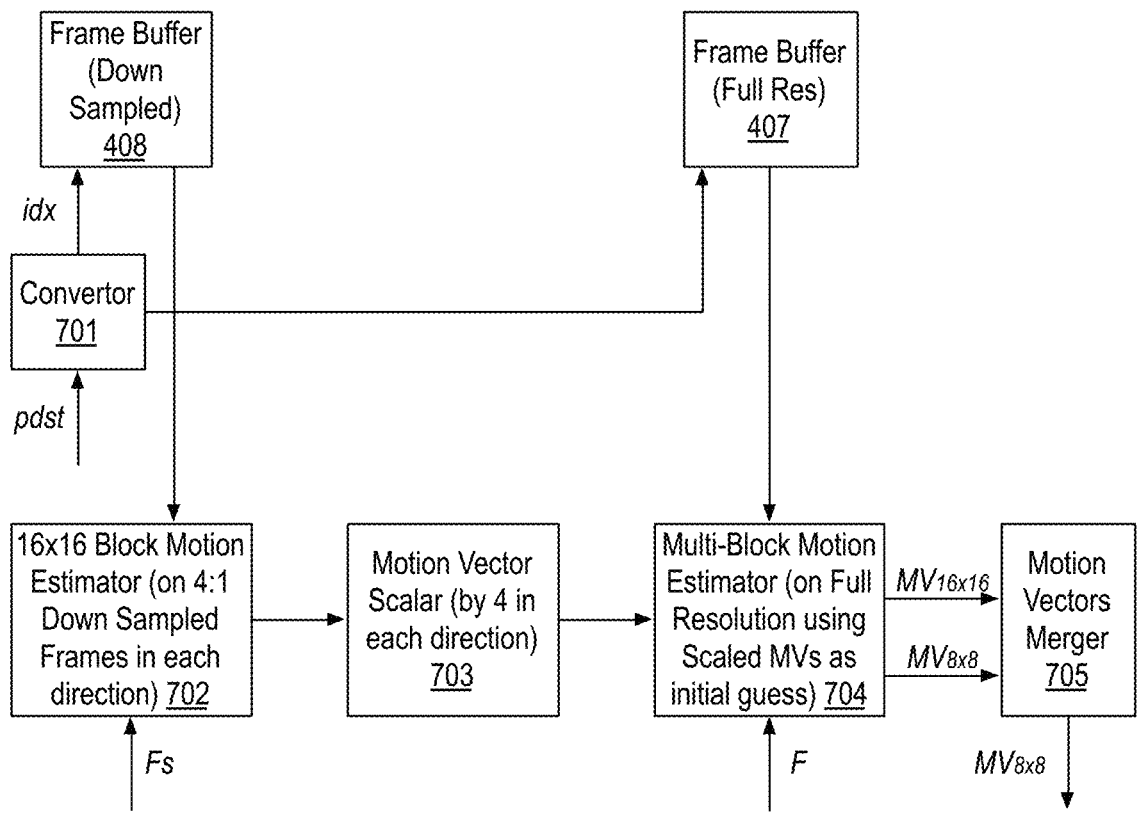
FIG. 7A illustrates a block diagram of an example local motion estimator and motion vectors (MV) refiner.

Discussion now turns to motion cues including local motion estimation. FIG. 7A illustrates a block diagram of an example local motion estimator and motion vectors (MV) refiner 409, arranged in accordance with at least some implementations of the present disclosure. As shown, a downsampled current frame Fs may be input to 16×16 block motion estimator 702, the other input to which is a previous frame (e.g., given by index idx based on the pdst value as provided by converter 701) of the same size from frame buffer (of down sampled frames) 408. 16×16 block motion estimator 702 determines 16×16 block motion vectors and outputs them to motion vector scaler 703 that scales the motion vectors by 4 in each direction such that they are applicable to a full resolution frame.

Next, as shown in FIG. 7A, the upscaled motion vectors as well as the full size current frame and a previous full size frame (e.g., given by index idx, based on pdst value as provided by converter 701) are input to multi-block motion estimator 704 that uses a full resolution video frame F and takes motion vectors output by 16×16 block motion estimator 702 as initial guesses in a hierarchical motion estimation that computes a smooth 16×16 motion vector field ($MV_{16\times 16}$) and a smooth 8×8 motion vector field ($MV_{8\times 8}$). The two smooth motion vector fields are then input to a motion vectors merger 705 that, based on rate-distortion or error, chooses either the 16×16 motion vectors or the 8×8 motion vectors. Such processing may increase further the stability of the motion vector field by merging, resulting in an even more stable single motion field that provides 8×8 block accuracy at object/region boundaries.

FIG. 7B illustrates an example of merging motion vector fields, arranged in accordance with at least some implementations of the present disclosure. For example, FIG. 7B illustrates an example of merging of motion vector fields to generate a merged 8×8 block motion vectors field ($MMV_{8\times 8}$) for a frame of the Touchdown 1080p sequence such that (i) illustrates a current frame 711 for which motion vectors are determined with respect to a previous frame (not shown), (ii) illustrates a 16×16 block motion vector field 712, (iii) illustrates a noisy 8×8 block motion vector field 713, and (iv) illustrates a reduced-noise merged 8×8 block motion vector field 714 generated by merging as discussed herein. FIG. 7B (iii) shows the principle of merging 16×16 and more noisy 8×8 MV fields to create a more stable motion vector field 712.

FIG. 7C illustrates another example of merging motion vector fields, arranged in accordance with at least some implementations of the present disclosure. For example, FIG. 7C illustrates an example of merging of motion vector fields to generate a merged 8×8 block motion vectors field ($MMV_{8\times 8}$) for the ParkJoy 1080p sequence such that (i) illustrates a current frame 721 for motion estimation, (ii) illustrates a one-stage motion vector field 722 generated by generating individual 16×16 and 8×8 motion vector fields and merging, (iii) illustrates a low resolution motion vector field 723 generated by a first stage of a two stage motion vector field generation, (iv) illustrates an upsampled low resolution motion vector field 724 used as prediction for a second stage, and (v) illustrates a final merged 8×8 accurate motion field 725 that uses upsampled motion vectors for prediction for a second stage. FIG. 7C (iii) shows an example of a low resolution first stage motion vector field. FIG. 7C (iv) shows an upsampled motion vector field. FIG. 7C (v) shows merged 16×16 and 8×8 motion vector fields.

Figure 8A:
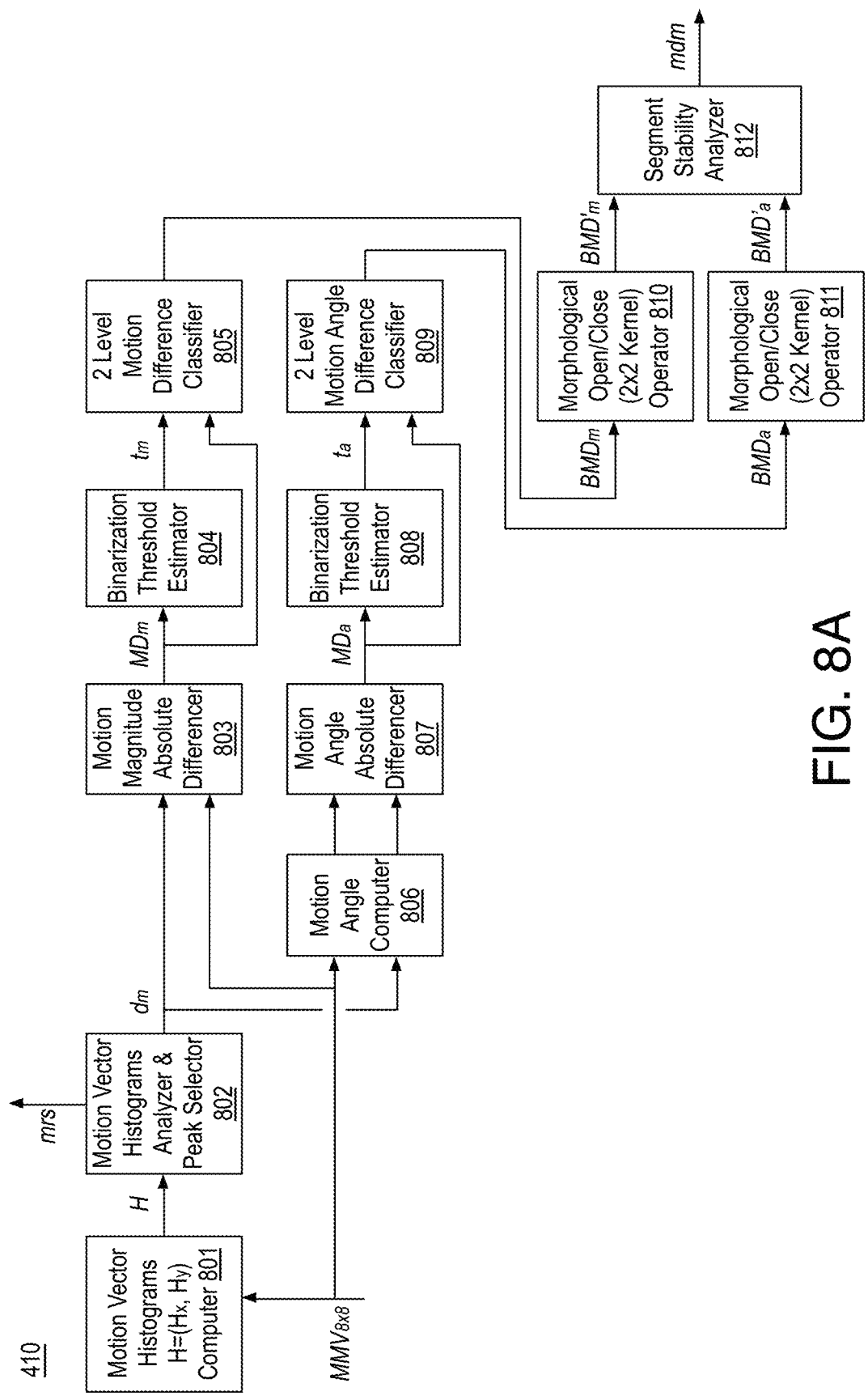
FIG. 8A illustrates a block diagram of an example motion analyzer, motion distance method and splitting selector.

Discussion now turns to motion analysis, motion distance method and splitting selection. FIG. 8A illustrates a block diagram of an example motion analyzer, motion distance method and splitting selector 410, arranged in accordance with at least some implementations of the present disclosure. As shown in FIG. 8A, an 8×8 merged motion vectors ($MMV_{8\times 8}$) field is input to motion vectors histograms $H=(H_x, H_y)$ computer 801 that may determine a histogram of each of x and y components of the motion vectors. The histogram is input to motion vector histograms analyzer and peak selector 802 that may analyze the histograms to determine peaks of the x and y components of the motion vectors. Motion vector histograms analyzer and peak selector 802 may output a value of a control signal mrs to control if motion based region splitting should be employed and a majority motion vector, $d_m$. Each 8×8 MV of the motion vector field and the majority motion vector $d_m$ are input to motion magnitude absolute differencer 803 and to motion angle computer 806.

Motion magnitude absolute differencer 803 determines the absolute value of the difference between motion vectors at its two inputs. For example, a difference between a motion vector at each location in the motion vector field and the majority motion vector $d_m$ may be determined resulting in a motion vector absolute difference field $MD_m$.

Motion angle computer 806 may determine the respective angle between motion vectors at its input, and the computed angles are input to motion angle absolute differencer 807, which may determine a motion vector angle absolute difference field $MD_a$ in analogy to the generation of $MD_m$. For each of the $MD_m$ and $MD_a$ fields, a respective binarization threshold $t_m$ and to is determined by binarization threshold estimators 804, 808 and used by respective binarizers: 2 level motion difference classifier 805 and 2 level motion angle difference classifier 809. 2 level motion difference classifier 805 outputs a binary mask $BMD_m$ and 2 level motion angle difference classifier 809 outputs a binary mask $BMD_a$.

Each of the 2 masks may then undergo morphological cleanup in respective morphological operators such as morphological open/close (2×2 kernel) operators 810, 811, which respectively output $BMD'_m$ and $BMD'_a$. Next, $BMD'_m$ and $BMD'_a$ are input to segment stability analyzer 812 that may determine which approach (e.g., motion magnitude or motion angle based) will result in stable results and sets value of motion differencing method mdm accordingly. For example, if motion angle based method is preferred mdm is set to 1, otherwise mdm is set to 0.

Figure 8B:
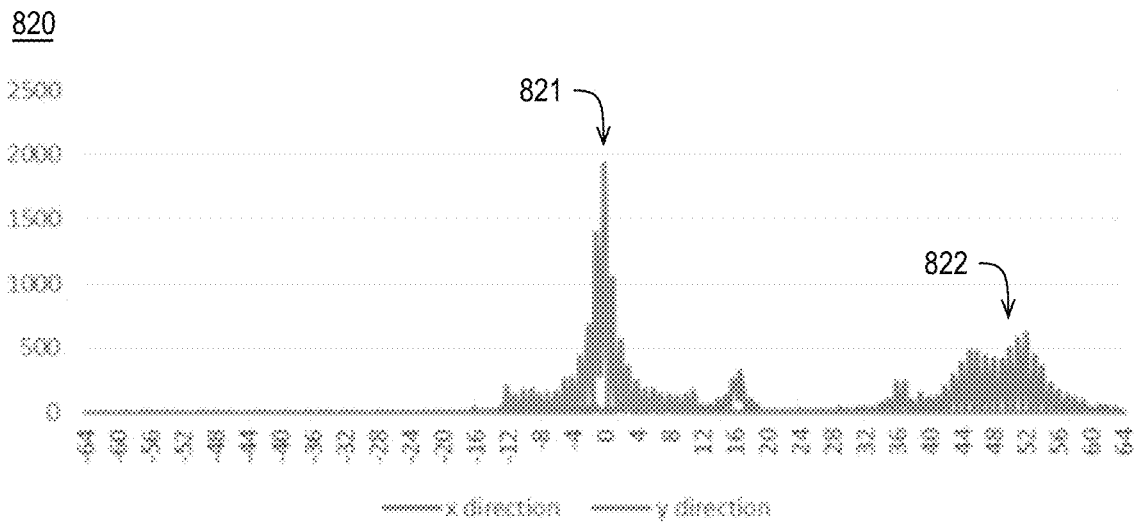
FIG. 8B illustrates an example motion vector histogram.

FIG. 8B illustrates an example motion vector histogram, arranged in accordance with at least some implementations of the present disclosure. For example, FIG. 8B illustrates an example generation of motion vector peaks for x and y components of vectors for the Park Joy sequence. As shown, example motion vector histogram 820 includes an x component or direction peak 822 and a y component or direction peak 821. In the illustrated example, x direction peak 822 provides a majority x component of the vector at 52 and y direction peak 821 provides a majority y component of the vector at 0. In such an example, the majority vector or dominant motion vector dm is determined to be (52, 0).

Discussion now turns to motion estimation including global motion estimation. Block based translational motion model regardless of block sizes, how smooth the motion field is or which references are used for motion computation, is based on an underlying assumption of translatory motion which is not always true and thus the block based translational motion model can be inaccurate. In some examples, more appropriate models for more complex scenes can be derived based on the overall global movement of the camera such as its pitch, yaw and roll.

For example, global motion may be modeled for a scene using any suitable technique such as an affine model based technique, a perspective model based technique, or the like. For example, an affine model may use 6 parameters and may address a large range of motion including translation/pan, zoom, shearing, and rotation. A perspective model may, in addition to pan, zoom, shearing, and rotation, may also model changes in perspective. In some embodiments, it may be advantageous to apply an affine based model with increased simplification/reduction of its complexity to region segmentation.

In some embodiments, an affine transformation process may be described by Equations (9) and (10), which use affine parameters a, b, c, d, e, f to map each point (x,y) in a previous or reference picture to a modified point (x', y').

$$x_i' = a \cdot x_i + b \cdot y_i + c \quad (9)$$

$$y_i' = d \cdot x_i + e \cdot y_i + f \quad (10)$$

In some embodiments, the affine parameter coefficients may be provided at double floating point representation for full precision. Furthermore, the points after motion compensation (i.e., (x'y')) may be at non-integer locations and determination of the displaced picture may include interpolation. In some embodiments, to reduce complexity, global motion parameters may be converted to fixed-point integer form and optionally kept at lower precision.

Figure 9A:
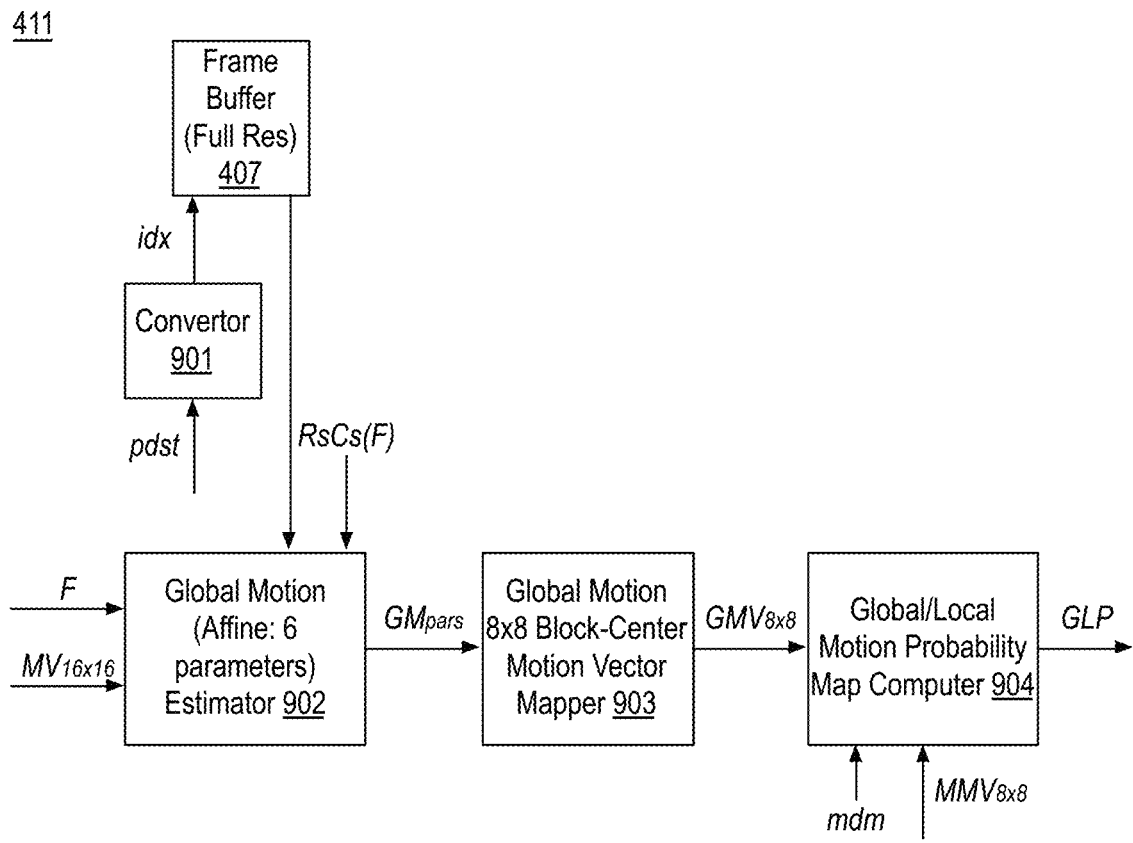
FIG. 9A illustrates a block diagram of an example global motion estimator and global/local motion probability map computer.

FIG. 9A illustrates a block diagram of an example global motion estimator and global/local motion probability map computer 411, arranged in accordance with at least some implementations of the present disclosure. As shown, global motion estimator and global/local motion probability map computer 411 may include a converter 901, a global motion estimator 902, a global motion to 8×8 block-center motion mapper 903, and a global/local motion probability map computer 904.

In some embodiments, global motion estimator 902 may determine the global motion 6-parameter affine model using the previously computed motion field ($MV_{16 \times 16}$) and using the previously determined (flat/low detail) texture map. For example, global motion estimator 902 may implement the following techniques to efficiently determine the best affine 6-parameter set.

First, the affine 6-parameter model may be estimate iteratively by setting len=wb*hb where wb is block-accurate frame width and hb is block accurate frame height (e.g., for a 1080p frame, wb=1920/16=120, hb=1088/16=68=>len=8160), for i=0 to (3*len)−1 performing the following: pick 3 random block positions from non flat area (as per input flat area map), estimate local 6-parameters using 3 vectors at the selected positions, add to histograms (one 1D histogram for each of 6 params), and for each histogram, get 0-2 peaks and collect all combinations (e.g., a total number of 6-parameter candidates ranges from min=0 to max=64). Then, the prediction candidates (adds prediction candidates from past 6-parameters) may be added by adding a winning 6-parameter set from the previous frame as a candidate to the current candidate set. Next, a winner may be selected from the candidate set by: for each candidate, determining the estimated error by creating a compensated frame from the candidate affine parameter set and getting the SAD between the compensated frame and the original frame, and choosing a candidate with a smallest SAD error. Then, a fast estimate of the global/local binary mask may be created by: determining a global MV (gMV) for each 16×16 block using the winning parameter set, determining sum=ABS(gMV.x−MV.x)+ABS(gMV.y−MV.y) such that ABS is absolute value and MV is the collocated motion vector in the current frame's motion field, and, if sum is less than a preset threshold, then setting the global/local mask at the current block to 1, otherwise setting it to 0 (i.e. 1=global moving block, 0=local moving block). Next, one 6-parameter set may be estimated using the estimated global/local binary mask by collecting motion vectors only of global moving blocks and applying a 6-parameter formula to determine the estimate (using determinant-based affine formula). Then, the SAD error may be determined for the local 6-parameter set. Finally the local 6-parameter set's SAD error may be compared to the SAD error of the winning candidate and the final best candidate may be chosen.

As shown, global motion to 8×8 block-center motion mapper 903 may receive the best affine parameter set and global motion to 8×8 block-center motion mapper 903 may use the parameter set to generate a global motion field by applying the affine parameters to a center-pixel of each 8×8 block.

Next, the motion probability may or global/local probability map may be generated. For example, global/local motion probability map computer 904 may receive the global motion vector field ($GMV_{8 \times 8}$) and global/local motion probability map computer 904 may generate a difference map between the global motion field and the actual (local) motion field using a differencing method indicated by the mdm value.

For example, if mdm is set to 0, the difference between the global and local motion vector fields may be determined based on the following differencing method. For example, the difference Dm between a motion vector (x, y) and corresponding global motion vector (xg, yg) may be determined as follows in Equation (11).

$$Dm = ABS(x - xg) + ABS(y - yg) \quad (11)$$

For example, the differencing method of in Equation (14) may emphasize the difference in magnitude between the two motion vectors.

However if mdm is set to 1, the difference between the global and local motion vector fields may be determined based on a differencing method that emphasizes the angular difference of the two motion vectors is used. For example, the difference Dm between a motion vector (x, y) and corresponding global motion vector (xg, yg) may be determined as follows in Equation (12).

$$Dm = MIN(255, d1 + d2), \quad (12)$$

In Equation (12), d1 and d2 may be determined as follows in Equations (13) and (14).

$$d1 = MIN(ABS(a - ag), \ MIN(ABS(a - ag - 360), \ ABS(a - ag + 360))), \quad (13)$$

$$d2 = \frac{ABS(r - rg)}{3}, \quad (14)$$

In Equations (16) and (17), (r, a) and (rg, ag) are polar coordinates of the corresponding Cartesian motion vectors (x, y) and (xg, yg).

Once the differences are determined for the motion vectors, the global/local motion probability map, GLP, may be set to or mapped to the determined differences such that 0 represents a 100% probability of pixel being in the global moving or global motion area and 255 represents a 0% probability of pixel being in the global moving or global motion area (i.e., it is a 100% probability of being in a local moving area).

Figure 9B:
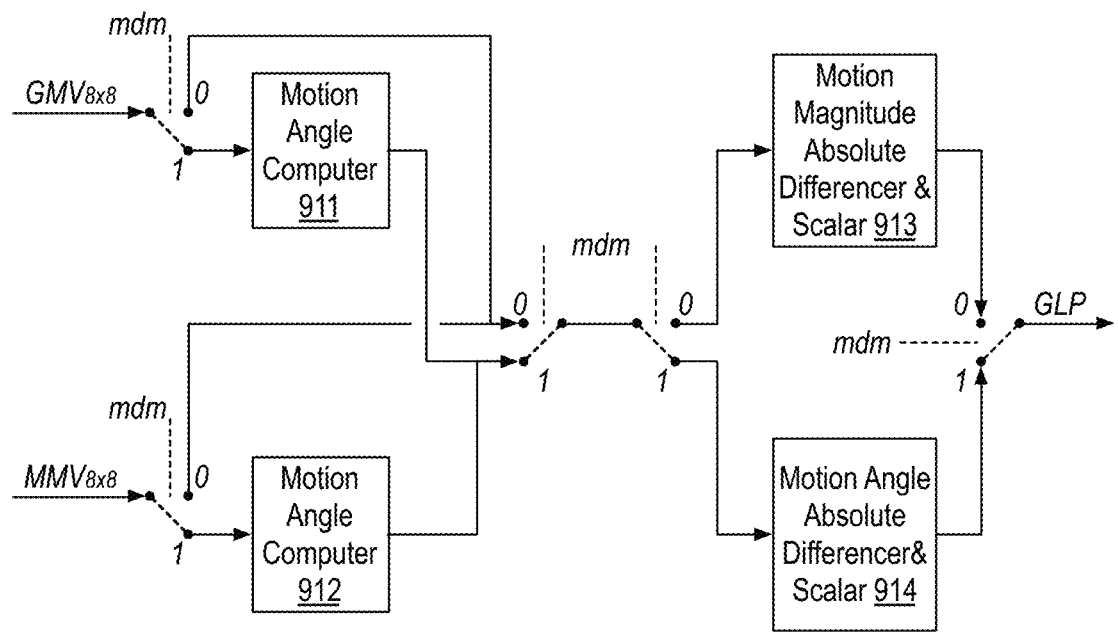
FIG. 9B illustrates a block diagram for the determination of a global/local probability map.

FIG. 9B illustrates a block diagram for the determination of a global/local probability map, arranged in accordance with at least some implementations of the present disclosure. For example, FIG. 9B illustrates an implementation of the discussed approaches in the form of a block diagram of an example global/local motion probability map computer 904. As shown, global/local motion probability map computer 904 may receive as input the merged 8×8 motion vectors $MMV_{8\times8}$ and the global motion vectors mapped to 8×8 block center ($GMV_{8\times8}$) and global/local motion probability map computer 904 may generate a global motion probability map, GLP.

For example, depending on the value of mdm, which controls the two input switches, $GMV_{8\times8}$ and $MMV_{8\times8}$ are used either in the form of magnitude (when mdm=0 and motion angle computers 911, 912 are bypassed) or in the form of angle (when mdm=1 and motion angle computers 911, 912 are utilized). $GMV_{8\times8}$ and $MMV_{8\times8}$ are also routed through a second pair and a third pair of switches to either motion magnitude absolute differencer and scaler 913 or to motion angle absolute differencer and scaler 914, which then determine the absolute difference at its input (e.g., as discussed above) and scales the resultant differences to the 0 to 255 range to generate the global/local motion probability map (GLP) that is then output via another switch controlled by the mdm value.

Discussion now turns to motion based region segmentation (MBRS). That is, discussion now turns to the functionality of a motion based region segmenter that may be implemented such that, depending on the scene (e.g., for a general scene), motion may be used as a primary cue to segment each frame of the scene into two spatially coherent and temporally consistent regions.

Figure 10A:
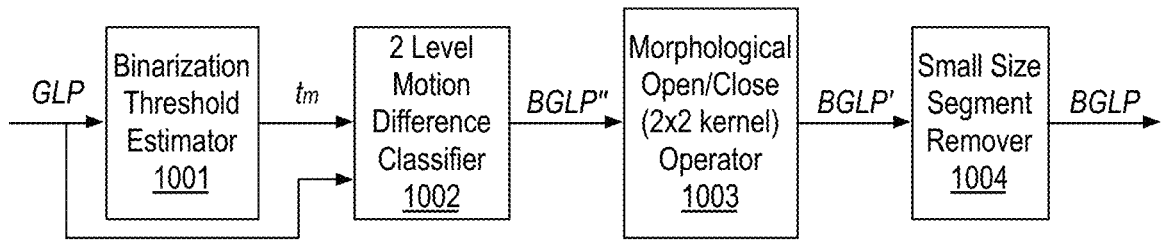
FIG. 10A illustrates a block diagram of an MBRS 2 regions generator using global/local motion probability map.

First, segmentation of frames of a scene into two regions using a global/local motion probability map is discussed. Since the processing for main segmentation is based on dominant motion, the described segmenter may be characterized as a MBRS (Motion Based Region Segmenter). FIG. 10A illustrates a block diagram of an MBRS 2 regions generator using global/local motion probability map 412, arranged in accordance with at least some implementations of the present disclosure. As shown, a global/local motion probability map GLP may be input to a binarization threshold estimator 1001 that determines a binarization threshold $t_m$ which when applied on the GLP map in a 2 level motion difference classifier 1002 may provide or result in a binarized map characterized as BGLP". The BGLP" map may then be cleaned up via morphological processing with kernel of size 2×2 in a morphological open/close (2×2 kernel) operator 1003 to provide an improved map characterized as BGLP'. The improved binarized map may then undergo segmentation noise removal in a small size segment remover 1004 to provide a final cleaned up binary GLP map characterized as a BGLP mask (e.g., a shown in FIG. 4).

Figure 10B:
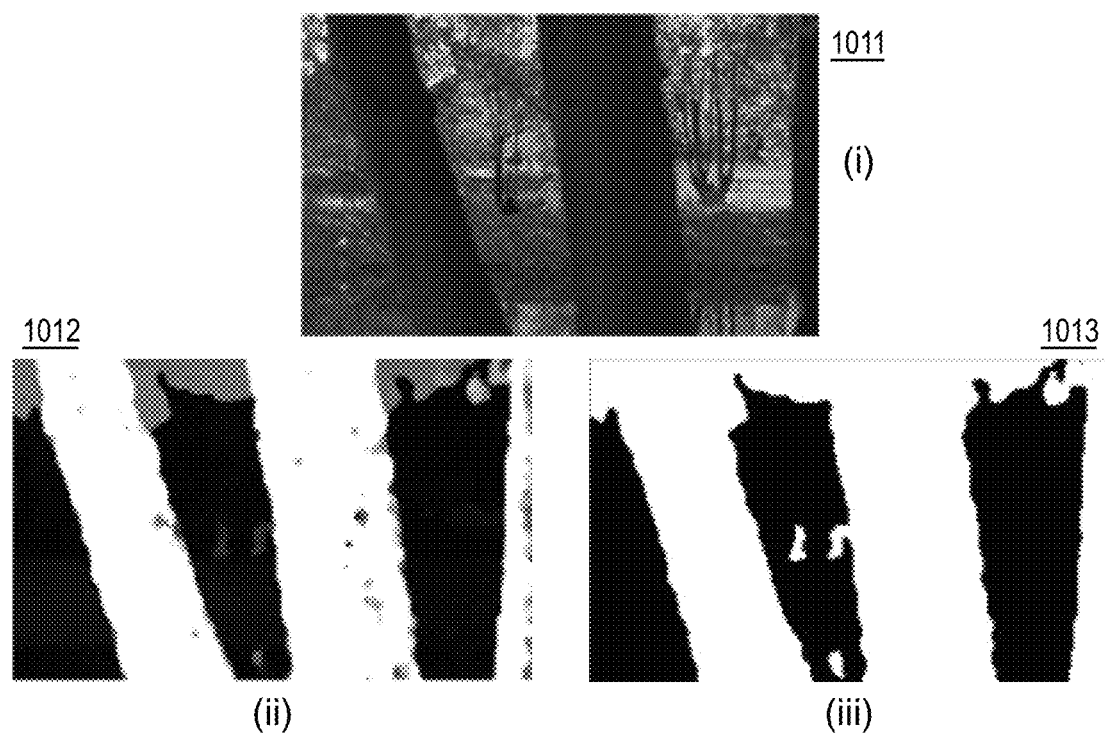
FIG. 10B illustrates example processing results based on motion segmenting techniques.

FIG. 10B illustrates example processing results based on the above described motion segmenting techniques, arranged in accordance with at least some implementations of the present disclosure. For example, the process described above is visually illustrated in FIG. 10B with respect to a frame of a Park Joy 1080p sequence. FIG. 10B(i) illustrates an example original frame 1011 of the video sequence. FIG. 10B(ii) illustrates an example global/local motion probability map GLP 1012 for original frame 1011. As shown, global/local motion probability map GLP 1012 illustrates predominantly three types of areas that correspond to the large tree trunks closest to the camera, branches/leaves of large trees, and rest of the scene at a depth farthest from camera. FIG. 10B(iii) illustrates an example final 2 region binarized GLP (BGLP) mask 1013 after undergoing intermediate steps of 2 level classification, morphological open/close processing, and small segment removal as discussed above. With respect to final 2 region binarized GLP (BGLP) mask 1013, black pixels and regions correspond to global motion and white pixels and regions correspond to non-global motion (local motion and/or dominant motion).

Discussion now turns to extending motion based (color assisted) region segmentation from segmentation of two regions to segmentation of many regions. Such segmentation may provide segmented regions that are spatially consistent and temporally coherent. For the purpose of example, discussion is directed to extending the 2 region segmentation to (up to) 6 regions, depending on the scene. However, segmentation into any number of regions may be provided.

Figure 11A:
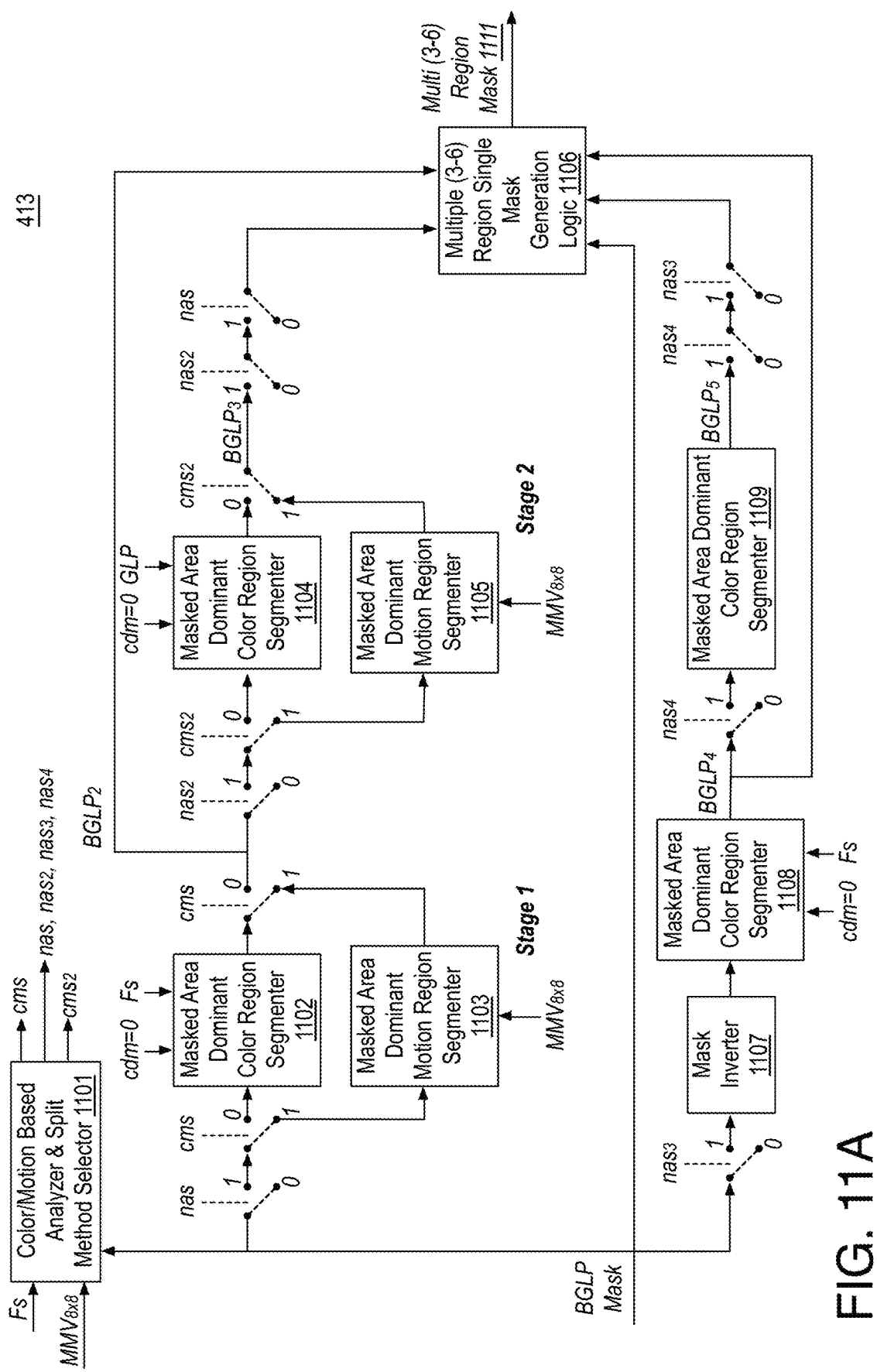
FIG. 11A illustrates a block diagram of an example MBRS regions splitter (color/motion) stages cascader.

FIG. 11A illustrates a block diagram of an example MBRS regions splitter (color/motion) stages cascader 413, arranged in accordance with at least some implementations of the present disclosure. As shown, MBRS regions splitter (color/motion) stages cascader 413 may include a number of stages that may be cascaded such that the greater the number of stages that are cascaded, the greater the number of regions that a scene may be segmented into. In some embodiments, each cascade stage may have 2 possible processing choices although a single processing path is also provided.

As discussed, the main segmentation process for motion based region segmentation results in 2 regions. As shown in FIG. 11A, since stage 1 splitting is performed both on global motion as well as non-global (local) motion, after stage 1 splitting either 3 or 4 regions result. Also as shown, when the first and second stage cascading are combined, up to 6 valid regions from segmentation may be provided. With the illustrated 2 stage cascading structure, a motion based region segmenter may allow segmentation of a frame into 2 to 6 regions.

With this overview of the functionality of MBRS regions splitter (color/motion) stages cascader 413, discussion now turns to an example implementation as shown in FIG. 11A As shown, the binary global/local motion probability mask BGLP (which may be characterized as $BGLP_1$) may be provided to a splitter and, along with subsampled frame Fs and 8×8 motion field $MMV_{8\times8}$ may be input to a color/motion based analyzer and split method selector 1101 that analyzes these inputs and generates a number of control signals such as a color/motion splitting method or methods represented by cms and $cms_2$ and a number of additional segments binary flags represented by nas, $nas_2$, $nas_3$, and $nas_4$ for the case of a two stage splitter. If nas or $nas_3$ are 0, the path for region splitting that is controlled by switches using these signals as controls, is disabled and no region splitting occurs. As shone, an a local motion (e.g., foreground) splitting path, binary signals nas and $nas_2$ are associated with a stage 1 and a stage 2, respectively. Likewise, on this path, the binary signals cms and $cms_2$ are also associated with stage 1 and 2, respectively. On the global motion (e.g., background) splitting path, binary signals $nas_3$ and $nas_4$ are associated with stage 1 and stage 2, respectively.

FIG. 11A illustrates processing of the BGLP mask on two parallel processing paths. The top path supports splitting of the local motion region and the bottom path supports splitting of global motion region of a frame. As shown, MBRS regions splitter (color/motion) stages cascader 413 may provide a two stage structure with various segmenters that may be employed in each of the two stages in the top path and the bottom path.

Along the top-path that processes potential splitting of local motion region in a frame, in stage, the nas signal is examined. If nas is 0, no further splitting is performed along this path. If nas is 1, the cms signal is examined. If it is 0, dominant color based region splitting is performed by masked area dominant color region segmenter 1102 for the masked area (e.g., area that is 1) of the BGLP mask resulting in a $BGLP_2$ mask. If cms is 1, dominant motion based region splitting is performed by masked area dominant motion region segmenter 1103 for the masked area (e.g., area that is 1) of the BGLP mask resulting in a $BGLP_2$ mask. In either case, the resulting $BGLP_2$ mask provides a splitting of region of 1 of the BGLP mask into two regions. As shown, this concludes the operation of the first stage of splitting of a local motion region. Discussion now turns to the second stage processing for this path.

For example, the second stage (e.g., that is cascaded to the first stage) is also provided along the same top path in FIG. 11A. As shown, the $BGLP_2$ mask at the output of the first stage passes through a switch controlled by the control signal $nas_2$ which, if set to 0 provides that, for the local motion region, there is no second stage of segmentation. If $nas_2$ is set to 1, the $BGLP_2$ mask passes to a next switch controlled by the control signal $cms_2$. If $cms_2$ is 1, the $BGLP_2$ mask undergoes further region splitting by masked area dominant motion region segmenter 1105, which splits the masked area of $BGLP_2$ (e.g., area that is 1) based on dominant motion, resulting in a $BGLP_3$ mask. If $cms_2$ is 0, the $BGLP_2$ mask undergoes further region splitting by masked area dominant color region segmenter 1104, which splits the masked area of $BGLP_2$ (e.g., area that is 1) based on dominant color resulting in a $BGLP_3$ mask. In either event, if a $BGLP_3$ is generated, the mask is provided to multiple region single mask generation logic 116 as discussed further herein.

As shown in FIG. 11A, along a bottom-path of MBRS regions splitter (color/motion) stages cascader 413, which processes potential splitting of a global motion region in a frame, in a first stage, the $nas_3$ signal is examined. If $nas_3$ is 0, no further splitting is performed along this path. If $nas_3$ is 1, the BGLP mask is inverted by mask inverter 1107 to convert a global motion region to 1 (from 0) in the inverted mask. Next, for the global motion region, a dominant color is determined for the global motion region and the global motion region is split by masked area dominant color region segmenter 1108 to generate a $BGLP_4$ mask. T As shown, this concludes the operation of the first stage of splitting along the bottom path of MBRS regions splitter (color/motion) stages cascader 413.

Discussion no turns to the second stage (e.g., that is cascaded to the first stage) along the same bottom path of MBRS regions splitter (color/motion) stages cascader 413. As shown, the $BGLP_4$ mask at the output of the first stage passes through a switch controlled by the control signal $nas_4$ which if set to 0 provides that, for segmentation based on global motion, there is no second stage. If $nas_4$ is set to 1, the $BGLP_4$ mask undergoes further region splitting by masked area dominant color region segmenter 1109, which splits the masked area of $BGLP_4$ (e.g., area that is 1) based on dominant color resulting in a $BGLP_5$ mask.

Finally, as shown, the original (BGLP) mask as well as the various generated ($BGLP_2$, $BGLP_3$, $BGLP_4$, and $BGLP_5$) masks, if applicable, may be input to a multiple region single mask generation logic 1106 that merges masks to generate a single multi-region map 1111. For example, single multi-region map (or mask) 1111 may indicate on a pixel-by-pixel basis or region-by-region basis or the like which of the region layers the pixel or region of the current frame belongs.

Figure 11B:
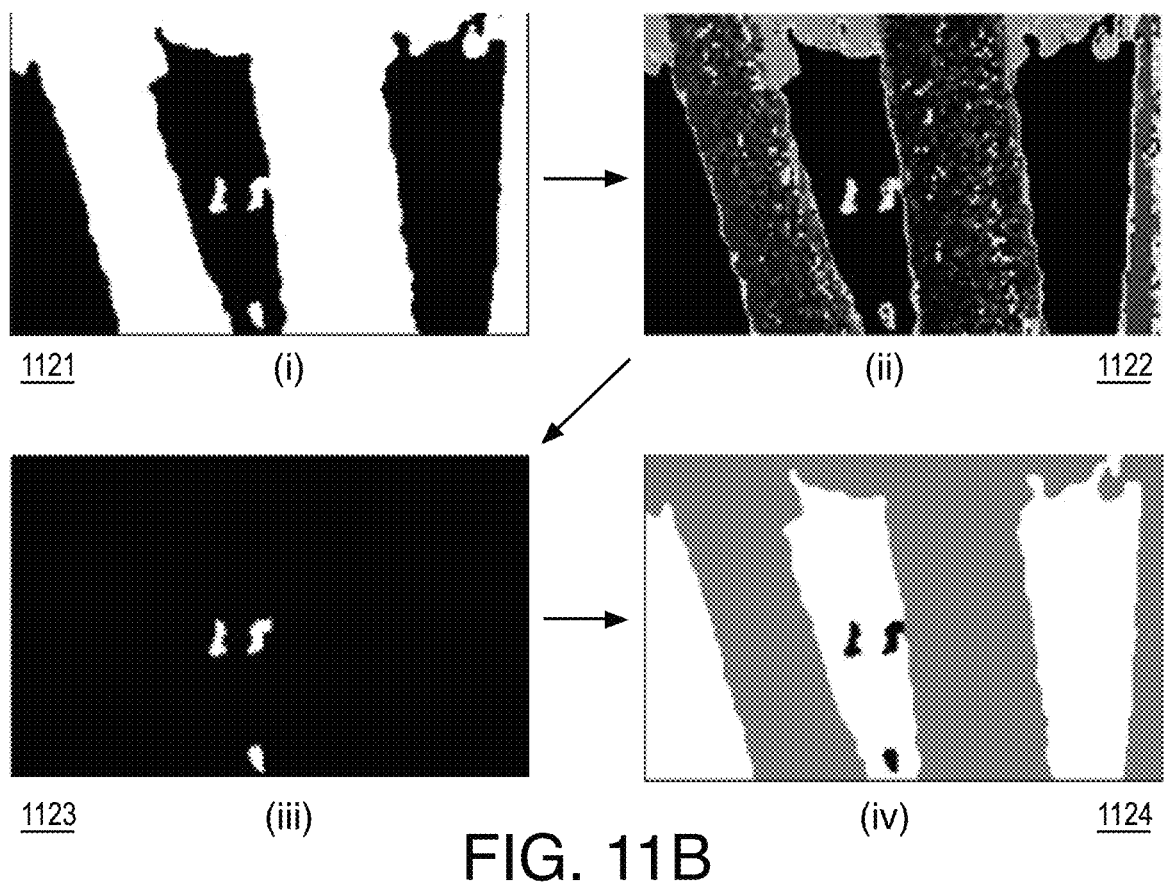
FIG. 11B illustrates example processing results based on multiple region splitting techniques.

FIG. 11B illustrates example processing results based on the above described multiple region splitting techniques, arranged in accordance with at least some implementations of the present disclosure. FIG. 11B presents an example illustrating steps in the region-splitting per MBRS region splitter with respect to a Park Joy 1080p video sequence. In the illustrated example, a binary (2 region) global/local probability (BGLP) mask 1121 that results from the main 2 region segmentation discussed herein such that a local motion region (e.g., a foreground with values of 1, in white) is separated from a global motion region (e.g., with values of 0, in black) is shown in FIG. 11B(i). FIG. 11B(ii) illustrates an example motion vector difference map 1122 based on dominant motion magnitude difference, which in conjunction with global/local probability (BGLP) mask 1121 may provide a binarized global/local probability mask $BGLP_2$ 1123 illustrated in FIG. 11B(iii) that shows non-dominant local motion regions. Finally, merging binarized global/local probability (BGLP) mask 1121 and binarized global/local probability mask $BGLP_2$ 1123 results in a 3 region mask 1124 illustrated in FIG. 11B(iv).

Discussion now turns to components of MBRS regions splitter (color/motion) stages cascader 413, which, as discussed includes masked area dominant color region segmenter 1102, masked area dominant motion region segmenter 1103, mask inverter 1107, and multiple region single mask generation logic 1106. Mask inverter 1107 (e.g., a masked area mask inverter) may perform a pre-processing function of bit inversion to provided that the region being split is represented as 1 in the mask. Multiple region single mask generation logic 1106 may perform a post-processing function of combining several binary masks to generate a single coherent multi-level mask (e.g., region mask) such each region is represented by a different color or value. Discussion now turns to other components of MBRS regions splitter (color/motion) stages cascader 413.

Figure 11C:
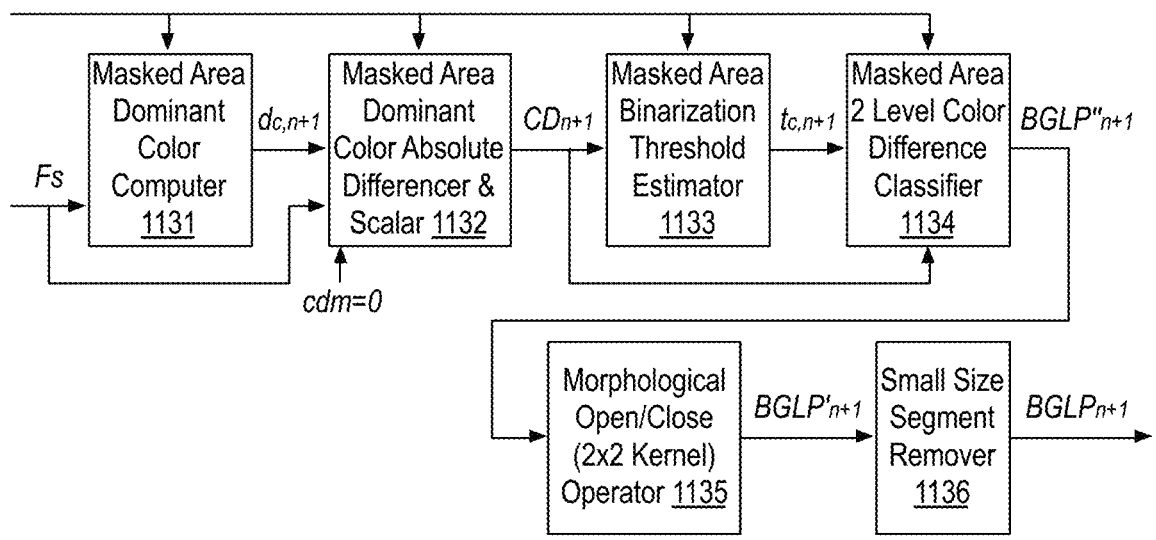
FIG. 11C illustrates a block diagram of an example masked area dominant color region segmenter.

FIG. 11C illustrates a block diagram of an example masked area dominant color region segmenter 1102, 1404, 1108, 1109, arranged in accordance with at least some implementations of the present disclosure. As shown, the binary global/local probability ($BGLP_n$) mask may be input along with the downsampled current frame to a masked area dominant color computer 1131 that may use the portion of the $BGLP_n$ mask that is 1 to determine and output the dominant color $d_{c\ n+1}$ for that portion. For example, the dominant color may be determined by using the masked area (e.g., where the mask is 1) in $BGLP_n$ to determine a (YUV) three color $H=(H_Y, H_U, H_V)$ histogram and correlating the three histograms to select peak values to find a single corresponding dominant color $d_{c\ n+1}$ as discussed elsewhere herein.

As shown, the dominant color $d_{c\ n+1}$, the downsampled image Fs, and the $BGLP_n$ mask are input to a masked area dominant color absolute differencer and scaler 1132 where, for the masked region (e.g., the region of is in $BGLP_n$), the YUV pixels of the downsampled frame are subtracted from the dominant color $d_{c\ n+1}$, an absolute value is taken and the value is scaled, resulting in dominant color probability map $CD_{n+1}$ in analogy to the techniques for a full frame as discussed herein. A binarization threshold $t_{c\ n+1}$ may be determined based on the color histogram (e.g., the threshold may correspond to a valley or valleys in the histogram) by masked area binarization threshold estimator 1133, which also takes as an input the $BGLP_n$ mask. Next, the binarization threshold $t_{c\ n+1}$ is applied to the $CD_{n+1}$ mask in the masked area (e.g., where it is 1) given by $BGLP_n$ by masked area 2 level color difference classifier 1134 to generate a new binarized mask $BGLP''_{n+1}$. The binarized mask $BGLP'''_{n+1}$ mask may then undergo morphological processing cleanup by morphological open/close operator 1435, resulting in an improved $BGLP'_{n+1}$ mask. The $BGLP'_{n+1}$ mask may undergo further processing to remove small segments by a small size segments remover 1136 resulting in the $BGLP_{n+1}$ mask at the output of the segmenter.

Figure 11D:
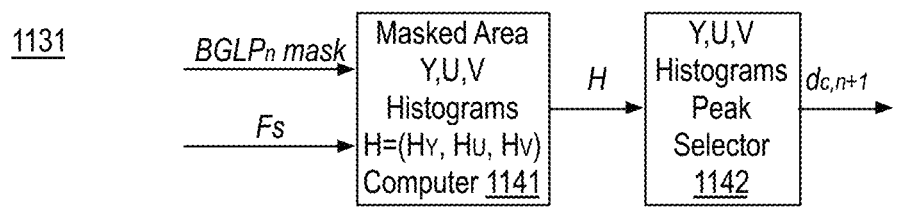
FIG. 11D illustrates a block diagram of an example masked area dominant color computer.

Discussion now turns to the subset of the block diagram of FIG. 11C that is involved in dominant color determination for the masked area. FIG. 11D illustrates a block diagram of an example masked area dominant color computer 1131, arranged in accordance with at least some implementations of the present disclosure. As shown, masked area dominant color computer 1131 may include a masked area Y,U,V histograms $H=(H_Y, H_U, H_V)$ computer 1141 and a Y,U,V histograms peak selector 1142. First, masked area Y,U,V histograms $H=(H_Y, H_U, H_V)$ computer 1141 may generate three histograms, one for each channel of the masked area of the subsampled YUV 4:4:4 frame. Next, Y,U,V histograms peak selector 1142 may determine the highest peak (e.g., the most frequently occurring value) of the histograms for each of the Y, U and V channel. This YUV combination color of the peak is determined to be the dominant color, dc. Such processing may be analogous to the full frame processing discussed herein.

Figure 11E:
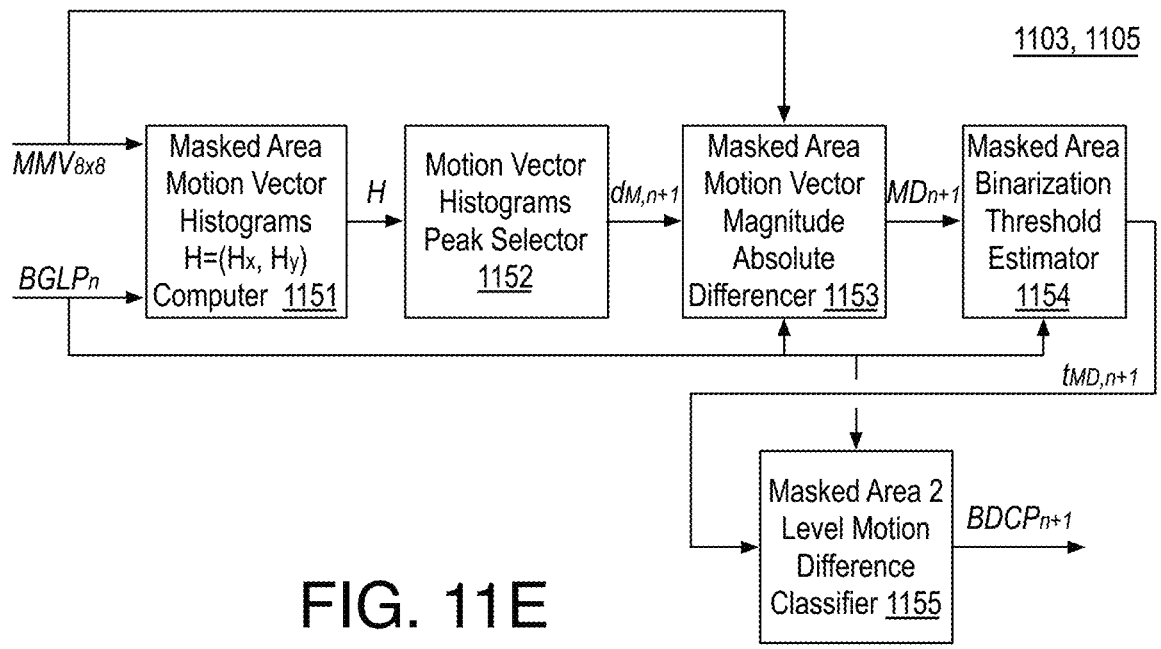
FIG. 11E illustrates a block diagram of an example masked area dominant motion region segmenter.

FIG. 11E illustrates a block diagram of an example masked area dominant motion region segmenter 1103, 1109, arranged in accordance with at least some implementations of the present disclosure. As shown, the binary dominant color probability mask $BGLP_n$ is input along with 8×8 block motion vectors (e.g., merged motion vectors $MMV_{8\times8}$) to a masked area motion vector histogram $H=(Hx, Hy)$ computer 1151 which computes the histogram H for the region in which $BGLP_{n+1}$ mask is 1 provides the histogram to a motion vector histograms peak selector 1152 that determines and correlates the x and y motion vector histogram peaks and to determine and output the dominant motion vector $d_{M\ n+1}$.

Also as shown, the $BGLP_n$ mask, the 8×8 block motion vectors $MMV_{8\times8}$, and the dominant motion vector $d_{M\ n+1}$ are input to a masked area motion vector magnitude absolute differencer 1153 that determines, for the area under the mask (e.g., as represented by 1) the difference of magnitude of each 8×8 motion vector of the 8×8 block motion vectors $MMV_{8\times8}$ and the dominant motion vector and further determines its absolute value to provide a dominant motion difference field $MD_{n+1}$. The $MD_{n+1}$ field may be input with the $BGLP_n$ mask to a masked area binarization threshold estimator 1154 that determines a threshold $t_{mD\ n+1}$ and inputs it along with the $BGLP_n$ mask to a masked area 2 level motion difference classifier 1155 that provides a modified mask characterized as $BGLP_3$ that represents a dominant motion based splitting of the input $BGLP_n$ mask in analogy to the binarized global/local probability map discussed herein. For example, masked area 2 level motion difference classifier 1155 may generate a dominant/non-dominant map or mask or the like.

Furthermore, although discussed with respect to masked region dominant motion, masked area dominant motion region segmenter 1103, 1109 may be applied to a full frame. For example, masked area dominant motion region segmenter 1103, 1109 may be provided within motion based color assisted region segmentation system 400 such that masked area dominant motion region segmenter 1103, 1109, which may, in the context of system 400, be characterized as a dominant motion region segmenter. The dominant motion region segmenter may receive the discussed 8×8 block motion vectors $MMV_{8\times8}$ for YUV frame 411. The dominant motion region segmenter may generate motion vector histograms (e.g., by a motion vector histograms computer in analogy with a masked area motion vector histogram $H=(Hx, Hy)$ computer 1151), determine a dominant motion vector (e.g., by a motion vector histograms peak selector in analogy to motion vector histograms peak selector 1152), generate a motion vector difference field (e.g., by a motion vector magnitude absolute differencer in analogy to masked area motion vector magnitude absolute differencer 1153), determine a binarization threshold (e.g., by a binarization threshold estimator in analogy to masked area binarization threshold estimator 1154), and generate a binary dominant motion/non-dominant motion mask that splits YUV frame 411 into two regions based on dominant motion (e.g., by a 2 level motion difference classifier 1155 in analogy to masked area 2 level motion difference classifier 1155). The binary dominant motion/non-dominant motion mask may undergo morphological processing and/or small segment removal (e.g., as discussed with respect to FIG. 10A) and the refined binary dominant motion/non-dominant motion mask may be optionally provided to 8-pel motion region boundary to 4-pel motion region boundary refiner 414 to generate a final 2 regions mask as discussed herein. In addition or in the alternative, the binary dominant motion/non-dominant motion mask may be provided to MBRS regions splitter (color/motion) stages cascader 413 for additional segmentation as discussed herein with respect to binarized global/local probability maps or masks.

Figure 12A:
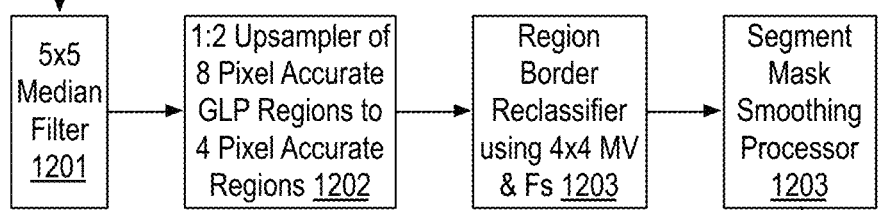
FIG. 12A illustrates a block diagram of an example 8-pel motion region boundary to 4-pel motion region boundary refiner.

FIG. 12A illustrates a block diagram of an example 8-pel motion region boundary to 4-pel motion region boundary refiner 414, arranged in accordance with at least some implementations of the present disclosure. As shown, multiple (typically 2-6) regions boundary segmented BGLP maps are input to a 5×5 median filter 1201 for reduction of noise at object boundaries and to generate continuous homogeneous regions.

Figure 12B:
FIG. 12B illustrates example processing results of median filtering.
Figure 12B:

FIG. 12B illustrates example processing results 1210 of median filtering, arranged in accordance with at least some implementations of the present disclosure. For example, FIG. 12B illustrates example processing results 1210 as provided by 5×5 median filter 1201. In FIG. 12B(i), example segmented regions 1211 are illustrated prior to 5×5 median filtering and FIG. 12B(ii) illustrates segmented regions 1212 after 5×5 median filtering. As shown, such 5×5 median filtering or similar filtering provides smoother segmented regions.

Returning to FIG. 12A, the median filtered mask is upsampled by factor of 1:2 in each dimension such that 8-pixel region boundary maps are upsampled to 4-pixel region boundary maps by a 1:2 upsampler of 8 pixel accurate GLP regions to 4 pixel accurate regions module 1202. Such upsampling process may not improve the region boundaries. However, the following operations as provided by region border reclassifier using 4×4 MV and Fs, 1203 and segment mask smoothing processor 1203 may improve such region boundaries to provide a multi BGLP regions at 4 pixel accuracy.

For example, region border reclassifier using 4×4 MV and Fs, 1203 may use 4×4 MVs to correct the location of some region boundary features that were incorrectly placed by 1:2 upsampling of 8-pixel accurate region boundary to improve resolution resulting in an initial refined region boundary. This initial refined region boundary may be smoothed further by segment mask smoothing processor 1203 to provide the refined region boundary.

Figure 12C:
FIG. 12C illustrates example processing results of border refinement.
Figure 12C:
Figure 13A:
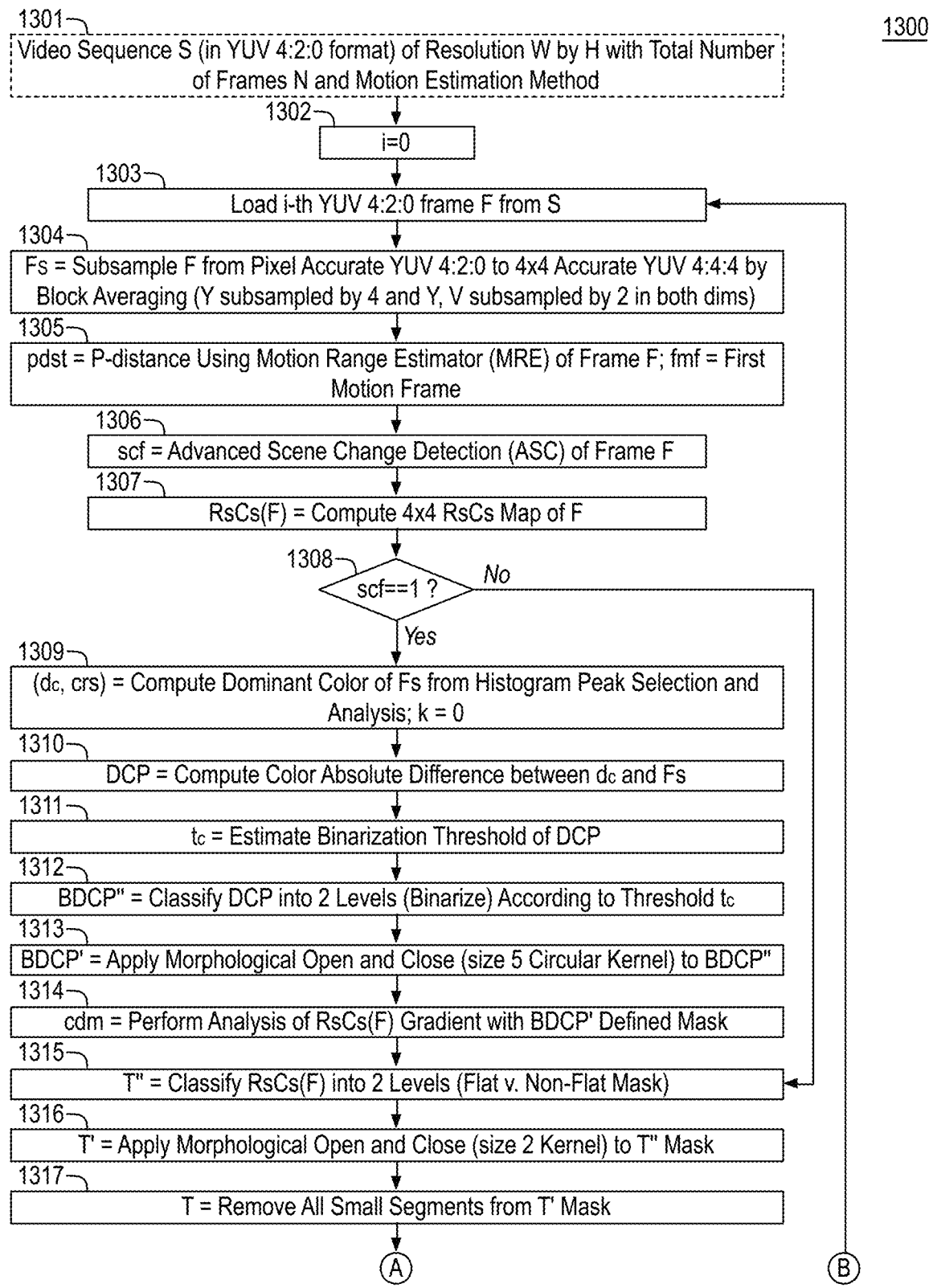
FIGS. 13A, 13B, 13C, and 13D illustrates an example method for segmenting video frames into region layers.
Figure 13B:
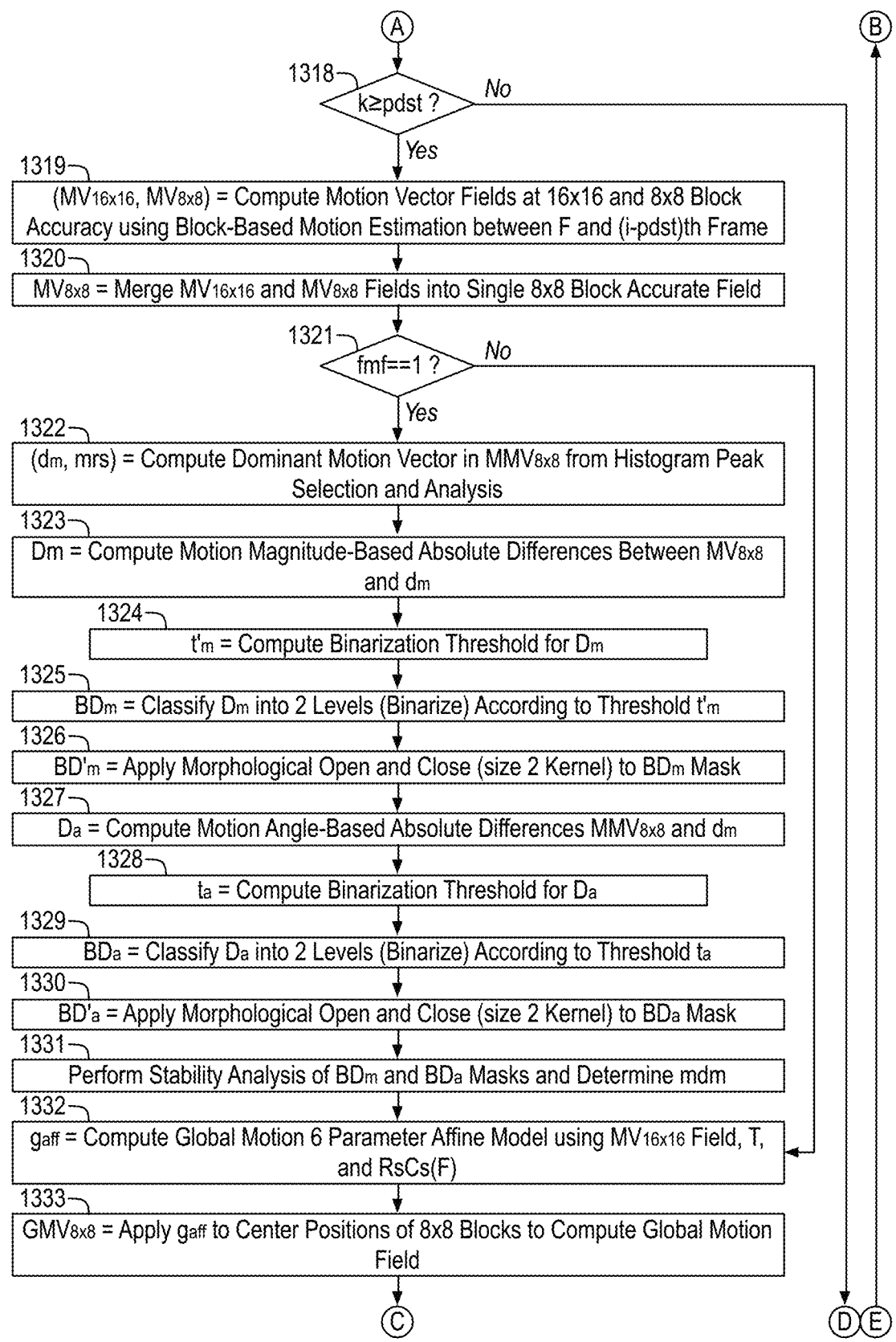
Figure 13C:
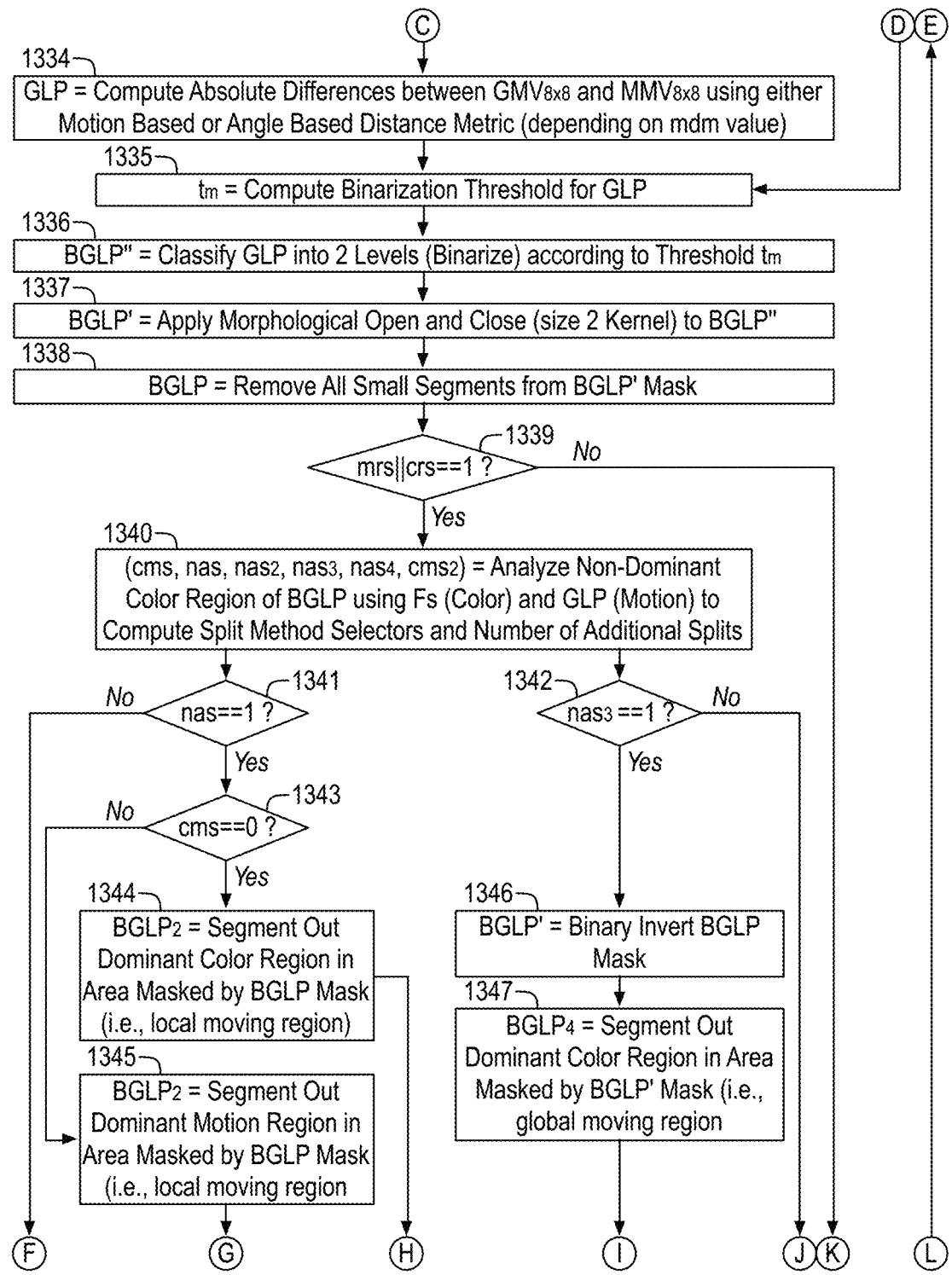
Figure 13D:
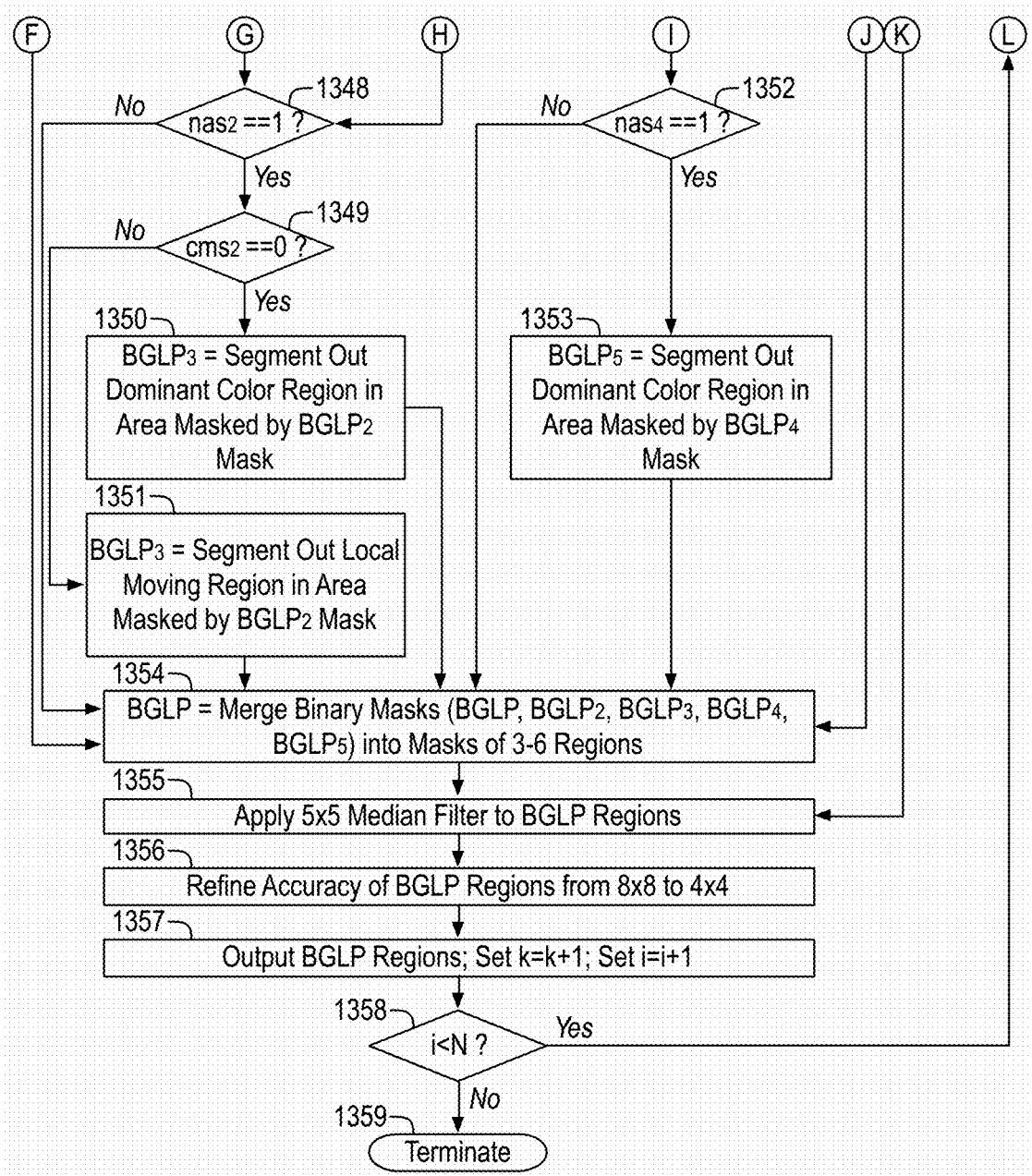

FIG. 12C illustrates example processing results 1220 of border refinement, arranged in accordance with at least some implementations of the present disclosure. For example, FIG. 12C illustrates example processing results 1220 as provided on an example Seeking video sequence at 1080p. In FIG. 12C(i), an example 8 pixel accurate border 1221 (e.g., an 8 pixel accurate segmented region) is illustrated and FIG. 12C(ii) illustrates an example refined 4 pixel accurate border 1222 (e.g., a 4 pixel accurate segmented region) that exhibits removal of large blocky discontinuous region boundaries and smoother transitions at region boundaries.

FIGS. 13A, 13B, 13C, and 13D illustrates an example method 1300 for segmenting video frames into region layers, arranged in accordance with at least some implementations of the present disclosure. For example, process 1300 may be implemented to segment video frames or pictures into any number of region layers as discussed herein. In the illustrated implementation, process 1300 may include one or more operations as illustrated by operations 1301-1359. However, embodiments herein may include additional operations, certain operations being omitted, or operations being performed out of the order provided.

In the example method 1300, a detailed flowchart is provided that illustrates the flow of data and control signals through six functional processing groups: a preprocessing group, a color and texture analysis group, a local and global motion analysis group, a motion based 2 regions segmentation group, a motion region splitting segmentation group, and a motion region boundary refinement group. Each processing group may include one or more processing subgroups and or processing functions as follows. The preprocessing group may include downsampling, p distance determination, scene change detection, and texture gradient (Rs,Cs) map determination. The color and texture analysis group may include color analysis and color distance method selection and texture distribution computation. The local and global motion analysis group may include 16×16 and 8×8 block motion estimation, 8×8 block motion merging, global motion estimation, and global/local motion probability map computation. The motion based 2 regions segmentation group may include 2 regions based on global/local motion probability map determination. The motion region splitting segmentation group may include one or more of color/motion analysis and splitting method selection, masked area dominant color region segmentation, masked area dominant motion region segmentation, and merging masks for single multi-color map generation. The motion region boundary refinement group may include 8-pel to 4-pel motion region boundary refinement.

As shown, processing may begin at operation 1301, where a video sequence S of video frames in any format such as a YUV 4:2:0 format at any resolution (e.g., W×H) having any number of frames (e.g., N frames) and a motion estimation method selection may be received. Processing may continue at operation 1302, where a counter variable i may be initialized to 0. Processing may continue at operation 1303, where the i-th frame may be loaded or received for processing. Processing may continue at operation 1304, where a downsampled frame Fs may be determined or downsampled from the pixel accurate YUV 4:2:0 frame to a 4×4 accurate YUV 4:4:4 frame by block averaging (Y downsampled by 4 and U, V downsampled by 2 in both dimensions). Processing may continue at operation 1305, where a p-distances pdst may be determined using a motion range estimator based on frame F to determine a best reference frame for motion estimation for the current frame F. When the current frame is a first frame or the like a control signal fmf may be set to indicate the current frame is a first motion frame. Processing may continue at operation 1306, where a scene change detection may be performed for frame F to determine whether the current frame is a scene change frame. If so, a control signal scf may be set to indicate the current frame is a scene change frame. Processing may continue at operation 1307, where vertical texture (or gradients) Rs, horizontal texture (or gradients) Cs, and combined texture (or gradients) RsCs may be determined for the current frame on a 4×4 block basis or the like. Such operations may provide a preprocessing group of operations.

Processing may continue at decision operation 1308, where a determination may be made as to whether the current frame is a scene change frame. If not, processing may continue at operation 1315 as discussed below. If so, processing may continue at operation 1309, where a dominant color $d_c$ and a color region splitting signal may be determined for the current frame. For example, the dominant color may be determined based on a color histogram generation and histogram peak selection and analysis as discussed herein.

Processing may continue at operation 1310, where a dominant color probability map DCP may be determined for the current frame based on a determination of a color absolute difference between the downsampled frame and the dominant color. Processing may continue at operation 1311, where a dominant color binarization threshold $t_c$ may be determined for the current frame. Processing may continue at operation 1312, where a binarized dominant color probability map BDCP" may be determined for the current frame by classifying each probability of the dominant color probability map into two levels according to the dominant color binarization threshold. Processing may continue at operation 1313, where a morphological open and close operation (e.g., size 5 circular kernel) may be applied to the binarized dominant color probability map from operation 1312 to generate a binarized dominant color probability map BDCP'. Processing may continue at operation 1314, where a color differencing method cdm control signal and a color/motion splitting method csm control signal may be determined based on an analysis of the combined texture (or gradients) RsCs generated at operation 1307. Processing may continue at operation 1315, where a texture measure or map T" may be generated by classifying each block of RsCs into two levels (e.g., a flat or non-flat mask) based on a flat/non-flat threshold. Processing may continue at operation 1316, where a morphological open and close operation (e.g., size 2 kernel) may be applied to the texture map T" to generate a texture map T'. Processing may continue at operation 1317, where small segments may be removed from the texture map T' to generate a final texture map T for the current frame. Such operations may provide a color and texture analysis group of operations.

Processing may continue at decision operation 1318, where a determination may be made as to whether a counter variable k is greater than or equal to the p distance determined at operation 1305. If not, processing may continue at operation 1335 as discussed below. If so, processing may continue at operation 1319, where motion vector fields at 16×16 ($MV_{16×16}$) and 8×8 ($MV_{8×8}$) block accuracy may be determined using block-based motion estimation between the current frame F and a reference fame (e.g., the frame at i minus pdst). Processing may continue at operation 1320, where the 16×16 motion vector field and the 8×8 motion vector field may be merged into a single 8×8 block accurate motion vector field $MV_{8\times8}$.

Processing may continue at decision operation 1321, where a determination may be made as to whether the current frame is a first motion frame. If not, processing may continue at operation 1332 as discussed below. If so, processing may continue at operation 1322, where a dominant motion vector $d_m$ in the motion vector field and a motion region splitting control flag may be determined based on a motion vector field histogram peak selection and analysis. Processing may continue at operation 1323, where motion magnitude-based absolute differences Dm may be determined based on the motion vector field and the dominant motion vector by differencing each motion vector in the motion vector field with the dominant motion vector. Processing may continue at operation 1324, where a binarization threshold $t'_m$ (magnitude-based) for the motion vector differences may be determined. Processing may continue at operation 1325, where the motion vector differences may be binarized by 2 level classification according to the binarization threshold to generate a binary motion vector differences mask $BD_m$ (magnitude-based). Processing may continue at operation 1326, where a morphological open and close operation (e.g., size 2 kernel) may be applied to the binary motion vector differences mask $BD_m$ to generate a binary motion vector differences mask $BD'_m$ (magnitude-based). Processing may continue at operation 1327, where motion angle-based absolute differences Da may be determined based on the motion vector field and the dominant motion vector. Processing may continue at operation 1328, where a binarization threshold to (angle-based) for the motion vector differences may be determined. Processing may continue at operation 1329, where the motion vector differences may be binarized by 2 level classification according to the binarization threshold to generate a binary motion vector differences mask $BD_a$ (angle-based). Processing may continue at operation 1330, where a morphological open and close operation (e.g., size 2 kernel) may be applied to the binary motion vector differences mask $BD_a$ to generate a binary motion vector differences mask $BD'_a$ (angle-based). Processing may continue at operation 1331, where a stability analysis of the binary motion vector differences mask $BD_m$ (magnitude-based) and the binary motion vector differences mask $BD_a$ (angle-based) may be performed and a motion differencing method mdm signal may be generated. Processing may continue at operation 1332, where a global motion model (e.g., 6 parameter affine model gaff or 8 parameter perspective model $g_{persp}$) may be fit to the current frame based on the 16×16 block accuracy motion vector field, the final texture map T, and the combined texture (or gradients) RsCs. Processing may continue at operation 1333, where the global motion model may be applied to center positions of 8×8 blocks to generate a global motion vector field $GMV_{8\times8}$. Processing may continue at operation 1334, where absolute differences between the global motion vector field and the local motion vector field may be determined using the magnitude-based or angle-based (e.g., depending on the motion differencing method value) differencing method or distance metric to generate and/or map to a global/local probability map GLP. Such operations may provide a local and global analysis group of operations.

Processing may continue at operation 1335, where a binarization threshold $t_m$ for the global/local probability map may be determined. Processing may continue at operation 1336, where a binarized global/local probability map BGLP''' may be determined by classifying each probability of the global/local probability map into two levels according to the binarization threshold. Processing may continue at operation 1337, where a morphological open and close operation (e.g., size 2 kernel) may be applied to the binarized global/local probability map BGLP''' to generate a binarized global/local probability map BGLP''. Processing may continue at operation 1338, where small segments may be removed from the binarized global/local probability map BGLP' to generate a final binarized global/local probability map BGLP. Such operations may provide a motion based main 2 regions segmentation group of operations.

Processing may continue at decision operation 1339, where a determination may be made as to whether the motion region splitting signal and/or the color region splitting signal is true. If not, processing may continue at operation 1354 as discussed below. If so, processing may continue at operation 1340, where the non-dominant color region of binarized global/local probability map BGLP may be analyzed using Fs (color) and GLP (motion) to determine split method selectors or signals and the number of additional splits as indicated by the control signals color/motion splitting method cms, control signals color/motion splitting method $cms_2$, number of additional segments nas, and number of additional segments $nas_2$, $nas_3$, and $nas_4$.

As shown, processing may continue from operation 1340 at decision operations 1341 and 1342. At decision operation 1341, a determination may be made as to whether segmenting into additional segments is indicated based on nas. If not, processing may continue at operation 1354 as discussed below. If so, processing may continue at decision operation 1343, where a determination may be made as to whether the control signal color/motion splitting method cms indicates dominant color only splitting. If so, processing may continue at operation 1344, where a dominant color region may be split out or segmented from the area masked by the BGLP mask (i.e., the local moving region) to generate a binarized global/local probability map or mask $BGLP_2$ that further segments the local moving region of the binarized global/local probability map BGLP. If not, processing may continue at operation 1345, where a dominant motion region may be split out or segmented from the area masked by the BGLP mask (i.e., the local moving region) to generate a binarized global/local probability map $BGLP_2$ that further segments the local moving region of the binarized global/local probability map BGLP.

In either case, processing may continue at decision operation 1348, where a determination may be made as to whether segmenting into additional segments is indicated based on $nas_2$. If not, processing may continue at operation 1354 as discussed below. If so, processing may continue at decision operation 1349, where a determination may be made as to whether the control signals color/motion splitting method $cms_2$ indicates dominant color only splitting. If so, processing may continue at operation 1350, where a dominant color region may be split out or segmented from the area masked by the binarized global/local probability map $BGLP_2$ to generate a binarized global/local probability map $BGLP_3$ that further segments the binarized global/local probability map $BGLP_2$. If not, processing may continue at operation 1351, where local moving regions may be split out or segmented from the area masked by the binarized global/local probability map $BGLP_2$ to generate a binarized global/local probability map $BGLP_3$ that further segments the binarized dominant color probability map $BGLP_2$. In either case, processing may continue at operation 1354 as discussed below.

Furthermore, processing may continue from operation 1340 at decision operation 1342, where a determination may be made as to whether segmenting into additional segments is indicated based on nas$_3$. If not, processing may continue at operation 1354 as discussed below. If so, processing may continue at decision operation 1346, where the binarized global/local probability map BGLP may be bit-wise inverted to generate a binarized global/local probability map BGLP'. Processing may continue at operation 1347, where a dominant color region may be split out or segmented from the area masked by the binarized global/local probability map BGLP' (i.e., global moving regions) to generate a binarized global/local probability map BGLP$_4$ (e.g., further splitting the global moving region based on a dominant color within that region) that further segments the binarized dominant global/local map BGLP'.

Processing may continue at decision operation 1352, where a determination may be made as to whether segmenting into additional segments is indicated based on nas$_4$. If not, processing may continue at operation 1354 as discussed below. If so, processing may continue at operation 1353, where a dominant color region may be split out or segmented from the area masked by the binarized global/local probability map BGLP$_4$ to generate a binarized global/local probability map BGLP$_5$ (e.g., further splitting dominant color region of the global moving region based on a dominant color within that region) that further segments the binarized dominant global/local map BGLP$_4$. Processing may continue at operation 1354 (as well as from one or more of decision operation 1341, decision operation 1348, operation 1350, operation 1351, decision operation 1342, decision operation 1352, and operation 1353), where the binarized global/local probability maps (e.g., binary masks) as applicable may be merged into masks of 3-6 regions. Such operations may provide a motion region splitting segmentation group of operations.

Processing may continue at operation 1355, where a median filter such as a 5×5 median filter may be applied to the BGLP regions discussed above. Processing may continue at operation 1356, where the accuracy of the BGLP regions may be refined from an accuracy of 8×8 pixels to an accuracy of 4×4 pixels. Such operations may provide a motion region boundary refinement group of operations.

Processing may continue at operation 1357, where the binarized global/local probability map BGLP-based region layers may be output (e.g., to provide a final region layer mask having 2-6 regions and indicating the region layer of each pixel in the current frame F). Furthermore, the counter variables k and i are incremented. Such operations may provide a non-dominant color region splitting segmentation group of operations. Processing may continue at decision operation 1358, where a determination may be made as to whether the current frame is the last frame in the sequence. If not, processing may continue at operation 1303. If so, processing may end at termination operation 1359.

Discussion now turns to a combined adaptive system to automatically detect whether, for a given video scene or sequence, a main 2 region segmentation should be based on dominant color or local/global motion.

Figure 14:
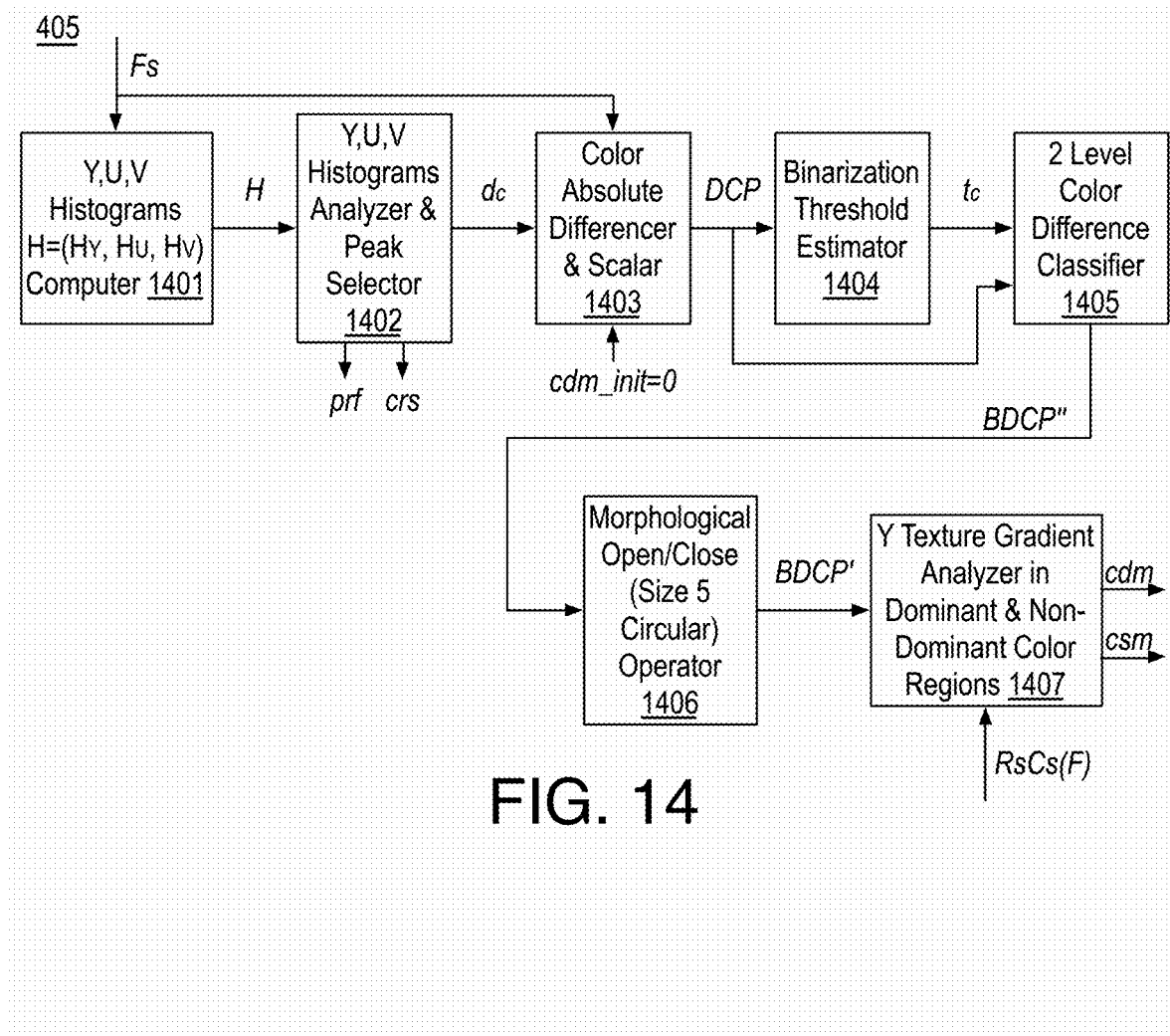
FIG. 14 illustrates a block diagram of an example color analyzer and color based splitting selector.

FIG. 14 illustrates a block diagram of an example color analyzer and color based splitting selector 405, arranged in accordance with at least some implementations of the present disclosure. For example, color analyzer and color based splitting selector 405 may provide an extended color cue analysis system referred to here as color analyzer, segmentation, color distance method and splitting selector. As shown, extended color cue generation may includes generating various signals that color based region segmentation and motion based region segmentation may require such as the color differencing method cdm, the color separation method csm, the color region splitter crs, the dominant color d$_c$, as well as a new signal characterized as prf that indicates, for a new scene, whether color or motion based segmentation should be used.

Various aspects of processing-blocks such as YUV histograms H=(H$_Y$, H$_U$, H$_V$) computer 1401, Y,U,V histograms analyzer and peak selector 1402, color absolute differencer and scaler 1402, binarization threshold estimator 1404, 2 level color difference classifier 1405, morphological open/close operator 1406, and Y texture gradient analyzer in dominant and non-dominant color regions have been discussed herein.

For example, color analyzer, color distance method and splitting selector 405 may determine, by color content analysis, the properties and distribution of color, based on which a color separation method (csm), a dominant color differencing method (cdm), and whether color region splitting (crs) can be performed, is selected. As shown in FIG. 14, a downsampled frame may be provided to Y,U,V histograms H=(H$_Y$, H$_U$, H$_V$) computer 1401, which may, for each of the Y, U, V components of a subsampled frame Fs, generate individual color histograms (H$_Y$, H$_U$, H$_Y$) referred to together as H. The histograms may then form an input to a Y,U,V histograms analyzer and peak selector 1402, which may determine the dominant color d$_c$ and a color region splitter flag crs (discussed further herein below). The techniques used for dominant color detection are discussed via example further herein below.

Next, in color absolute differencer and scaler 1403, each pixel of the subsampled frame may be differenced with the dominant color and its absolute value may be taken and mapped to an interval 0 to 255 or the like to provide a dominant color probability map (DCP). Based on the dominant color probability map, a threshold for binarization t$_c$ may be determined by binarization threshold estimator 1404. The threshold for binarization may be determined using any suitable technique or techniques. As shown, the DCP map and the threshold t$_c$ may be input to 2 level color difference classifier 1405, which may binarize the DCP based on threshold t$_c$ and output an initial binarized mask BDCP", which may be input to morphological open/close (size 5 circular) operator 1406, which may determine and output a morphologically cleaned up mask BDCP' that forms one input (with the other input being RsCs(F) map) to a Y texture gradient analyzer in dominant and non-dominant color regions generator 1407 that may determine and output the determined values of csm and cdm flags.

For example, there may be two choices for csm. If csm=0, the global/local motion probability map, GLP, will be used to enhance segmentation quality. On the other hand, if csm=1, then GLP is not used (e.g., as in low detail blocks motion vectors are random resulting in unstable/less-useful map) to enhance segmentation quality. To determine the value to set for the csm flag, as discussed, on a downsampled frame the dominant color value, the dominant color map, and the RsCs map are determined. If the dominant color area is classified based on RsCs as low-detail, csm is set to 1, else it is set to 0.

Similarly, there may be two choices for cdm. If cdm=0, color differencing with normal weight will be used. On the other hand, if cdm=1, then color differencing method with lower weights is used. To determine the value to set for cdm flag, as discussed, on a downsampled frame, the dominant color value, the dominant color map, and the RsCs map are determined. If the dominant color area is classified based on RsCs as non-low-detail, cdm is set to 1, else it is set to 0.

Similarly, there are two choices for crs. If crs=1, color based region splitting is to be done. On the other hand, if crs=0, then no color based region splitting is done. To determine the value to set for the crs flag, the color histogram generated by Y,U,V histograms H=($H_Y$, $H_U$, $H_V$) computer 1401 may be analyzed by Y,U,V histograms analyzer and peak selector 1402 for additional dominant color peaks. If additional dominant color peaks are found, crs is set to 1, otherwise crs is to 0.

Discussion now turns to a combined adaptive system that includes both color based region segmentation and the motion based region segmentation. The combined adaptive system also includes selection logic that generates a prf signal which (either automatically or under pre-specified conditions) selects on a scene basis either the color based region segmentation or the motion based region segmentation technique for primary segmentation into two regions.

Figure 15:
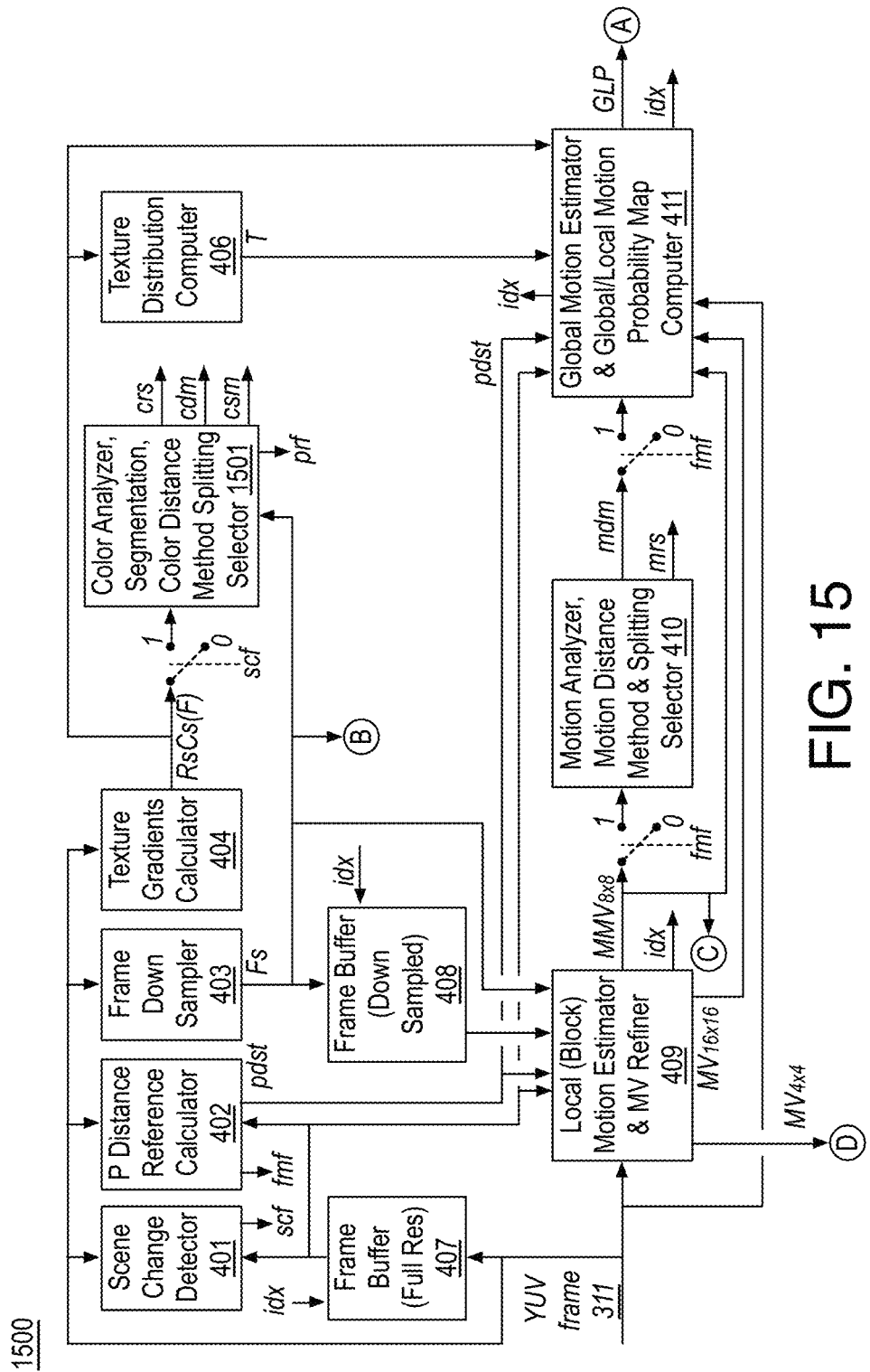
FIG. 15 illustrates a block diagram of an example adaptive color/motion based region segmenter.
Figure 15:
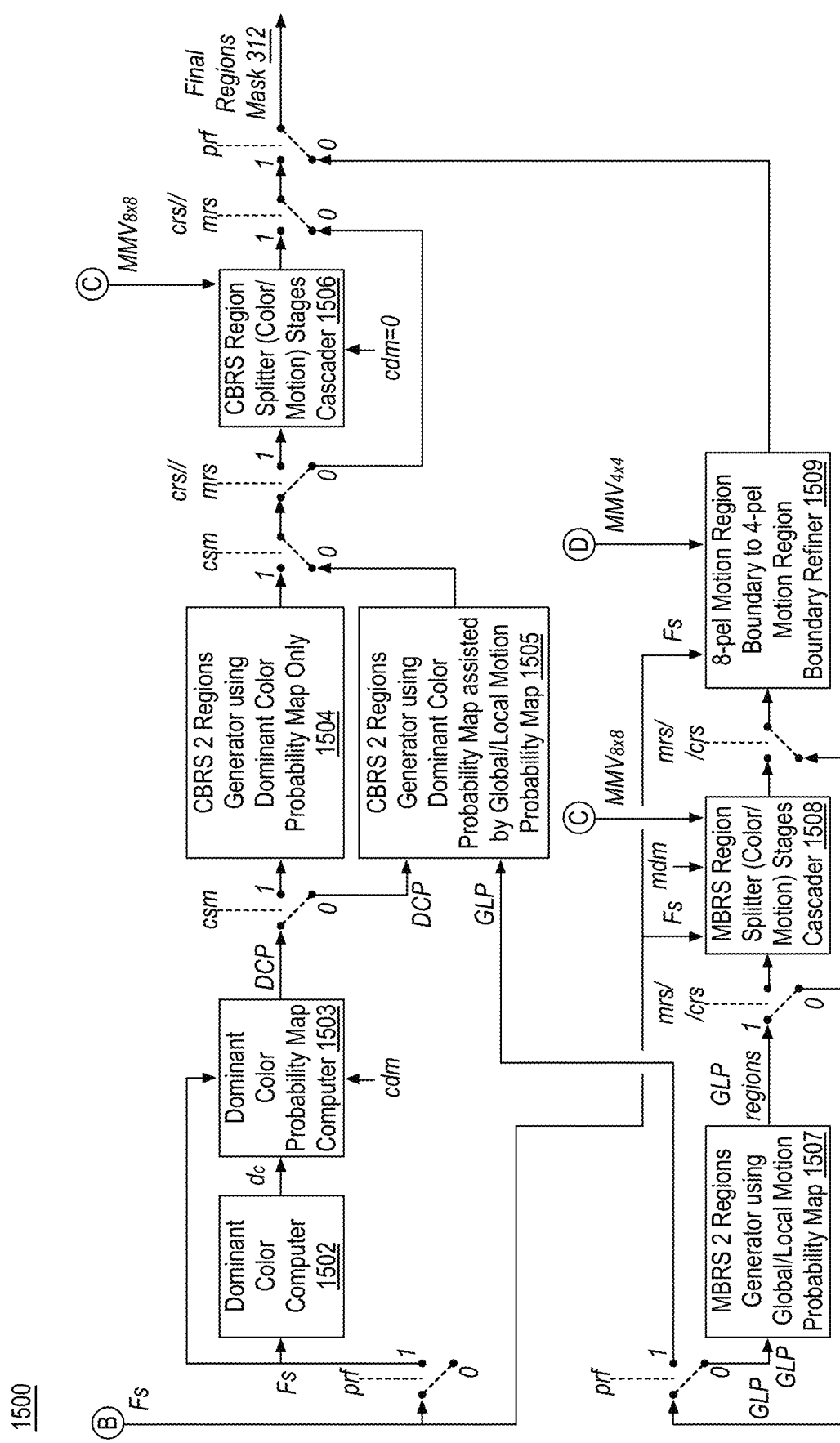

FIG. 15 illustrates a block diagram of an example adaptive color/motion based region segmenter 1500, arranged in accordance with at least some implementations of the present disclosure. As shown, example adaptive color/motion based region segmenter 1500 includes a number of components discussed with respect to FIG. 4 and elsewhere herein. Components that are different include color analyzer, segmentation, color distance method splitting selector 1501, dominant color computer 1502, dominant color probability map computer 1503, CBRS 2 regions generator using dominant color probability map only 1504, CBRS 2 regions generator using dominant color probability map assisted by global/local motion probability map 1505, CBRS region splitter (color/motion) stages cascader 1506, MBRS 2 regions generator using global/local motion probability map 1507, MBRS region splitter (color/motion) stages cascader 1508, 8-pel motion region boundary to 4-pel motion region boundary refiner 1509. Such components may operate in analogy to other component as discussed herein under the operations of the illustrated signals as well as a pair of switches that allow selection of either color based segmentation (when prf is 1) or motion based segmentation (when prf is 0).

Figure 16A:
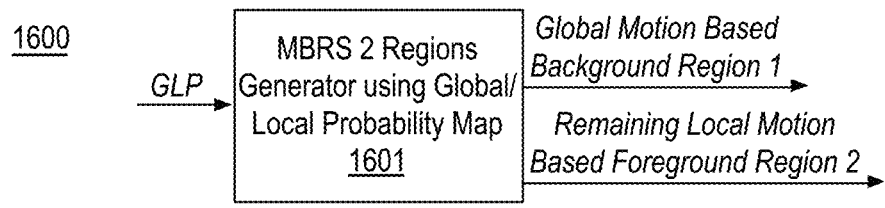
FIG. 16A illustrates an example conceptual block diagram of a system that performs motion based two primary region segmentation using a global/local probability map.

FIG. 16A illustrates an example conceptual block diagram of a system 1600 that is a subset of system 400 that performs motion based two primary region segmentation using a global/local probability map, arranged in accordance with at least some implementations of the present disclosure. As shown, system 1600 may include a MBRS 2 regions generator using global/local probability map module 1601 that may receive and segment the global/local probability map of a frame or picture into two regions or region layers: a global motion based background region 1 and a remaining foreground region 2.

Figure 16B:
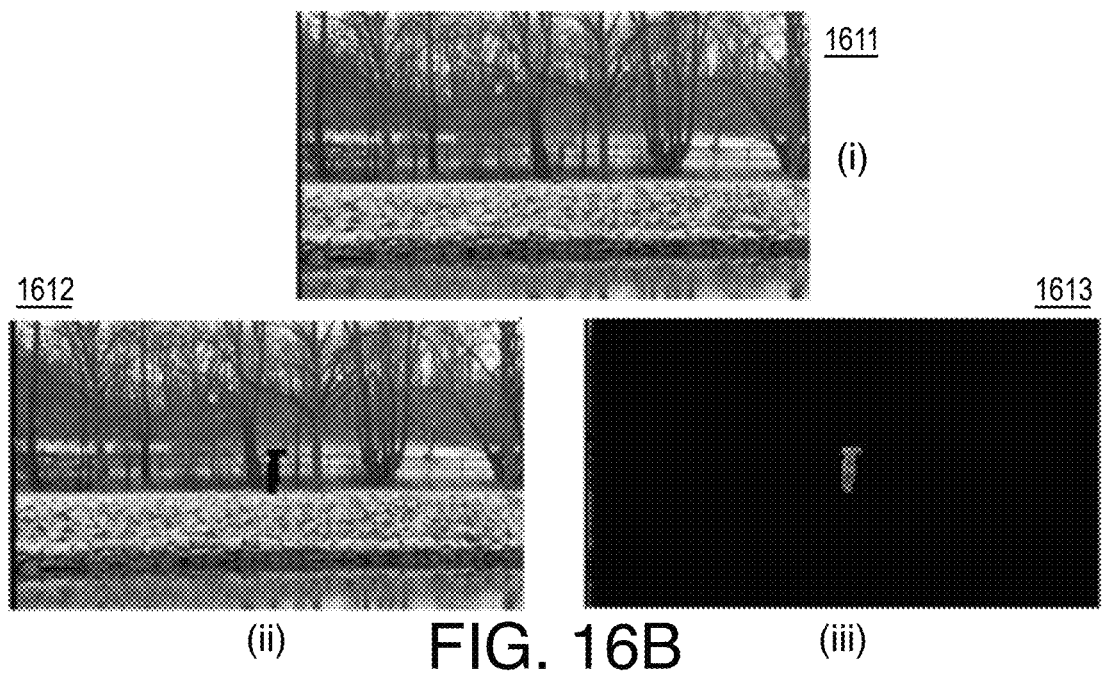
FIG. 16B illustrates example processing results attained by the system of FIG. 16A.

FIG. 16B illustrates example processing results attained by system 1600, arranged in accordance with at least some implementations of the present disclosure. In the illustrated example, system 1600 may operate on a Park Run video sequence (e.g., at 720p) including an original frame 1611 of the video sequence. Original frame 1611 as shown in FIG. 16B(i) may be segmented based on a dominant global/local probability mask into two regions or region layers as shown in FIGS. 16B(ii) and 16B(iii). FIG. 16B(ii) illustrates an example global motion based background region 1 1612 (e.g., the park area of original frame 1611) and FIG. 16B(iii) illustrates an example remaining foreground region 2 1613 (e.g., the runner of original frame 1611).

Figure 17A:
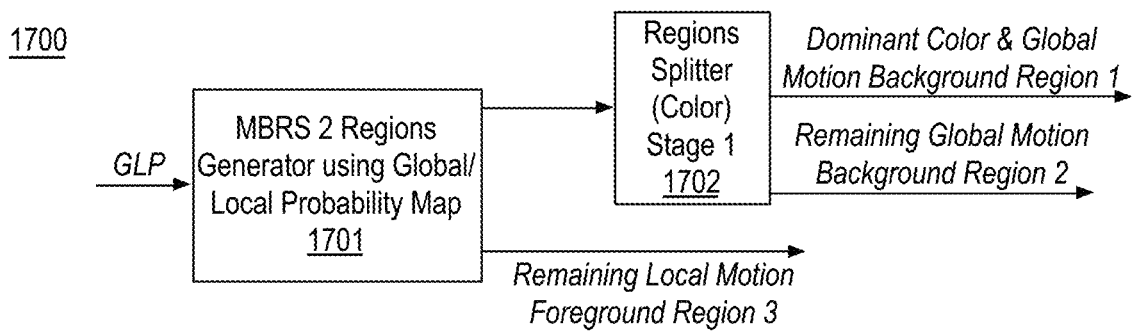
FIG. 17A illustrates an example conceptual block diagram of a system that performs motion based three region segmentation.

FIG. 17A illustrates an example conceptual block diagram of a system 1700 that is a subset of system 400 that performs motion based three region segmentation, arranged in accordance with at least some implementations of the present disclosure. As shown, system 1700 may include MBRS 2 regions generator using global/local probability map module 1701 and a regions splitter (color) stage 1 module 1702. As shown, MBRS 2 regions generator using global/local probability map module 1701 segments the global/local probability map of a frame or picture into two main regions: a global motion based background region and a remaining foreground region. Next, the global motion based background region is split based on dominant color by regions splitter (color) stage 1 module 1702, which causes the background region to be split or segmented into two regions: a dominant color and global motion background region 1 and a remaining global motion background region 2. The remaining foreground region is not split further and is characterized as a remaining local motion foreground region 3.

Figure 17B:
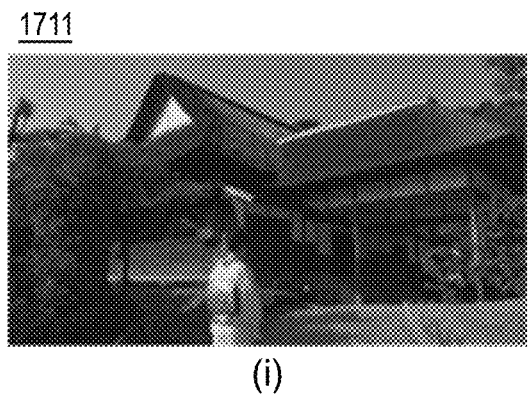
FIG. 17B illustrates example processing results attained by the system of FIG. 17A.
Figure 17B:
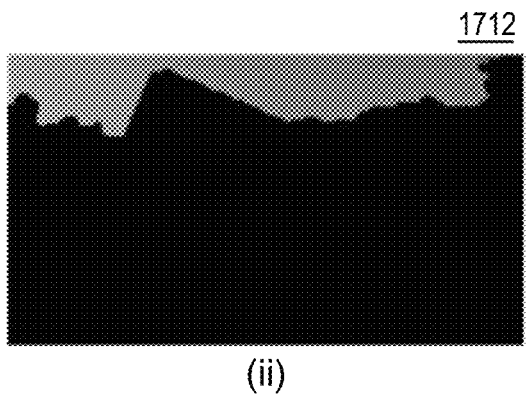
Figure 17B:
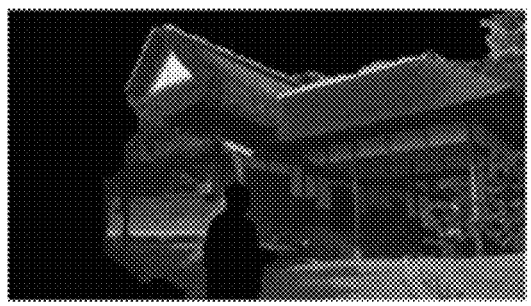
Figure 17B:

FIG. 17B illustrates example processing results attained by system 1700, arranged in accordance with at least some implementations of the present disclosure. In the illustrated example, system 1700 may operate on a Kimono video scene or sequence (e.g., at 1080p) including an original frame 1711 of the video sequence. Original frame 1711 as shown in FIG. 17B(i) may be segmented based on a global/local motion probability mask into two regions: a background region (e.g., the sky, temple, and garden area of original frame 1711; not shown) and a remaining foreground region (e.g., the person and tree of original frame 1711). The background region is split or segmented further using color into a dominant color and global motion background region 1 1712 (e.g., the sky area of original frame 1711) as shown in FIG. 17B(ii) and a remaining global motion background region 2 1713 (e.g., the temple and garden area of original frame 1711) as shown in FIG. 17B(iii). The remaining local motion foreground region 3 1714 as shown in FIG. 17B(iv) may not be further split and is labeled as region 3.

Figure 17C:
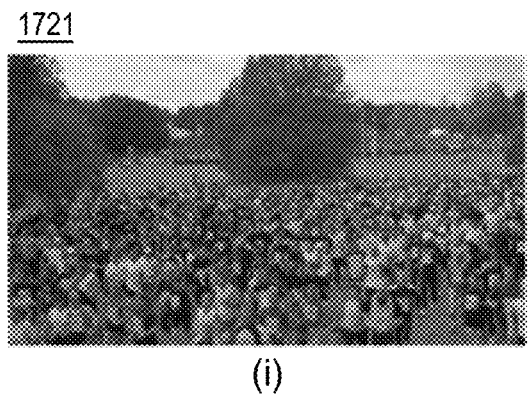
FIG. 17C illustrates example processing results attained by the system of FIG. 17A.
Figure 17C:
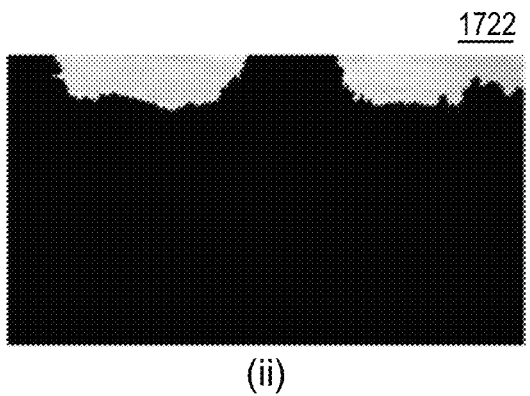
Figure 17C:
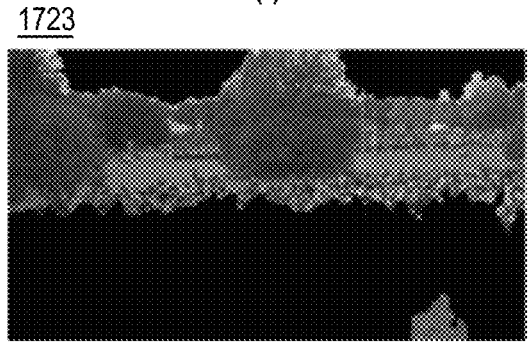
Figure 17C:
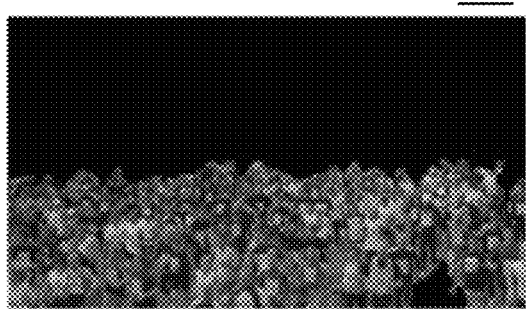

FIG. 17C illustrates example processing results attained by system 1700, arranged in accordance with at least some implementations of the present disclosure. In the illustrated example, system 1700 may operate on a Crowd Run video scene or sequence (e.g., at 1080p) including an original frame 1721 of the video sequence. Original frame 1721 as shown in FIG. 17C(i) may be segmented based on a global/local motion probability mask into two regions: a background region (e.g., the sky, trees, buildings, runners, and distance patches of ground of original frame 1721; not shown) and a remaining foreground region (e.g., the runners and close patches of ground of original frame 1721). The background region is split or segmented further using color into a dominant color and global motion background region 1 1722 (e.g., the sky area of original frame 1721) as shown in FIG. 17C(ii) and a remaining global motion background region 2 1723 (e.g., the trees, buildings, runners, and distance patches of ground of original frame 1721) as shown in FIG. 17C(iii). The remaining local motion foreground region 3 1724 as shown in FIG. 17C(iv) may not be further split and is labeled as region 3.

Figure 18A:
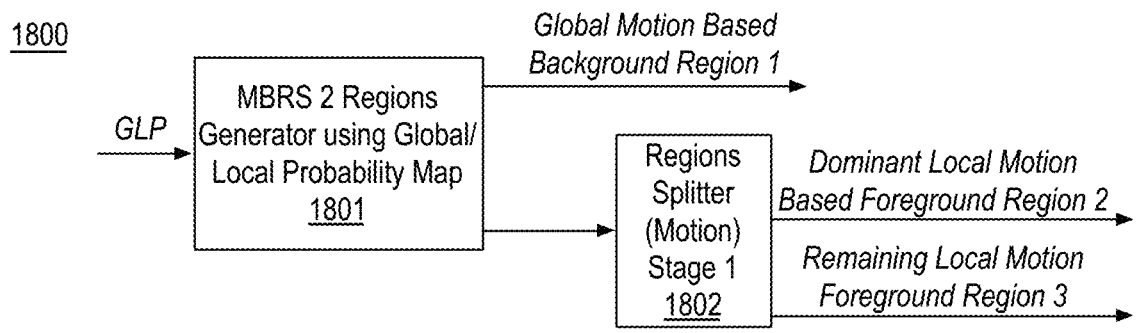
FIG. 18A illustrates an example conceptual block diagram of a system that performs motion based three region segmentation.

FIG. 18A illustrates an example conceptual block diagram of a system 1800 that is a subset of system 400 that performs motion based three region segmentation, arranged in accordance with at least some implementations of the present disclosure. As shown, system 1800 may include MBRS 2 regions generator using global/local probability map module 1801 and a regions splitter (motion) stage 1 module 1802. As shown, MBRS 2 regions generator using global/local probability map module 1801 segments the global/local probability map of a frame or picture into two main regions: a global motion based background region 1 and a remaining foreground region. Next, the remaining foreground region is split or segmented based on dominant motion by regions splitter (motion) stage 1 module 1802, which causes the foreground region to be split or segmented into two regions: a dominant local motion based foreground region 2 and a remaining local motion foreground region 3. The global motion based background region is not split further and is characterized as a global motion based background region 1.

Figure 18B:
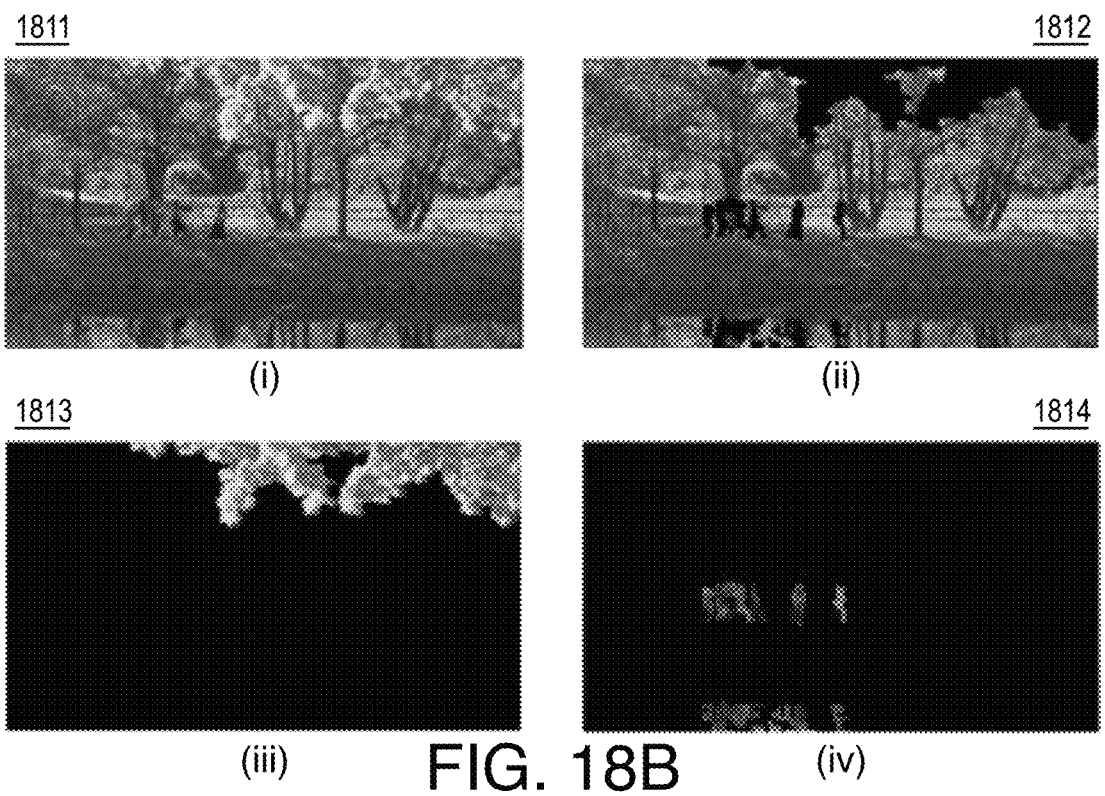
FIG. 18B illustrates example processing results attained by the system of FIG. 18A.

FIG. 18B illustrates example processing results attained by system 1800, arranged in accordance with at least some implementations of the present disclosure. In the illustrated example, system 1800 may operate on a Park Joy video scene or sequence (e.g., at 1080p) including an original frame 1811 of the video sequence. Original frame 1811 as shown in FIG. 18B(i) may be segmented based on a global/local motion probability mask into two regions: a global motion based background region 1 1812 (e.g., the park area of original frame 1811) as shown in FIG. 18B(ii) and a remaining foreground region (e.g., the large tree close to the camera and the people of original frame 1811; not shown). The remaining foreground region is split or segmented further using dominant motion into a dominant local motion based foreground region 2 1813 (e.g., the large tree and branches close to the camera of original frame 1811) as shown in FIG. 18B(iii) and a remaining local motion foreground region 3 1814 (e.g., the people of original frame 1811) as shown in FIG. 18B(iv).

Figure 18C:
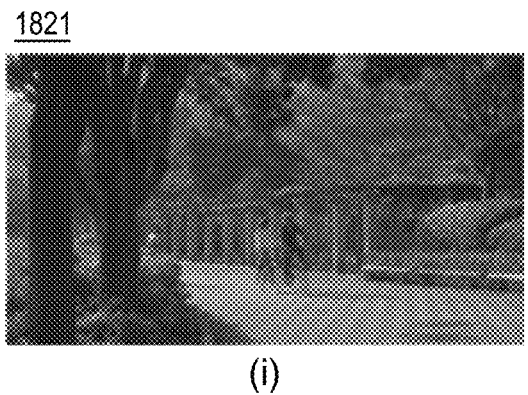
FIG. 18C illustrates example processing results attained by the system of FIG. 18A.
Figure 18C:
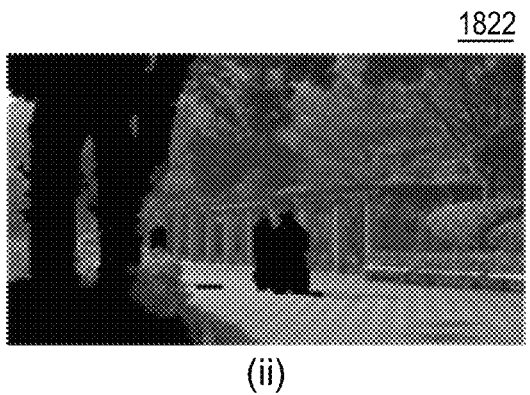
Figure 18C:
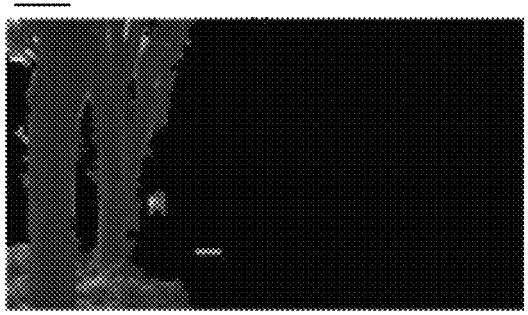
Figure 18C:
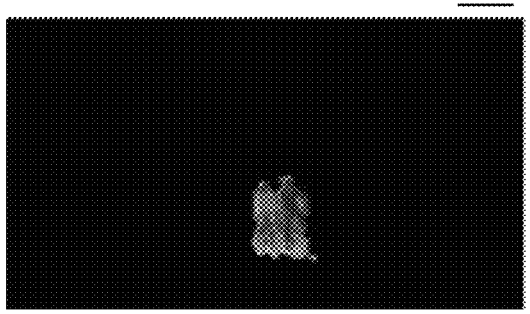

FIG. 18C illustrates example processing results attained by system 1800, arranged in accordance with at least some implementations of the present disclosure. In the illustrated example, system 1800 may operate on a Park Scene video scene or sequence (e.g., at 1080p) including an original frame 1821 of the video sequence. Original frame 1821 as shown in FIG. 18C(i) may be segmented based on a global/local motion probability mask into two regions: a global motion based background region 1 1822 (e.g., the park area of original frame 1821) as shown in FIG. 18C(ii) and a remaining foreground region (e.g., the large tree close to the camera and the bicyclists of original frame 1821; not shown). The remaining foreground region is split or segmented further using dominant motion into a dominant local motion based foreground region 2 1823 (e.g., the large trees close to the camera of original frame 1821) as shown in FIG. 18C(iii) and a remaining local motion foreground region 3 1824 (e.g., the bicyclists of original frame 1821) as shown in FIG. 18C(iv).

Figure 18D:
FIG. 18D illustrates example processing results attained by the system of FIG. 18A.
Figure 18D:
Figure 18D:
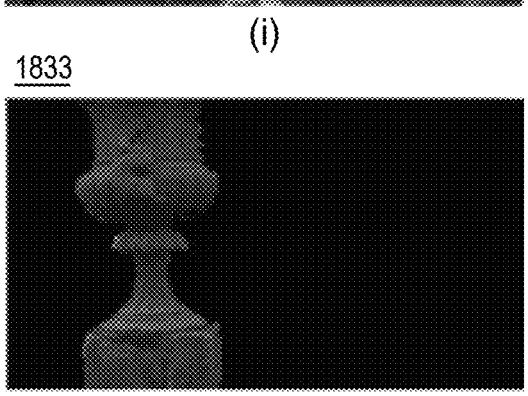
Figure 18D:
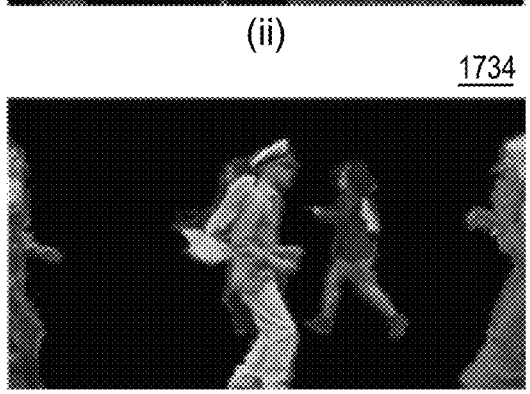

FIG. 18D illustrates example processing results attained by system 1800, arranged in accordance with at least some implementations of the present disclosure. In the illustrated example, system 1800 may operate on a Seeking video scene or sequence (e.g., at 1080p) including an original frame 1831 of the video sequence. Original frame 1831 as shown in FIG. 18D(i) may be segmented based on a global/local motion probability mask into two regions: a global motion based background region 1 1832 (e.g., the park area of original frame 1831) as shown in FIG. 18D(ii) and a remaining foreground region (e.g., the large pillar close to the camera and the people of original frame 1831; not shown). The remaining foreground region is split or segmented further using dominant motion into a dominant local motion based foreground region 2 1833 (e.g., the large pillar of original frame 1831) as shown in FIG. 18D(iii) and a remaining local motion foreground region 3 1834 (e.g., the people of original frame 1831) as shown in FIG. 18D(iv).

Discussion now turns to motion based region segmentation into 4 regions using global motion with region splitting using dominant color and/or dominant motion. For segmentation of a frame into 4 regions, several different configurations may be implemented. Discussion focuses on three such configurations: single stage color and motion, single stage color only, and two stage color and motion.

Figure 19A:
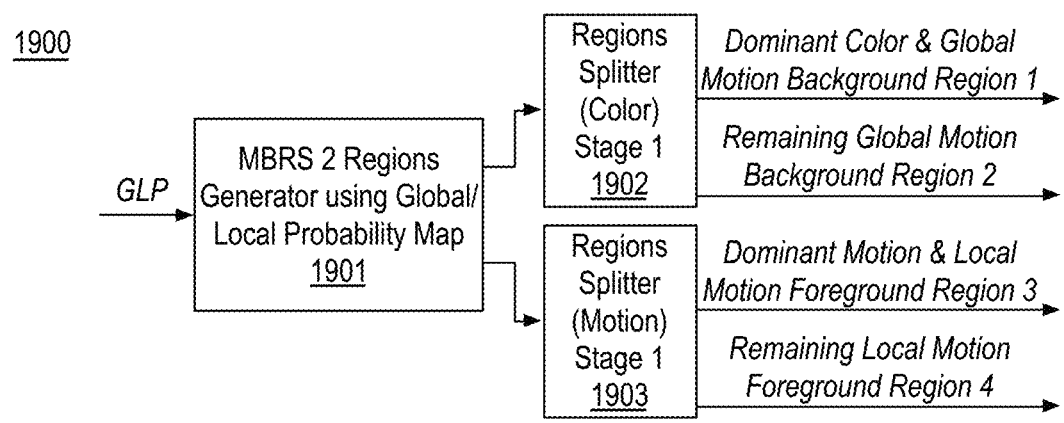
FIG. 19A illustrates an example conceptual block diagram of a system that performs motion based four region segmentation.

FIG. 19A illustrates an example conceptual block diagram of a system 1900 that is a subset of system 400 that performs motion based four region segmentation, arranged in accordance with at least some implementations of the present disclosure. As shown, system 1900 may include MBRS 2 regions generator using global/local probability map module 1901, a regions splitter (color) stage 1 module 1902, and a regions splitter (motion) stage 1 module 1903. As shown, MBRS 2 regions generator using global/local probability map module 1901 segments the global/local probability map of a frame or picture into two main regions: a global motion based background region and a remaining foreground region. Next, the global motion based background region is segmented or split based on dominant color by regions splitter (color) stage 1 module 1902 into two regions: a dominant color and global motion background region 1 and a remaining global motion background region 2. Optionally in parallel, the remaining foreground region is segmented or split further based on dominant motion into two regions: a dominant motion and local motion foreground region 3 and a remaining local motion foreground region 4.

Figure 19B:
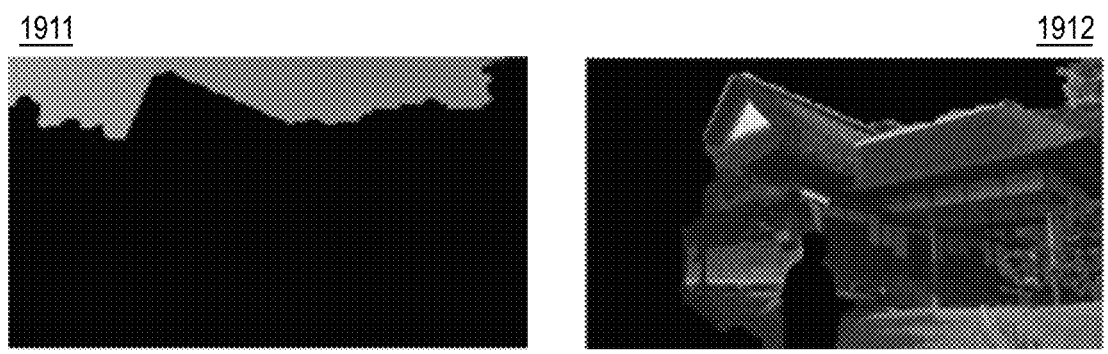
FIG. 19B illustrates example processing results attained by the system of FIG. 19A.
Figure 19B:
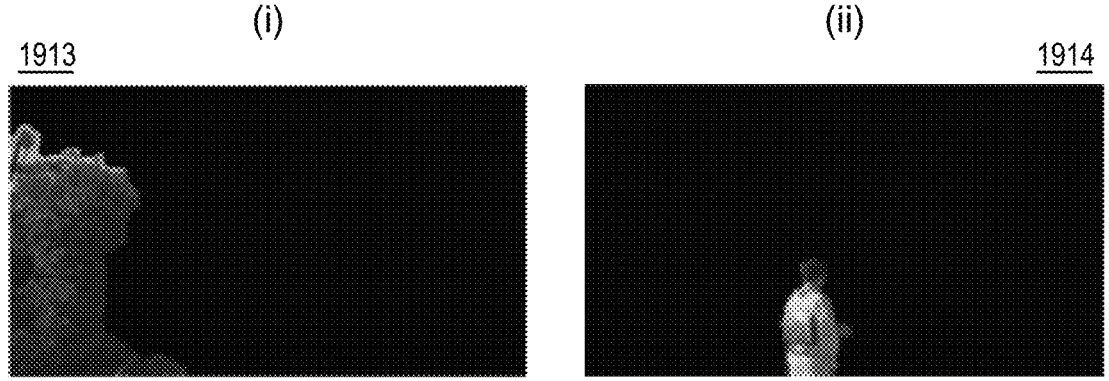

FIG. 19B illustrates example processing results attained by system 1900, arranged in accordance with at least some implementations of the present disclosure. In the illustrated example, system 1900 may operate on a Kimono video scene or sequence (e.g., at 1080p) including an original frame 1711 of the video sequence (please refer to FIG. 17B(i). Original frame 1711 may be segmented based on a global/local motion probability mask into two regions: a global motion based background region (not shown) and a local motion based foreground region (not shown). The global motion based background region is split or segmented further using dominant color into a dominant color and global motion background region 1 1911 (e.g., the sky area of original frame 1711) as shown in FIG. 19B(i) and a remaining global motion background region 2 1912 (e.g., the temple and garden area of original frame 1711) as shown in FIG. 19B(ii). The local motion region (e.g., the remaining foreground region) is split or segmented further using dominant motion into a dominant motion and local motion foreground region 3 1913 (e.g., the large tree close to the camera of original frame 1711) as shown in FIG. 19B(iii) and a remaining local motion foreground region 4 1914 (e.g., the person of original frame 1711) as shown in FIG. 19B(iv).

Figure 19C:
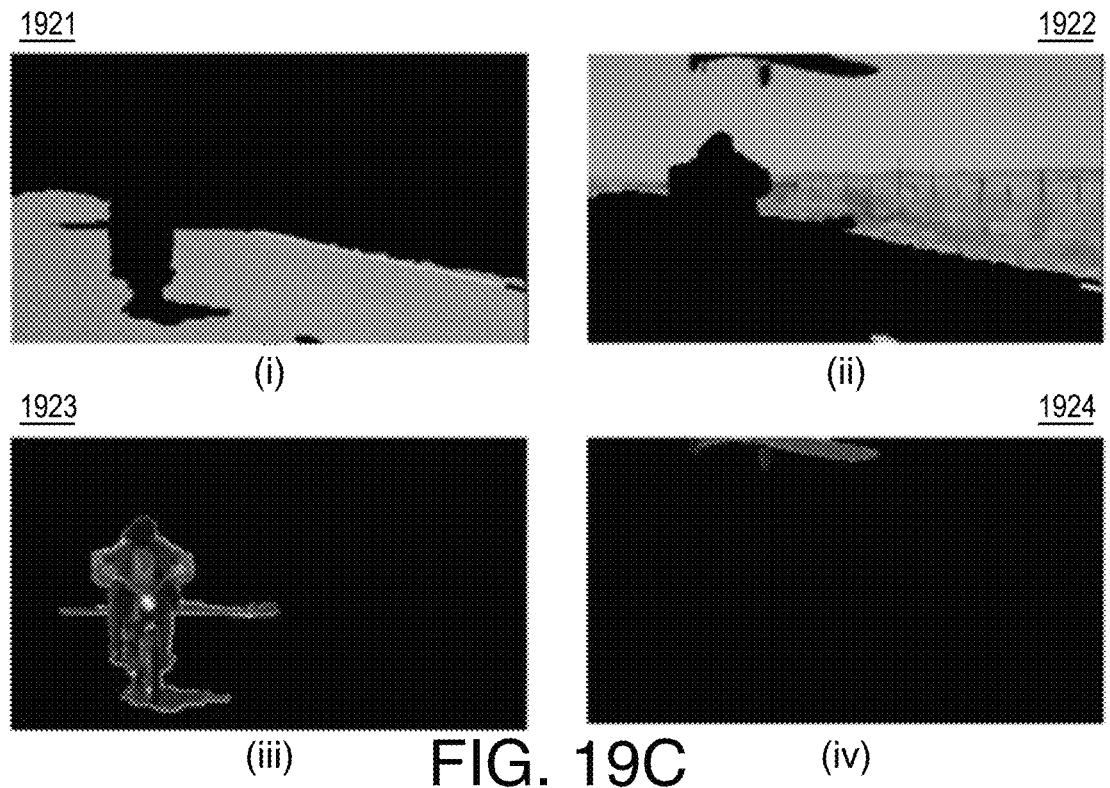
FIG. 19C illustrates example processing results attained by the system of FIG. 19A.

FIG. 19C illustrates example processing results attained by system 1900, arranged in accordance with at least some implementations of the present disclosure. In the illustrated example, system 1900 may operate on an Independence Day video scene or sequence (e.g., at 1080p) including an original frame (not shown) of the video sequence. The original frame may be segmented based on a global/local motion probability mask into two regions: a global motion based background region (not shown) and a local motion based foreground region (not shown). The global motion based background region is split or segmented further using dominant color into a dominant color and global motion background region 1 1921 (e.g., road area of the original frame) as shown in FIG. 19C(i) and a remaining global motion background region 2 1922 (e.g., the sky and countryside area of the original frame) as shown in FIG. 19C(ii). The local motion region (e.g., the remaining foreground region) is split or segmented further using dominant motion into a dominant motion and local motion foreground region 3 1923 (e.g., the motorcycle and shadow of the original frame) as shown in FIG. 19C(iii) and a remaining local motion foreground region 4 1924 (e.g., the airplane of the original frame) as shown in FIG. 19C(iv).

Figure 20:
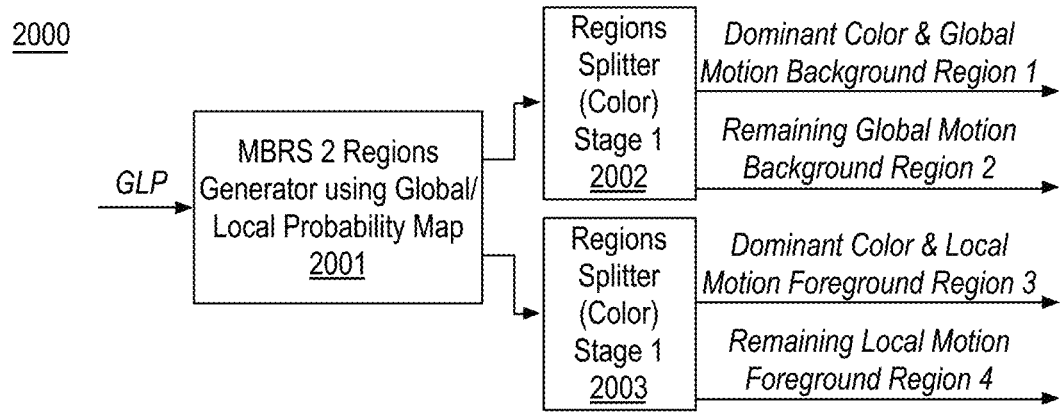
FIG. 20 illustrates an example conceptual block diagram of a system that performs motion based four region segmentation.

Discussion now turns to segmenting or splitting using a single stage based on color only. FIG. 20 illustrates an example conceptual block diagram of a system 2000 that is a subset of system 400 that performs motion based four region segmentation, arranged in accordance with at least some implementations of the present disclosure. As shown, system 2000 may include MBRS 2 regions generator using global/local probability map module 2001, a regions splitter (color) stage 1 module 2002, and a regions splitter (color) stage 1 module 2003. As shown, MBRS 2 regions generator using global/local probability map module 2001 segments the global/local probability map of a frame or picture into two main regions: a global motion based background region and a remaining foreground region. Next, the global motion based background region is segmented or split based on dominant color by regions splitter (color) stage 1 module 2002 into two regions: a dominant color and global motion background region 1 and a remaining global motion background region 2. Optionally in parallel, the remaining foreground region is segmented or split further based on dominant color into two regions: a dominant color and local motion foreground region 3 and a remaining local motion foreground region 4.

Figure 21:
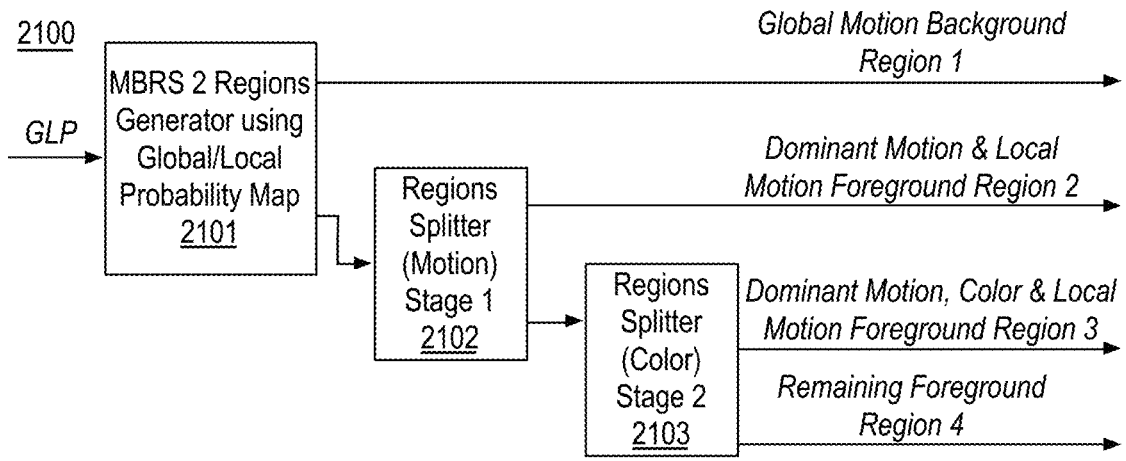
FIG. 21 illustrates an example conceptual block diagram of a system that performs motion based four region segmentation.

Discussion now turns to segmenting or splitting using two stages with motion being used in stage one and color being used in stage 2. FIG. 21 illustrates an example conceptual block diagram of a system 2100 that is a subset of system 400 that performs motion based four region segmentation, arranged in accordance with at least some implementations of the present disclosure. As shown, system 2100 may include MBRS 2 regions generator using global/local probability map module 2101, a regions splitter (motion) stage 1 module 2102, and a regions splitter (color) stage 2 module 2103. As shown, MBRS 2 regions generator using global/local probability map module 2101 segments the global/local probability map of a frame or picture into two main regions: a global motion based background region 1 and a remaining foreground region. Next, the remaining foreground region is segmented or split further based on dominant motion by regions splitter (motion) stage 1 module 2102 into two regions: a dominant motion and local motion foreground region 3 and a remaining local motion foreground region. The remaining local motion foreground region is segmented or split further based on dominant color by regions splitter (color) stage 2 module 2103 into two regions: a dominant motion, dominant color, and local motion foreground region 3 and a remaining foreground region 4.

Discussion now turns to segmenting or splitting using motion based region segmentation into 5 regions using global motion with region splitting using dominant motion and/or dominant color. For segmentation of a frame into 5 regions, several different configurations may be implemented. Discussion focuses on two such configurations: (1) stage 1 using color and motion and stage 2 using color only and (2) stage 1 using color and stage 2 also using color only.

Figure 22A:
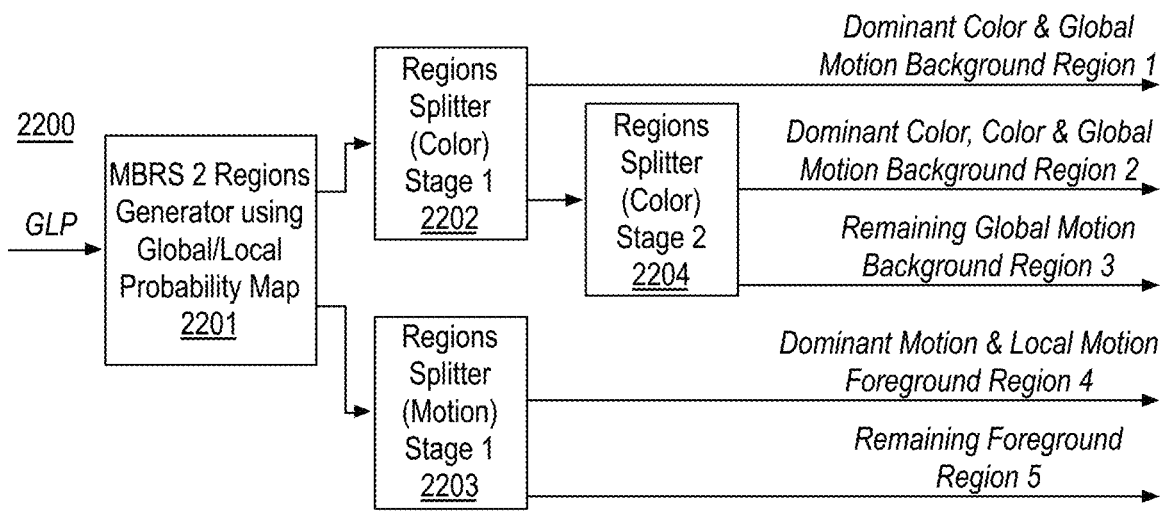
FIG. 22A illustrates an example conceptual block diagram of a system that performs motion based five region segmentation.

FIG. 22A illustrates an example conceptual block diagram of a system 2200 that is a subset of system 400 that performs motion based five region segmentation, arranged in accordance with at least some implementations of the present disclosure. As shown, system 2200 may include MBRS 2 regions generator using global/local probability map module 2201, a regions splitter (color) stage 1 module 2202, a regions splitter (motion) stage 1 module 2203, and a regions splitter (color) stage 2 module 2204. As shown, MBRS 2 regions generator using global/local probability map module 2201 segments the global/local probability map of a frame or picture into two main regions: a global motion based background region and a remaining foreground region. Next, the global motion based background region is segmented or split further based on dominant color by regions splitter (color) stage 1 module 2202 into two regions: a dominant color and global motion background region 1 and a remaining global motion background region. Next, the remaining global motion background region is segmented or split further based on dominant color by regions splitter (color) stage 2 module 2204 into two regions: a dominant color, color and global motion background region 2 and a remaining global motion background region 3. Furthermore, the remaining foreground region is segmented or split further based on dominant motion by regions splitter (motion) stage 1 module 2203 into two regions: a dominant motion and local motion foreground region 4 and a remaining local motion foreground region 5.

Figure 22B:
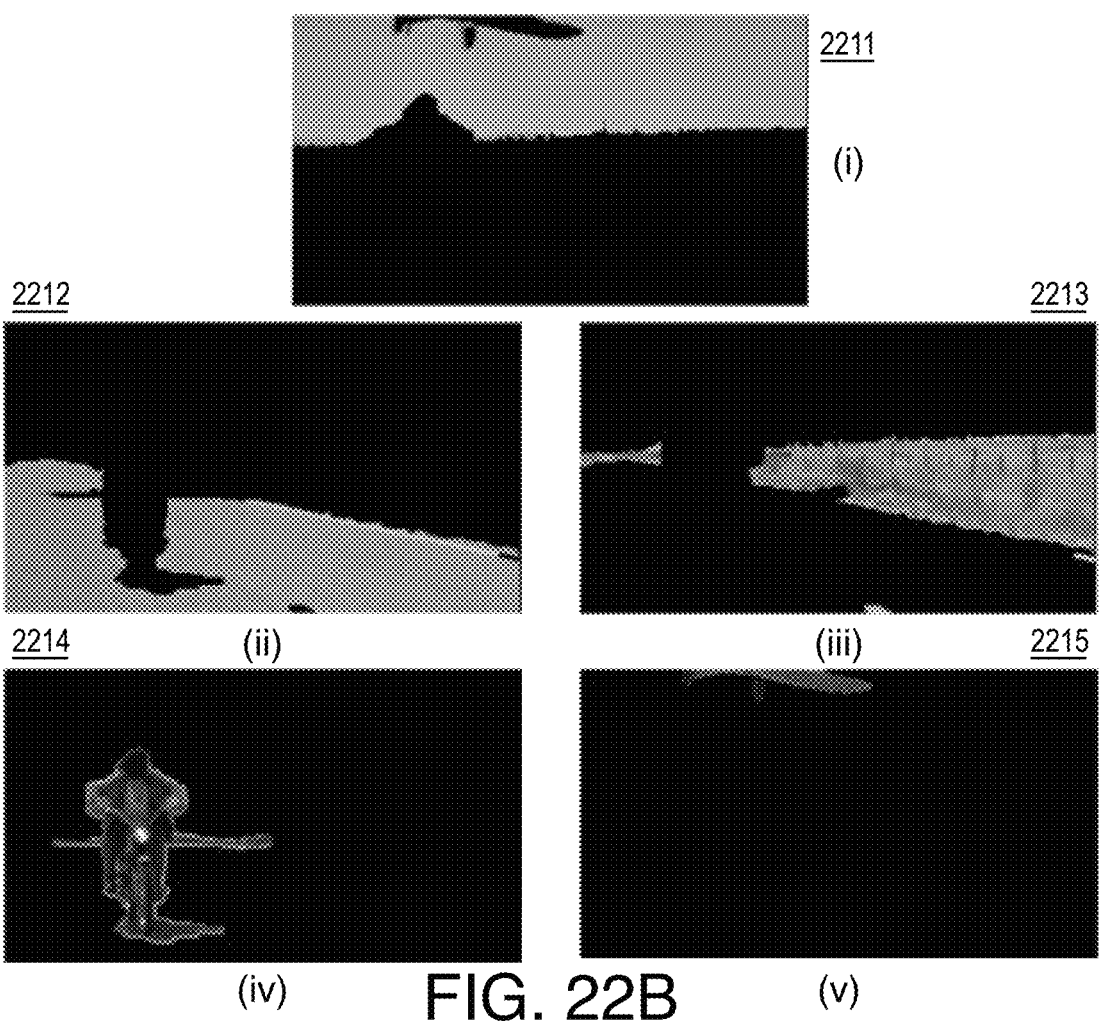
FIG. 22B illustrates example processing results attained by the system of FIG. 22A.

FIG. 22B illustrates example processing results attained by system 2200, arranged in accordance with at least some implementations of the present disclosure. In the illustrated example, system 2200 may operate on the Independence Day video scene or sequence (e.g., at 1080p) including an original frame (not shown) of the video sequence. The original frame may be segmented based on a global/local motion probability mask into two regions: a global motion based background region (not shown) and a local motion based foreground region (not shown). The global motion based background region is split or segmented further using dominant color into a dominant color and global motion background region 1 2211 (e.g., the sky area of the original frame) as shown in FIG. 22B(i) and a remaining global motion background region. The remaining global motion background region is split or segmented further using dominant color into a dominant color, color and global motion background region 2 2212 (e.g., the road area of the original frame) as shown in FIG. 22B(ii) and a remaining global motion background region 3 2213 (e.g., the countryside area of the original frame) as shown in FIG. 22B(iii). The local motion region (e.g., the remaining local motion based foreground region) is split or segmented further using dominant motion into a dominant motion and local motion foreground region 4 2214 (e.g., the motorcycle area of the original frame) as shown in FIG. 22B(iv) and a remaining local motion foreground region 5 2215 (e.g., the airplane area of the original frame) as shown in FIG. 22B(v).

Figure 23:
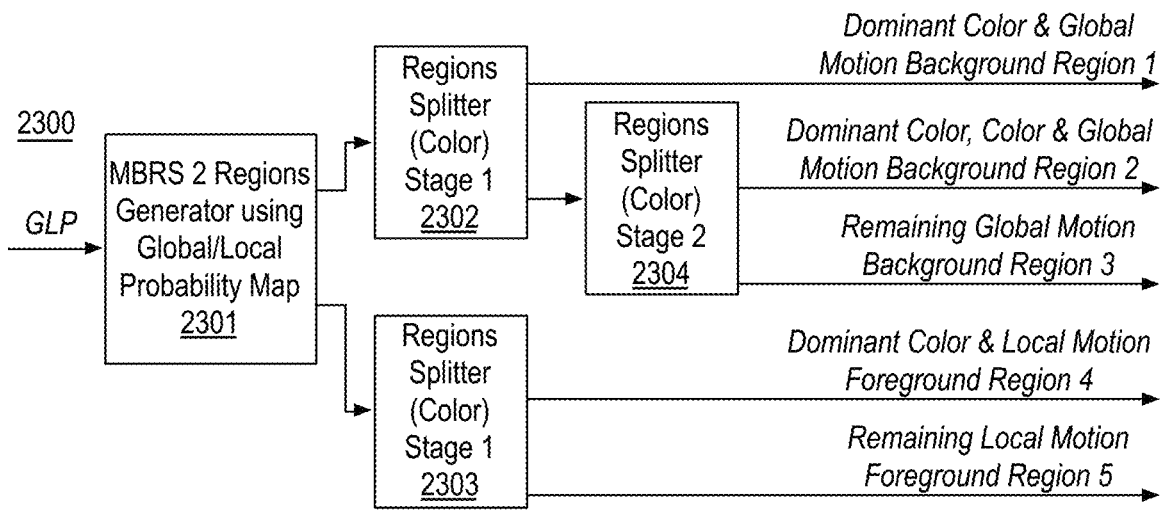
FIG. 23 illustrates an example conceptual block diagram of a system that performs motion based five region segmentation.

FIG. 23 illustrates an example conceptual block diagram of a system 2300 that is a subset of system 400 that performs motion based five region segmentation, arranged in accordance with at least some implementations of the present disclosure. As shown, system 2300 may include MBRS 2 regions generator using global/local probability map module 2301, a regions splitter (color) stage 1 module 2302, a regions splitter (color) stage 1 module 2303, and a regions splitter (color) stage 2 module 2304. As shown, MBRS 2 regions generator using global/local probability map module 2301 segments the global/local probability map of a frame or picture into two main regions: a global motion based background region and a remaining foreground region. Next, the global motion based background region is segmented or split further based on dominant color by regions splitter (color) stage 1 module 2302 into two regions: a dominant color and global motion background region 1 and a remaining global motion background region. Next, the remaining global motion background region is segmented or split further based on dominant color by regions splitter (color) stage 2 module 2304 into two regions: a dominant color, color and global motion background region 2 and a remaining global motion background region 3. Furthermore, the remaining foreground region is segmented or split further based on dominant color by regions splitter (color) stage 1 module 2303 into two regions: a dominant color and local motion foreground region 4 and a remaining local motion foreground region 5.

Discussion now turns to motion based region segmentation into 6 regions using global motion with region splitting using dominant motion and/or dominant color. For segmentation of a frame into 6 regions, several different configurations may be implemented. Discussion focuses on two such configurations: (1) stage 1 uses color and motion and stage 2 uses color only and (2) stage 1 uses color and motion and stage 2 also uses color and motion.

Figure 24:
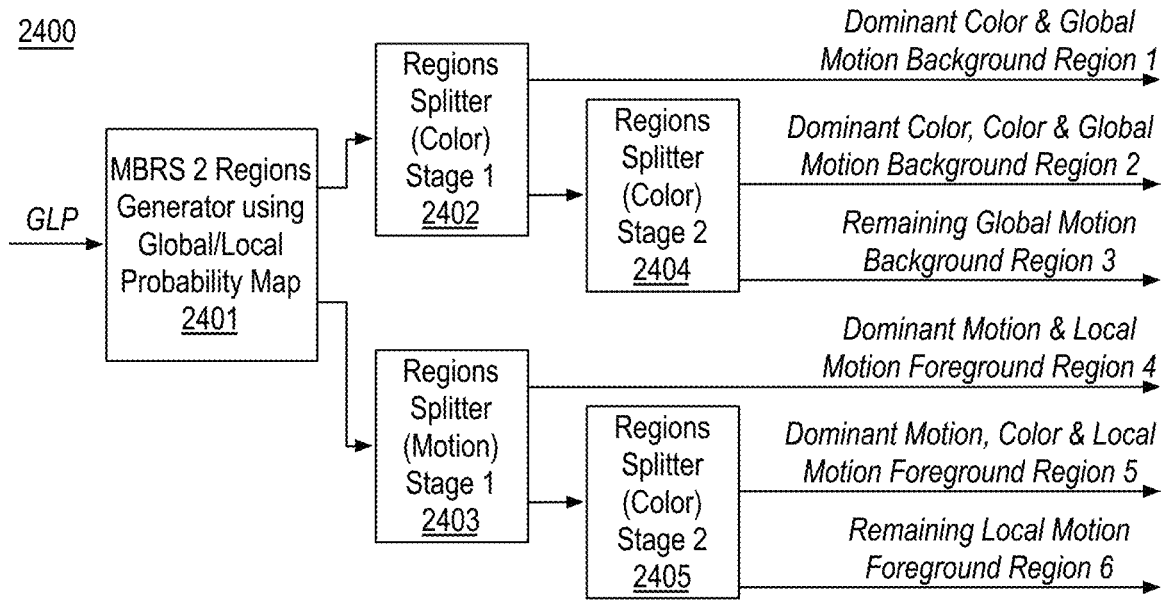
FIG. 24 illustrates an example conceptual block diagram of a system that performs motion based six region segmentation.

FIG. 24 illustrates an example conceptual block diagram of a system 2400 that is a subset of system 400 that performs motion based six region segmentation, arranged in accordance with at least some implementations of the present disclosure. As shown, system 2400 may include MBRS 2 regions generator using global/local probability map module 2401, a regions splitter (color) stage 1 module 2402, a regions splitter (motion) stage 1 module 2403, a regions splitter (color) stage 2 module 2404, and a regions splitter (color) stage 2 module 2405. As shown, MBRS 2 regions generator using global/local probability map module 2401 segments the global/local probability map of a frame or picture into two main regions: a global motion based background region and a remaining foreground region. Next, the global motion based background region is segmented or split further based on dominant color by regions splitter (color) stage 1 module 2402 into two regions: a dominant color and global motion background region 1 and a remaining global motion background region. Next, the remaining global motion background region is segmented or split further based on dominant color by regions splitter (color) stage 2 module 2404 into two regions: a dominant color, color and global motion background region 2 and a remaining global motion background region 3. Furthermore, the remaining foreground region is segmented or split further based on dominant motion by regions splitter (motion) stage 1 module 2403 into two regions: a dominant motion and local motion foreground region 4 and a remaining local motion foreground region. Next, the remaining local motion foreground region is segmented or split further based on dominant color by regions splitter (color) stage 2 module 2405 into two regions: a dominant motion, color and local motion foreground region 5 and a remaining local motion foreground region 6.

Figure 25:
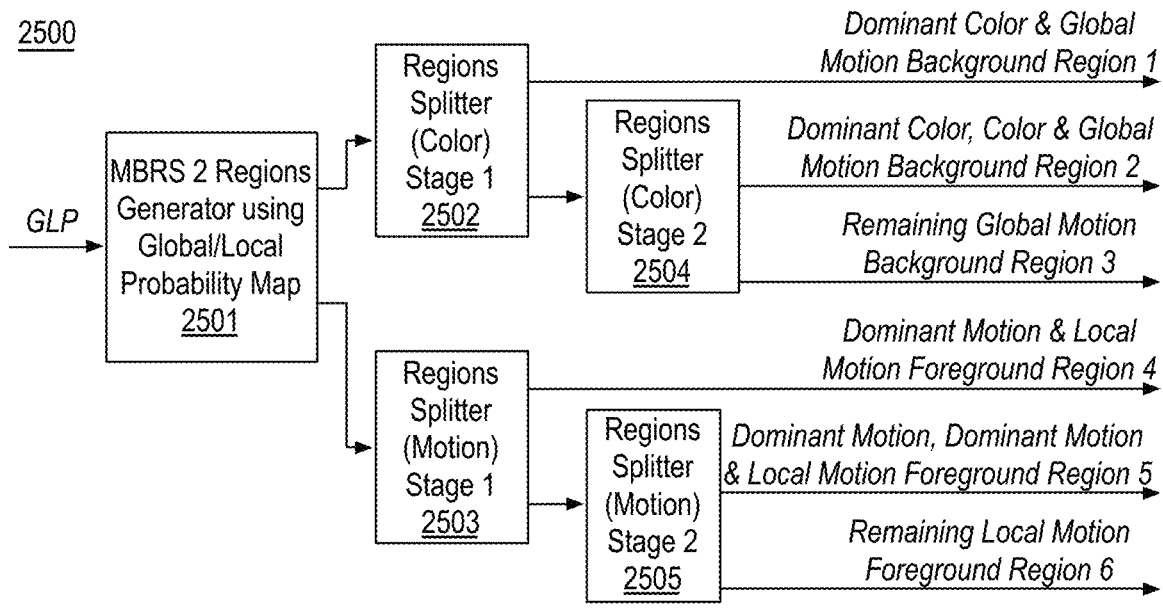
FIG. 25 illustrates an example conceptual block diagram of a system that performs motion based six region segmentation.

FIG. 25 illustrates an example conceptual block diagram of a system 2500 that is a subset of system 400 that performs motion based six region segmentation, arranged in accordance with at least some implementations of the present disclosure. As shown, system 2500 may include MBRS 2 regions generator using global/local probability map module 2501, a regions splitter (color) stage 1 module 2502, a regions splitter (motion) stage 1 module 2503, a regions splitter (color) stage 2 module 2504, and a regions splitter (motion) stage 2 module 2505. As shown, MBRS 2 regions generator using global/local probability map module 2501 segments the global/local probability map of a frame or picture into two main regions: a global motion based background region and a remaining foreground region. Next, the global motion based background region is segmented or split further based on dominant color by regions splitter (color) stage 1 module 2502 into two regions: a dominant color and global motion background region 1 and a remaining global motion background region. Next, the remaining global motion background region is segmented or split further based on dominant color by regions splitter (color) stage 2 module 2504 into two regions: a dominant color, color and global motion background region 2 and a remaining global motion background region 3. Furthermore, the remaining foreground region is segmented or split further based on dominant motion by regions splitter (motion) stage 1 module 2503 into two regions: a dominant motion and local motion foreground region 4 and a remaining local motion foreground region. Next, the remaining local motion foreground region is segmented or split further based on dominant motion by regions splitter (motion) stage 2 module 2505 into two regions: a dominant motion, dominant motion, and local motion foreground region 5 and a remaining local motion foreground region 6.

Without loss of generality, the techniques discussed herein may be modularly expanded to provide segmentation into 7 or more regions. In some embodiments, such segmentation may be achieved based on adding additional cascading stage(s) such as using at least a 3 stage cascade. In some embodiments, such additional segmentation may be achieved by extending the discussed techniques by expanding the scope of one or more stages.

Furthermore, without loss of generality the regions or region layers segmented as discussed herein may be labeled to identify the content of each region. Such labeling may include attaching an index to each region and keeping a small codebook to look up a name or type of each region when an index identifying the region is presented. Such labeling of each region may be performed manually or automatically depending on its statistical or visual characteristics or other parameters (e.g., such parameters may be derived from machine learning or deep learning or the like). For application of region segmentation such as in autonomous driving, identifying a region's content by context and/or pattern matching (e.g. road signs, road markers, traffic lights, pedestrian crossing, crosswalk, pedestrians, bridges, sidewalks, road, cars, other vehicles, road, buildings, etc.) and attaching an index to label of the region may be useful. The region layers discussed herein may be used in a wide variety of applications such as object detection, object tracking, computer vision, video encode/decode, or the like.

The techniques discussed herein may provide segmentation of video frames into two spatially coherent and temporally consistent regions based on motion such as by determining a global/local motion probability mask. segmentation of video frames into 3 spatially coherent and temporally consistent regions based on motion, and using one-stage region splitting of the foreground region by using dominant color or dominant motion. In some embodiments, segmentation of video frames into 3 spatially coherent and temporally consistent regions may be based on motion and using one-stage region splitting of the background region by using dominant color. In some embodiments, segmentation of video frames into 4 spatially coherent and temporally consistent regions may be based on motion and using one-stage region splitting of the foreground region by using dominant color or dominant motion, and using one-stage region splitting of the background region by using dominant color. In some embodiments, segmentation of video frames into 4 spatially coherent and temporally consistent regions may be based on motion and using two-stage region splitting of the foreground region by using dominant color or dominant motion in the first stage and dominant color or dominant motion or in the second stage. In some embodiments, segmentation of video frames into 5 spatially coherent and temporally consistent regions may be based on motion and using two-stage region splitting of the foreground region by using dominant color or dominant motion in the first stage, dominant color or dominant motion or in the second stage, and using one stage region splitting of the background region based on dominant color. In some embodiments, segmentation of video frames into 6 spatially coherent and temporally consistent regions may be based on motion and using two-stage region splitting of the foreground region by using dominant color or dominant motion in the first stage and dominant color or dominant motion or in the second stage, and using two stage region splitting of the background region with the first stage based on dominant color and the second stage based on dominant color.

Figure 26:
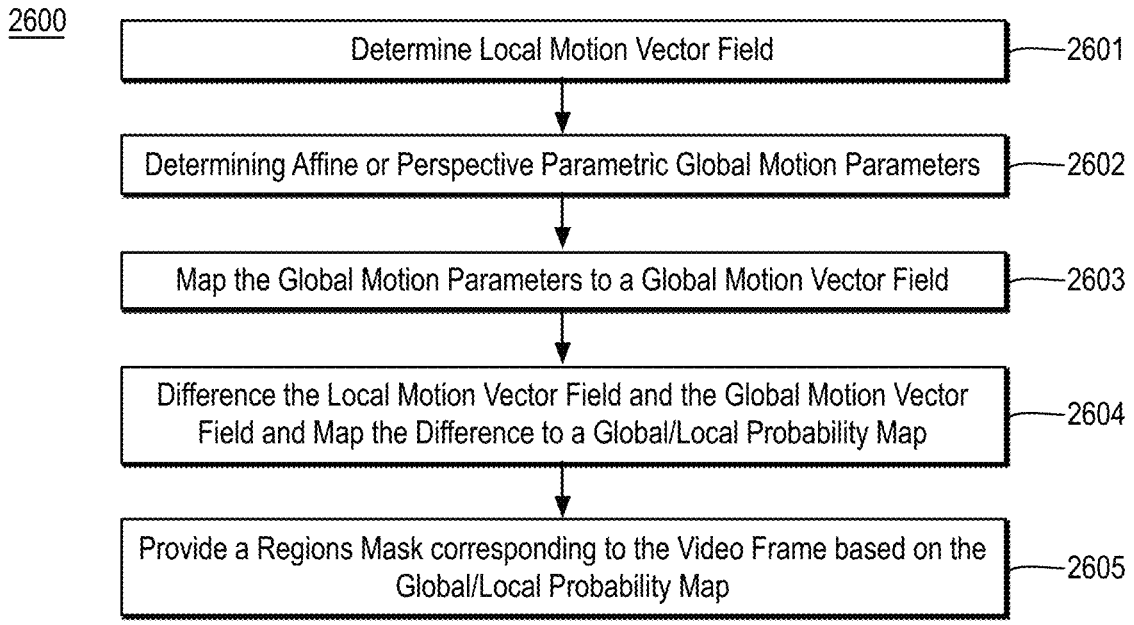
FIG. 26 is a flow diagram illustrating an example process for performing video frame segmentation.

FIG. 26 is a flow diagram illustrating an example process 2600 for performing video frame segmentation, arranged in accordance with at least some implementations of the present disclosure. Process 2600 may include one or more operations 2601-2605 as illustrated in FIG. 26. Process 2600 may form at least part of a video frame segmentation process. Furthermore, process 2600 will be described with reference to system 2800 of FIG. 28.

Figure 27:
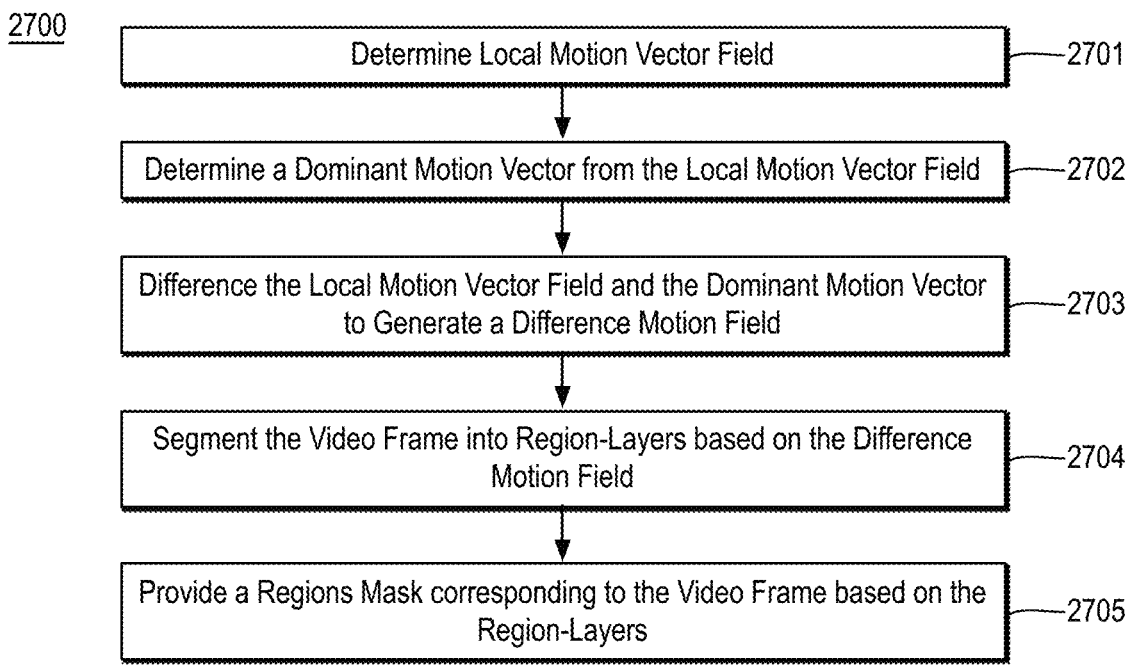
FIG. 27 is a flow diagram illustrating another example process for performing video frame segmentation.

FIG. 27 is a flow diagram illustrating another example process 2700 for performing video frame segmentation, arranged in accordance with at least some implementations of the present disclosure. Process 2700 may include one or more operations 2701-2705 as illustrated in FIG. 27. Process 2700 may form at least part of a video frame segmentation process. Furthermore, process 2700 will be described with reference to system 2800 of FIG. 28.

Figure 28:
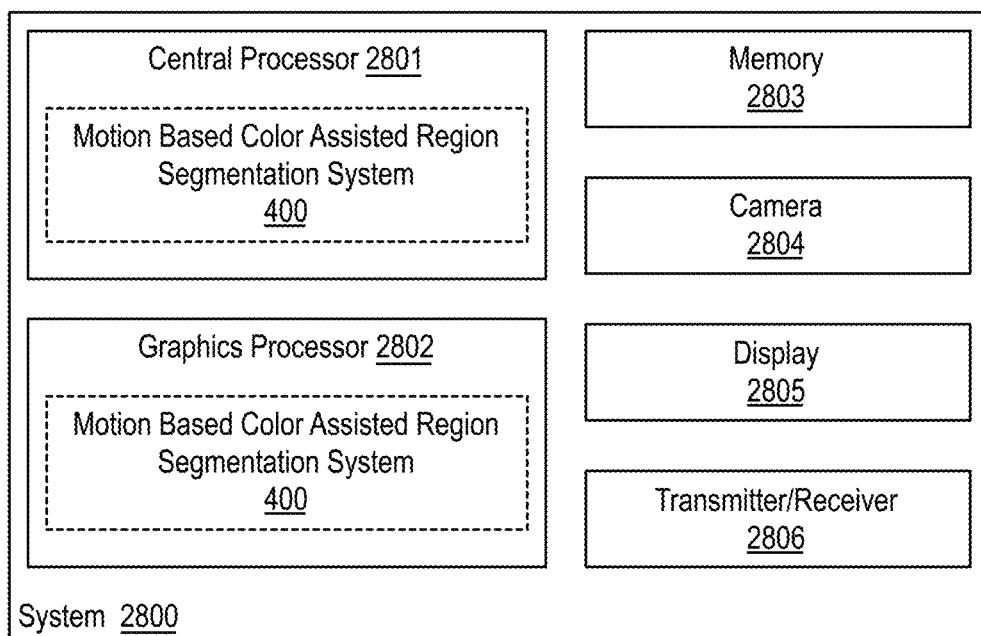
FIG. 28 is an illustrative diagram of an example system for performing video frame segmentation.

FIG. 28 is an illustrative diagram of an example system 2800 for performing video frame segmentation, arranged in accordance with at least some implementations of the present disclosure. For example, system 2800 may perform one or more operations discussed with respect to process 1500 or any other operations discussed herein. As shown in FIG. 28, system 2800 may include a central processor 2801, a graphics processor 2802, a memory 2803, a camera 2804, a display 2805, and a transmitter/receiver 2806. In some embodiments system 2800 may not include camera 2804, display 2805, and/or transmitter/receiver 2806. As shown, central processor 2801 and/or graphics processor 2802 may implement motion based color assisted region segmentation system 400. System 2800 and implement motion based color assisted region segmentation system 400 may include any system and encoder as discussed herein or combinations thereof. In the example of system 2800, memory 2803 may store frame data, image data, segmentation data, or any related data such as any other data discussed herein.

As shown, in some embodiments, motion based color assisted region segmentation system 400 may be implemented via central processor 2801. In other embodiments, one or more or portions of motion based color assisted region segmentation system 400 may be implemented via graphics processor 2802. In yet other embodiments, motion based color assisted region segmentation system 400 may be implemented by a video processing unit, a video processing pipeline, or the like. In some embodiments, motion based color assisted region segmentation system 400 may be implemented in hardware as a system-on-a-chip (SoC).

Graphics processor 2802 may include any number and type of graphics processing units that may provide the operations as discussed herein. Such operations may be implemented via software or hardware or a combination thereof. For example, graphics processor 2802 may include circuitry dedicated to manipulate and/or analyze images or frames obtained from memory 2803. Central processor 2801 may include any number and type of processing units or modules that may provide control and other high level functions for system 2800 and/or provide any operations as discussed herein. Memory 2803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2803 may be implemented by cache memory. In an embodiment, one or more or portions of motion based color assisted region segmentation system 400 may be implemented via an execution unit (EU) of graphics processor 2802 or another processor. The EU may include, for example, programmable logic or circuitry such as a logic core or cores that may provide a wide array of programmable logic functions. In an embodiment, one or more or portions of motion based color assisted region segmentation system 400 may be implemented via dedicated hardware such as fixed function circuitry or the like. Fixed function circuitry may include dedicated logic or circuitry and may provide a set of fixed function entry points that may map to the dedicated logic for a fixed purpose or function. Camera 2804 may be any suitable camera or device that may obtain image or frame data for processing as discussed herein. Display 2805 may be any display or device that may present image or frame data. Transmitter/receiver 2806 may include any suitable transmitter and/or receiver that may transmit or receive bitstream data as discussed herein.

System 2800 may implement any devices, systems, modules, units, or the like as discussed herein. Furthermore, system 2800 may implement any processes, operations, or the like as discussed herein. System 2800 may have any suitable form factor. For example, system 2800 may be implemented by a camera, a smartphone, an ultrabook, a tablet, a wearable device, a monitor, a desktop computer, a set top box, or the like.

Returning to discussion of FIG. 26, process 2600 may begin at operation 2601, where a local motion vector field based on a video frame and a reference video frame may be determined. The local motion vector field may be determined using any suitable technique or techniques. In an embodiment, the local motion field may be determined by down sampling the video frame and the reference video frame, performing a local motion search of the down sampled reference video frame based on blocks of the down sampled video frame to generate a first motion vector field, up sampling the first motion vector field, performing a first block size refined motion search and a second block size refined motion search based on the up sampled motion vector field to generate a first block size motion vector field and a second block size motion vector field, wherein the first block size is greater than the second block size, and combining the first and second block size motion vector fields based on error reduction to generate the local motion vector field at a resolution corresponding to the second block size.

Processing may continue at operation 2602, where affine or perspective parametric global motion parameters may be determined based on the video frame, the reference video frame, and the local motion vector field. The affine or perspective parametric global motion parameters may be determined based on the video frame, the reference video frame, and the local motion vector field using any suitable technique or techniques. In an embodiment, the affine or perspective parametric global motion parameters may be determined by applying one of an affine model or a perspective model to the video frame and the reference video frame to determine the global motion parameters such that the global motion parameters model a translation from the reference video frame to the video frame.

Processing may continue at operation 2603, where the global motion parameters may be mapped to a global motion vector field. The global motion parameters may be mapped to the global motion vector field using any suitable technique or techniques. In an embodiment, the mapping maps global parameters to block based motion vectors that provide a global motion vector field.

Processing may continue at operation 2604, where the local motion vector field and the global motion vector field may be differenced and the difference may be mapped to a global/local probability map. The global/local probability map may include any suitable information, data, or data structure that indicates global/local motion probability. In an embodiment, the global/local probability map comprises a plurality of probabilities, each probability corresponding to a location within the video frame and indicating a probability the location comprises local motion. The local motion vector field and the global motion vector field may be differenced using any suitable technique or techniques. In an embodiment, when a motion differencing method is a first value, differencing the local motion vector field and the global motion vector field includes determining a first plurality of differences between the local motion vector field and the global motion vector field each as a first sum of absolute value differences x and y values of local and global motion vectors and when the motion differencing method is a second value, differencing the local motion vector field and the global motion vector field includes determining a second plurality of differences between the local motion vector field and the global motion vector field each based on differences of local and global motion vectors in a polar coordinate domain.

Processing may continue at operation 2605, where a regions mask corresponding to the video frame based on the global/local probability map may be provided. The regions mask may include any suitable information, data, or data structure that indicates to which region-layer pixels of the video belong. In an embodiment, the regions mask indicates pixels of the video frame are included in one of a first or second region layer. For example, the regions mask may include an indicator for each pixel as to which region-layer of the region-layers the pixel belongs. The regions mask may be provided using any suitable technique or techniques. In an embodiment, providing the regions mask corresponding to the video frame based on the global/local probability map may include generating a binarization threshold, applying the binarization threshold to the global/local probability map to generate a binary global/local probability map, and mapping the binary global/local probability map to the regions mask. In some embodiments, prior to mapping the binary global/local probability map to the regions mask, process 2600 may further include applying a morphological open/close operator to the binary global/local probability map and removing isolated small size segments from the binary dominant color map.

As discussed, a regions mask may be provided based on global and local motion. In some embodiments, the regions mask may further be based on dominant motion. In an embodiment, process 2600 may include generating a dominant motion for the video frame and providing the regions mask based at least in part on the dominant motion.

As discussed, in some embodiments, processing may continue such that the first, second, or both region-layers are further segmented. In some embodiments, process 2600 may include determining a dominant color or a dominant motion for the second region layer such that the second region layer comprises a foreground or a background of the video frame and segmenting the second region layer based on the dominant color or the dominant motion into third and fourth region layers such that the regions mask indicates the pixels of the video frame are included in the first, third, or fourth region layer. In some embodiments, the first region layer is a foreground of the video frame and the second region layer is a background of the video frame and process 2600 further includes segmenting the first region layer based on one of dominant color or dominant motion into third and fourth region layers and segmenting the second region layer based one of dominant color or dominant motion into fifth and sixth region layers such that the regions mask indicates the pixels of the video frame are included in the third, fourth, fifth, or sixth region layer. In some embodiments, the first region layer is a foreground of the video frame and the second region layer is a background of the video frame and process 2600 further includes segmenting the first region layer based on one of dominant color or dominant motion into third and fourth region layers, segmenting the fourth region layer based on one of dominant color or dominant motion into fifth and sixth region layers, and segmenting the second region layer based on dominant color into seventh and eighth region layers such that the regions mask indicates the pixels of the video frame are included in the third, fifth, sixth, seventh or eighth region layer. As discussed herein, other segmentations of the first and second region-layers may be provided.

Process 2600 may be performed in series or at least partially in parallel for any number of video frames, video sequences, or the like.

Turning now to discussion of FIG. 27, process 2700 may begin at operation 2701, where a local motion vector field based on a video frame and a reference video frame may be determined. The local motion vector field may be determined using any suitable technique or techniques. In an embodiment, the local motion field may be determined by down sampling the video frame and the reference video frame, performing a local motion search of the down sampled reference video frame based on blocks of the down sampled video frame to generate a first motion vector field, up sampling the first motion vector field, performing a first block size refined motion search and a second block size refined motion search based on the up sampled motion vector field to generate a first block size motion vector field and a second block size motion vector field, wherein the first block size is greater than the second block size, and combining the first and second block size motion vector fields based on error reduction to generate the local motion vector field at a resolution corresponding to the second block size.

Processing may continue at operation 2702, where a dominant motion vector may be determined from the local motion vector field. The dominant motion vector may be determined using any suitable technique or techniques. In an embodiment, determining the dominant motion vector may include generating a histogram corresponding to the local motion vector field, determining a peak of the histograms, and defining the dominant motion vector as a motion vector corresponding to the peak the histogram.

Processing may continue at operation 2703, where the local motion vector field and the dominant motion vector may be differenced to generate a difference motion field. The local motion vector field and the dominant motion vector may be differenced using any suitable technique or techniques. In an embodiment, differencing the local motion vector field and the dominant motion vector may include differencing each motion vector of the local motion vector field with the dominant motion vector.

Processing may continue at operation 2704, where the video frame may be segmented into region-layers based on the difference motion field. The video frame may be segmented into region-layers based on the difference motion field using any suitable technique or techniques. In an embodiment, segmenting the video frame into region-layers based on the difference motion field may include generating a histogram corresponding to the local motion vector field, generating a binarization threshold based on the histogram, and applying the binarization threshold to the difference motion field to generate a binarized global/local probability map. In some embodiments, segmenting the video frame into region-layers based on the difference motion field further may further include applying at least one of a median filter, a region border reclassifier, or a segment-mask smoother to the binarized global/local probability map.

Processing may continue at operation 2705, where a regions mask may be provided corresponding to the video frame based on the region-layers. The regions mask may include any suitable information, data, or data structure that indicates to which region-layer pixels of the video belong. In an embodiment, the regions mask indicates pixels of the video frame are included in one of a first or second region layer. For example, the regions mask may include an indicator for each pixel as to which region-layer of the region-layers the pixel belongs. The regions mask may be provided using any suitable technique or techniques. In an embodiment, the regions mask corresponds to the segmentation provided at operation 2704 such that the first and second region-layers are signaled or indicated by the regions mask.

As discussed, in some embodiments, processing may continue such that the first, second, or both region-layers are further segmented. In some embodiments, process 2700 may further include determining a dominant color or a dominant motion for the second region layer such that the second region layer comprises a foreground or a background of the video frame and segmenting the second region layer based on the dominant color or the dominant motion into third and fourth region layers such that the regions mask indicates the pixels of the video frame are included in the first, third, or fourth region layer. In some embodiments, the first region layer is a foreground of the video frame and the second region layer is a background of the video frame and process 2600 further includes segmenting the first region layer based on one of dominant color or dominant motion into third and fourth region layers and segmenting the second region layer based one of dominant color or dominant motion into fifth and sixth region layers such that the regions mask indicates the pixels of the video frame are included in the third, fourth, fifth, or sixth region layer.

Process 2700 may be performed in series or at least partially in parallel for any number of video frames, video sequences, or the like.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 29:
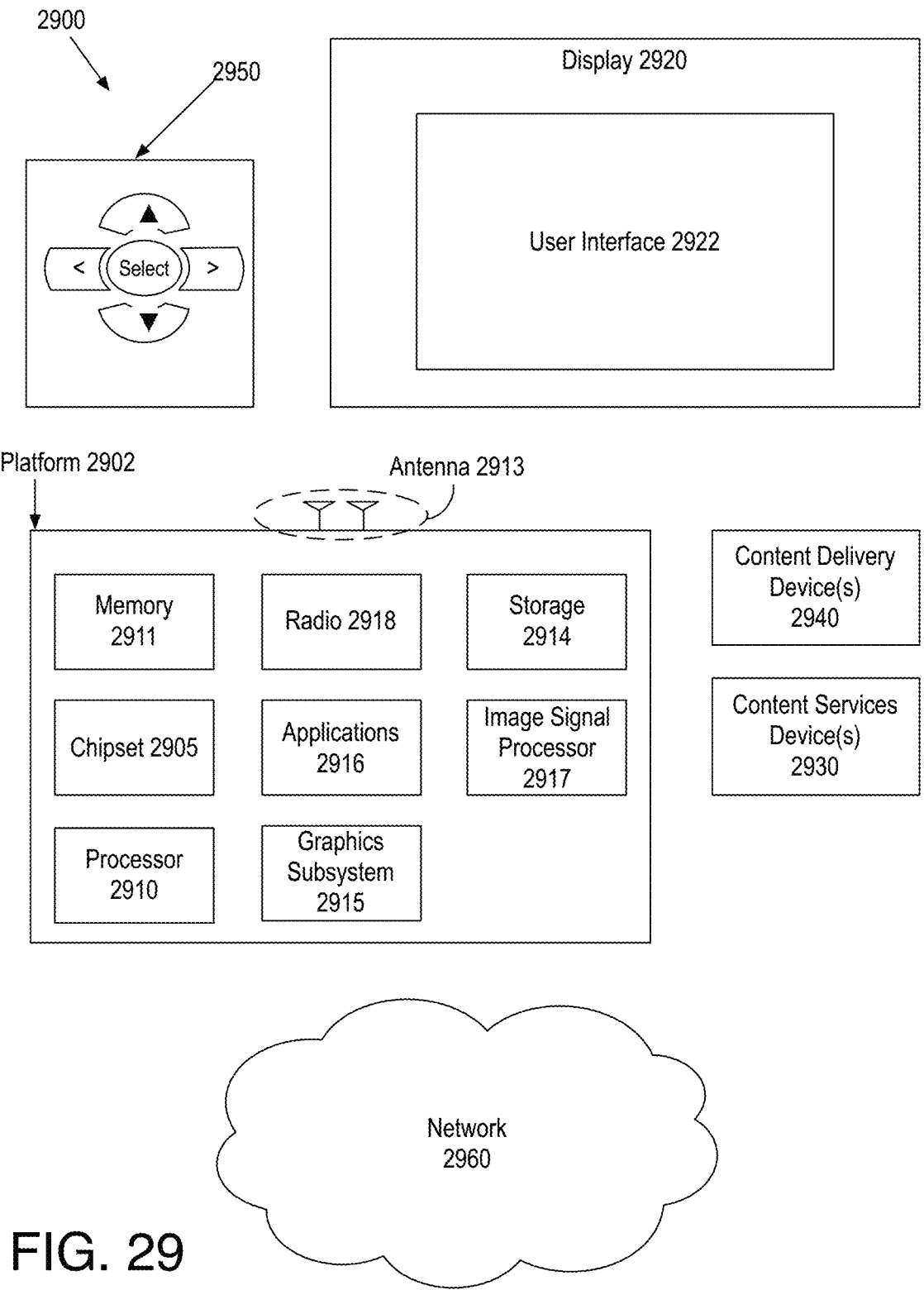
FIG. 29 is an illustrative diagram of an example system.

FIG. 29 is an illustrative diagram of an example system 2900, arranged in accordance with at least some implementations of the present disclosure. In various implementations, system 2900 may be a mobile device system although system 2900 is not limited to this context. For example, system 2900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2900 includes a platform 2902 coupled to a display 2920. Platform 2902 may receive content from a content device such as content services device(s) 2930 or content delivery device(s) 2940 or other content sources such as image sensors 2919. For example, platform 2902 may receive image data as discussed herein from image sensors 2919 or any other content source. A navigation controller 2950 including one or more navigation features may be used to interact with, for example, platform 2902 and/or display 2920. Each of these components is described in greater detail below.

In various implementations, platform 2902 may include any combination of a chipset 2905, processor 2910, memory 2911, antenna 2913, storage 2914, graphics subsystem 2915, applications 2916, image signal processor 2917 and/or radio 2918. Chipset 2905 may provide intercommunication among processor 2910, memory 2911, storage 2914, graphics subsystem 2915, applications 2916, image signal processor 2917 and/or radio 2918. For example, chipset 2905 may include a storage adapter (not depicted) capable of providing intercommunication with storage 2914.

Processor 2910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2910 may be dual-core processor(s), dual-core mobile processor(s), and so forth.

Memory 2911 may be implemented as a volatile memory device such as, but not limited to, a Random Access Memory (RAM), Dynamic Random Access Memory (DRAM), or Static RAM (SRAM).

Storage 2914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2914 may include technology to increase the storage performance enhanced protection for valuable digital media when multiple hard drives are included, for example.

Image signal processor 2917 may be implemented as a specialized digital signal processor or the like used for image processing. In some examples, image signal processor 2917 may be implemented based on a single instruction multiple data or multiple instruction multiple data architecture or the like. In some examples, image signal processor 2917 may be characterized as a media processor. As discussed herein, image signal processor 2917 may be implemented based on a system on a chip architecture and/or based on a multi-core architecture.

Graphics subsystem 2915 may perform processing of images such as still or video for display. Graphics subsystem 2915 may be a graphics processing unit (GPU) or a visual processing unit (VPU), for example. An analog or digital interface may be used to communicatively couple graphics subsystem 2915 and display 2920. For example, the interface may be any of a High-Definition Multimedia Interface, DisplayPort, wireless HDMI, and/or wireless HD compliant techniques. Graphics subsystem 2915 may be integrated into processor 2910 or chipset 2905. In some implementations, graphics subsystem 2915 may be a stand-alone device communicatively coupled to chipset 2905.

The image and/or video processing techniques described herein may be implemented in various hardware architectures. For example, image and/or video functionality may be integrated within a chipset. Alternatively, a discrete graphics and/or video processor may be used. As still another implementation, the image and/or video functions may be provided by a general purpose processor, including a multi-core processor. In further embodiments, the functions may be implemented in a consumer electronics device.

Radio 2918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2918 may operate in accordance with one or more applicable standards in any version.

In various implementations, display 2920 may include any television type monitor or display. Display 2920 may include, for example, a computer display screen, touch screen display, video monitor, television-like device, and/or a television. Display 2920 may be digital and/or analog. In various implementations, display 2920 may be a holographic display. Also, display 2920 may be a transparent surface that may receive a visual projection. Such projections may convey various forms of information, images, and/or objects. For example, such projections may be a visual overlay for a mobile augmented reality (MAR) application. Under the control of one or more software applications 2916, platform 2902 may display user interface 2922 on display 2920.

In various implementations, content services device(s) 2930 may be hosted by any national, international and/or independent service and thus accessible to platform 2902 via the Internet, for example. Content services device(s) 2930 may be coupled to platform 2902 and/or to display 2920. Platform 2902 and/or content services device(s) 2930 may be coupled to a network 2960 to communicate (e.g., send and/or receive) media information to and from network 2960. Content delivery device(s) 2940 also may be coupled to platform 2902 and/or to display 2920.

Image sensors 2919 may include any suitable image sensors that may provide image data based on a scene. For example, image sensors 2919 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 2919 may include any device that may detect information of a scene to generate image data.

In various implementations, content services device(s) 2930 may include a cable television box, personal computer, network, telephone, Internet enabled devices or appliance capable of delivering digital information and/or content, and any other similar device capable of uni-directionally or bi-directionally communicating content between content providers and platform 2902 and/display 2920, via network 2960 or directly. It will be appreciated that the content may be communicated uni-directionally and/or bi-directionally to and from any one of the components in system 2900 and a content provider via network 2960. Examples of content may include any media information including, for example, video, music, medical and gaming information, and so forth.

Content services device(s) 2930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2902 may receive control signals from navigation controller 2950 having one or more navigation features. The navigation features of navigation controller 2950 may be used to interact with user interface 2922, for example. In various embodiments, navigation controller 2950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2950 may be replicated on a display (e.g., display 2920) by movements of a pointer, cursor, focus ring, or other visual indicators displayed on the display. For example, under the control of software applications 2916, the navigation features located on navigation controller 2950 may be mapped to virtual navigation features displayed on user interface 2922, for example. In various embodiments, navigation controller 2950 may not be a separate component but may be integrated into platform 2902 and/or display 2920. The present disclosure, however, is not limited to the elements or in the context shown or described herein.

In various implementations, drivers (not shown) may include technology to enable users to instantly turn on and off platform 2902 like a television with the touch of a button after initial boot-up, when enabled, for example. Program logic may allow platform 2902 to stream content to media adaptors or other content services device(s) 2930 or content delivery device(s) 2940 even when the platform is turned "off." In addition, chipset 2905 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2900 may be integrated. For example, platform 2902 and content services device(s) 2930 may be integrated, or platform 2902 and content delivery device(s) 2940 may be integrated, or platform 2902, content services device(s) 2930, and content delivery device(s) 2940 may be integrated, for example. In various embodiments, platform 2902 and display 2920 may be an integrated unit. Display 2920 and content service device(s) 2930 may be integrated, or display 2920 and content delivery device(s) 2940 may be integrated, for example. These examples are not meant to limit the present disclosure.

In various embodiments, system 2900 may be implemented as a wireless system, a wired system, or a combination of both. When implemented as a wireless system, system 2900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 29.

Figure 30:
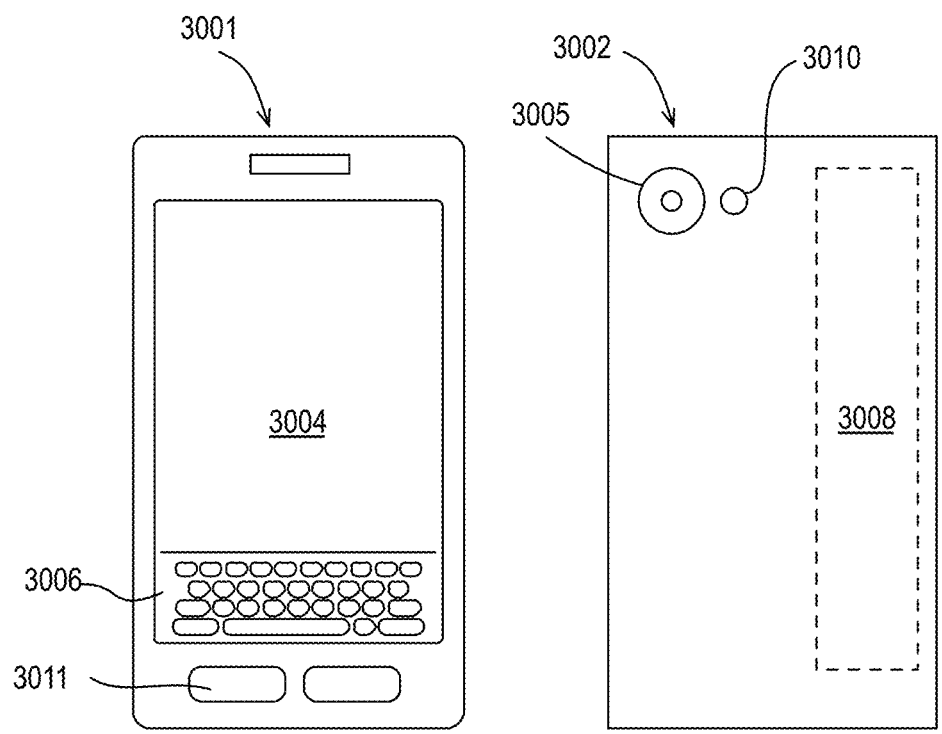
FIG. 30 illustrates an example small form factor device, all arranged in accordance with at least some implementations of the present disclosure.

As described above, system 2900 may be embodied in varying physical styles or form factors. FIG. 30 illustrates an example small form factor device 3000, arranged in accordance with at least some implementations of the present disclosure. In some examples, system 2900 may be implemented via device 3000. In various embodiments, for example, device 3000 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 30, device 3000 may include a housing with a front 3001 and a back 3002. Device 3000 includes a display 3004, an input/output (I/O) device 3006, and an integrated antenna 3008. Device 3000 also may include navigation features 3011. I/O device 3006 may include any suitable I/O device for entering information into a mobile computing device. Examples for I/O device 3006 may include an alphanumeric keyboard, a numeric keypad, a touch pad, input keys, buttons, switches, microphones, speakers, voice recognition device and software, and so forth. Information also may be entered into device 3000 by way of microphone (not shown), or may be digitized by a voice recognition device. As shown, device 3000 may include a camera 3005 (e.g., including a lens, an aperture, and an imaging sensor) and a flash 3010 integrated into back 3002 (or elsewhere) of device 3000. In other examples, camera 3005 and/or flash 3010 may be integrated into front 3001 of device 3000 and/or additional cameras (e.g., such that device 3000 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer implemented method for segmenting video frames into region-layers comprises determining a local motion vector field based on a video frame and a reference video frame, determining affine or perspective parametric global motion parameters based on the video frame, the reference video frame, and the local motion vector field, mapping the global motion parameters to a global motion vector field, differencing the local motion vector field and the global motion vector field and mapping the difference to a global/local probability map, such that the global/local probability map comprises a plurality of probabilities, each probability corresponding to a location within the video frame and indicating a probability the location comprises local motion, and providing a regions mask corresponding to the video frame based on the global/local probability map, the regions mask indicating pixels of the video frame are included in one of a first or second region layer.

Further to the first embodiments, the method further comprises generating a dominant motion for the video frame and providing the regions mask based at least in part on the dominant motion.

Further to the first embodiments, determining the local motion vector field comprises down sampling the video frame and the reference video frame, performing a local motion search of the down sampled reference video frame based on blocks of the down sampled video frame to generate a first motion vector field, up sampling the first motion vector field, performing a first block size refined motion search and a second block size refined motion search based on the up sampled motion vector field to generate a first block size motion vector field and a second block size motion vector field, such that the first block size is greater than the second block size, and combining the first and second block size motion vector fields based on error reduction to generate the local motion vector field at a resolution corresponding to the second block size.

Further to the first embodiments, determining the global motion parameters comprises applying one of an affine model or a perspective model to the video frame and the reference video frame to determine the global motion parameters, such that the global motion parameters model a translation from the reference video frame to the video frame.

Further to the first embodiments, when a motion differencing method is a first value, differencing the local motion vector field and the global motion vector field comprises determining a first plurality of differences between the local motion vector field and the global motion vector field each as a first sum of absolute value differences x and y values of local and global motion vectors, and, when the motion differencing method is a second value, differencing the local motion vector field and the global motion vector field comprises determining a second plurality of differences between the local motion vector field and the global motion vector field each based on differences of local and global motion vectors in a polar coordinate domain.

Further to the first embodiments, providing the regions mask corresponding to the video frame based on the global/local probability map comprises generating a binarization threshold, applying the binarization threshold to the global/local probability map to generate a binary global/local probability map, and mapping the binary global/local probability map to the regions mask.

Further to the first embodiments, the method further comprises, prior to mapping the binary global/local probability map to the regions mask, applying a morphological open/close operator to the binary global/local probability map and removing isolated small size segments from the binary dominant color map.

Further to the first embodiments, the method further comprises determining a dominant color or a dominant motion for the second region layer, such that the second region layer comprises a foreground or a background of the video frame and segmenting the second region layer based on the dominant color or the dominant motion into third and fourth region layers, such that the regions mask indicates the pixels of the video frame are included in the first, third, or fourth region layer.

Further to the first embodiments, the first region layer comprises a foreground of the video frame and the second region layer comprises a background of the video frame and the method further comprises segmenting the first region layer based on one of dominant color or dominant motion into third and fourth region layers and segmenting the second region layer based one of dominant color or dominant motion into fifth and sixth region layers, such that the regions mask indicates the pixels of the video frame are included in the third, fourth, fifth, or sixth region layer.

Further to the first embodiments, the first region layer comprises a foreground of the video frame and the second region layer comprises a background of the video frame and the method further comprises segmenting the first region layer based on one of dominant color or dominant motion into third and fourth region layers, segmenting the fourth region layer based on one of dominant color or dominant motion into fifth and sixth region layers, and segmenting the second region layer based on dominant color into seventh and eighth region layers, such that the regions mask indicates the pixels of the video frame are included in the third, fifth, sixth, seventh or eighth region layer.

In one or more second embodiments, a computer implemented method for segmenting video frames into region-layers comprises determining a local motion vector field based on a video frame and a reference video frame, determining a dominant motion vector from the local motion vector field, differencing the local motion vector field and the dominant motion vector to generate a difference motion field, segmenting the video frame into region-layers based on the difference motion field, and providing a regions mask corresponding to the video frame based on the region-layers, the regions mask indicating pixels of the video frame are included in one of a first or second region-layer.

Further to the second embodiments, determining the dominant motion vector comprises generating a histogram corresponding to the local motion vector field, determining a peak of the histograms, and defining the dominant motion vector as a motion vector corresponding to the peak the histogram.

Further to the second embodiments, differencing the local motion vector field and the dominant motion vector comprises differencing each motion vector of the local motion vector field with the dominant motion vector.

Further to the second embodiments, segmenting the video frame into region-layers based on the difference motion field comprises generating a histogram corresponding to the local motion vector field, generating a binarization threshold based on the histogram, and applying the binarization threshold to the difference motion field to generate a binarized global/local probability map.

Further to the second embodiments, segmenting the video frame into region-layers based on the difference motion field comprises generating a histogram corresponding to the local motion vector field, generating a binarization threshold based on the histogram, and applying the binarization threshold to the difference motion field to generate a binarized global/local probability map and segmenting the video frame into region-layers based on the difference motion field further comprises applying at least one of a median filter, a region border reclassifier, or a segment-mask smoother to the binarized global/local probability map.

Further to the second embodiments, the method further comprises determining a dominant color or a dominant motion for the second region layer, such that the second region layer comprises a foreground or a background of the video frame and segmenting the second region layer based on the dominant color or the dominant motion into third and fourth region layers, such that the regions mask indicates the pixels of the video frame are included in the first, third, or fourth region layer.

Further to the second embodiments, the first region layer comprises a foreground of the video frame and the second region layer comprises a background of the video frame and the method further comprises segmenting the first region layer based on one of dominant color or dominant motion into third and fourth region layers and segmenting the second region layer based one of dominant color or dominant motion into fifth and sixth region layers, such that the regions mask indicates the pixels of the video frame are included in the third, fourth, fifth, or sixth region layer.

In one or more third embodiments, a system for segmenting video frames into region-layers comprises a memory configured to store a video frame of a sequence of video frames and a processor coupled to the memory, the processor to determine a local motion vector field based on the video frame, to determine affine or perspective parametric global motion parameters based on the video frame, the reference video frame, and the local motion vector field, to map the global motion parameters to a global motion vector field, to difference the local motion vector field and the global motion vector field and map the difference to a global/local probability map, such that the global/local probability map comprises a plurality of probabilities, each probability corresponding to a location within the video frame and indicating a probability the location comprises local motion, and to provide a regions mask corresponding to the video frame based on the global/local probability map, the regions mask indicating pixels of the video frame are included in one of a first or second region layer.

Further to the third embodiments, the processor is further to generate a dominant motion for the video frame and provide the regions mask based at least in part on the dominant motion.

Further to the third embodiments, the processor to determine the local motion vector field comprises the processor to down sample the video frame and the reference video frame, to perform a local motion search of the down sampled reference video frame based on blocks of the down sampled video frame to generate a first motion vector field, to up sample the first motion vector field, to perform a first block size refined motion search and a second block size refined motion search based on the up sampled motion vector field to generate a first block size motion vector field and a second block size motion vector field, such that the first block size is greater than the second block size, and to combine the first and second block size motion vector fields based on error reduction to generate the local motion vector field at a resolution corresponding to the second block size.

Further to the third embodiments, the processor to determine the global motion parameters comprises the processor to apply one of an affine model or a perspective model to the video frame and the reference video frame to determine the global motion parameters, such that the global motion parameters model a translation from the reference video frame to the video frame.

Further to the third embodiments, when a motion differencing method is a first value, the processor to difference the local motion vector field and the global motion vector field comprises the processor to determine a first plurality of differences between the local motion vector field and the global motion vector field each as a first sum of absolute value differences x and y values of local and global motion vectors and, when the motion differencing method is a second value, the processor to difference the local motion vector field and the global motion vector field comprises the processor to difference a second plurality of differences between the local motion vector field and the global motion vector field each based on differences of local and global motion vectors in a polar coordinate domain.

Further to the third embodiments, the processor to provide the regions mask corresponding to the video frame based on the global/local probability map comprises the processor to generate a binarization threshold, to apply the binarization threshold to the global/local probability map to generate a binary global/local probability map, and to map the binary global/local probability map to the regions mask.

Further to the third embodiments, the processor is further to, prior to mapping the binary global/local probability map to the regions mask, apply a morphological open/close operator to the binary global/local probability map and remove isolated small size segments from the binary dominant color map.

Further to the third embodiments, the processor is further to determine a dominant color or a dominant motion for the second region layer, such that the second region layer comprises a foreground or a background of the video frame and to segment the second region layer based on the dominant color or the dominant motion into third and fourth region layers, such that the regions mask indicates the pixels of the video frame are included in the first, third, or fourth region layer.

Further to the third embodiments, the first region layer comprises a foreground of the video frame and the second region layer comprises a background of the video frame, and the processor is further to segment the first region layer based on one of dominant color or dominant motion into third and fourth region layers and to segment the second region layer based one of dominant color or dominant motion into fifth and sixth region layers, such that the regions mask indicates the pixels of the video frame are included in the third, fourth, fifth, or sixth region layer.

Further to the third embodiments, the first region layer comprises a foreground of the video frame and the second region layer comprises a background of the video frame, and the processor is further to segment the first region layer based on one of dominant color or dominant motion into third and fourth region layers, to segment the fourth region layer based on one of dominant color or dominant motion into fifth and sixth region layers, and to segment the second region layer based on dominant color into seventh and eighth region layers, such that the regions mask indicates the pixels of the video frame are included in the third, fifth, sixth, seventh or eighth region layer.

In one or more fourth embodiments, system for segmenting video frames into region-layers comprises a memory configured to store a video frame of a sequence of video frames and a processor coupled to the memory, the processor to determine a local motion vector field based on the video frame and a reference video frame, to determine a dominant motion vector from the local motion vector field, to difference the local motion vector field and the dominant motion vector to generate a difference motion field, to segment the video frame into region-layers based on the difference motion field, and to provide a regions mask corresponding to the video frame based on the region-layers, the regions mask indicating pixels of the video frame are included in one of a first or second region-layer.

Further to the fourth embodiments, the processor to determine the dominant motion vector comprises the processor to generate a histogram corresponding to the local motion vector field, to determine a peak of the histograms, and to define the dominant motion vector as a motion vector corresponding to the peak the histogram.

Further to the fourth embodiments, the processor to difference the local motion vector field and the dominant motion vector comprises the processor to difference each motion vector of the local motion vector field with the dominant motion vector.

Further to the fourth embodiments, the processor to segment the video frame into region-layers based on the difference motion field comprises the processor to generate a histogram corresponding to the local motion vector field, to generate a binarization threshold based on the histogram, and to apply the binarization threshold to the difference motion field to generate a binarized global/local probability map Further to the fourth embodiments, the processor to segment the video frame into region-layers based on the difference motion field comprises the processor to generate a histogram corresponding to the local motion vector field, to generate a binarization threshold based on the histogram, and to apply the binarization threshold to the difference motion field to generate a binarized global/local probability map, and the processor to segment the video frame into region-layers based on the difference motion field further comprises the processor to apply at least one of a median filter, a region border reclassifier, or a segment-mask smoother to the binarized global/local probability map.

Further to the fourth embodiments, the processor is further to determine a dominant color or a dominant motion for the second region layer, such that the second region layer comprises a foreground or a background of the video frame, and to segment the second region layer based on the dominant color or the dominant motion into third and fourth region layers, such that the regions mask indicates the pixels of the video frame are included in the first, third, or fourth region layer.

Further to the fourth embodiments, the first region layer comprises a foreground of the video frame and the second region layer comprises a background of the video frame, and the processor is further to segment the first region layer based on one of dominant color or dominant motion into third and fourth region layers and to segment the second region layer based one of dominant color or dominant motion into fifth and sixth region layers, such that the regions mask indicates the pixels of the video frame are included in the third, fourth, fifth, or sixth region layer.

In one or more fifth embodiments, a system comprises means for determining a local motion vector field based on a video frame and a reference video frame, means for determining affine or perspective parametric global motion parameters based on the video frame, the reference video frame, and the local motion vector field, means for mapping the global motion parameters to a global motion vector field, means for differencing the local motion vector field and the global motion vector field and mapping the difference to a global/local probability map, such that the global/local probability map comprises a plurality of probabilities, each probability corresponding to a location within the video frame and indicating a probability the location comprises local motion, and means for providing a regions mask corresponding to the video frame based on the global/local probability map, the regions mask indicating pixels of the video frame are included in one of a first or second region layer.

Further to the fifth embodiments, when a motion differencing method is a first value, the means for differencing the local motion vector field and the global motion vector field comprises means for determining a first plurality of differences between the local motion vector field and the global motion vector field each as a first sum of absolute value differences x and y values of local and global motion vectors and, when the motion differencing method is a second value, the means for differencing the local motion vector field and the global motion vector field comprises means for determining a second plurality of differences between the local motion vector field and the global motion vector field each based on differences of local and global motion vectors in a polar coordinate domain.

Further to the fifth embodiments, the means for providing the regions mask corresponding to the video frame based on the global/local probability map comprise means for generating a binarization threshold, means for applying the binarization threshold to the global/local probability map to generate a binary global/local probability map, and means for mapping the binary global/local probability map to the regions mask.

Further to the fifth embodiments, the system further comprises means for determining a dominant color or a dominant motion for the second region layer, such that the second region layer comprises a foreground or a background of the video frame and means for segmenting the second region layer based on the dominant color or the dominant motion into third and fourth region layers, such that the regions mask indicates the pixels of the video frame are included in the first, third, or fourth region layer.

Further to the fifth embodiments, the first region layer comprises a foreground of the video frame and the second region layer comprises a background of the video frame and the system further comprises means for segmenting the first region layer based on one of dominant color or dominant motion into third and fourth region layers and means for segmenting the second region layer based one of dominant color or dominant motion into fifth and sixth region layers, such that the regions mask indicates the pixels of the video frame are included in the third, fourth, fifth, or sixth region layer.

In one or more sixth embodiments, a system comprises means for determining a local motion vector field based on a video frame and a reference video frame, means for determining a dominant motion vector from the local motion vector field, means for differencing the local motion vector field and the dominant motion vector to generate a difference motion field, means for segmenting the video frame into region-layers based on the difference motion field, and means for providing a regions mask corresponding to the video frame based on the region-layers, the regions mask indicating pixels of the video frame are included in one of a first or second region-layer.

Further to the fifth embodiments, the means for determining the dominant motion vector comprise means for generating a histogram corresponding to the local motion vector field, means for determining a peak of the histograms, and means for defining the dominant motion vector as a motion vector corresponding to the peak the histogram.

Further to the fifth embodiments, the means for segmenting the video frame into region-layers based on the difference motion field comprise means for generating a histogram corresponding to the local motion vector field, means for generating a binarization threshold based on the histogram, and means for applying the binarization threshold to the difference motion field to generate a binarized global/local probability map.

Further to the fifth embodiments, the system further comprises means for determining a dominant color or a dominant motion for the second region layer, such that the second region layer comprises a foreground or a background of the video frame and means for segmenting the second region layer based on the dominant color or the dominant motion into third and fourth region layers, such that the regions mask indicates the pixels of the video frame are included in the first, third, or fourth region layer.

Further to the fifth embodiments, the first region layer comprises a foreground of the video frame and the second region layer comprises a background of the video frame and the system further comprises means for segmenting the first region layer based on one of dominant color or dominant motion into third and fourth region layers and means for segmenting the second region layer based one of dominant color or dominant motion into fifth and sixth region layers, such that the regions mask indicates the pixels of the video frame are included in the third, fourth, fifth, or sixth region layer.

In one or more seventh embodiments, at least one machine readable medium comprises a plurality of instructions that, in response to being executed on a device, cause the device to segment video frames into region-layers by determining a local motion vector field based on a video frame and a reference video frame, determining affine or perspective parametric global motion parameters based on the video frame, the reference video frame, and the local motion vector field, mapping the global motion parameters to a global motion vector field, differencing the local motion vector field and the global motion vector field and mapping the difference to a global/local probability map, such that the global/local probability map comprises a plurality of probabilities, each probability corresponding to a location within the video frame and indicating a probability the location comprises local motion, and providing a regions mask corresponding to the video frame based on the global/local probability map, the regions mask indicating pixels of the video frame are included in one of a first or second region layer.

Further to the seventh embodiments, when a motion differencing method is a first value, differencing the local motion vector field and the global motion vector field comprises determining a first plurality of differences between the local motion vector field and the global motion vector field each as a first sum of absolute value differences x and y values of local and global motion vectors and, when the motion differencing method is a second value, differencing the local motion vector field and the global motion vector field comprises determining a second plurality of differences between the local motion vector field and the global motion vector field each based on differences of local and global motion vectors in a polar coordinate domain.

Further to the seventh embodiments, providing the regions mask corresponding to the video frame based on the global/local probability map comprises generating a binarization threshold, applying the binarization threshold to the global/local probability map to generate a binary global/local probability map, and mapping the binary global/local probability map to the regions mask.

Further to the seventh embodiments, the machine readable medium comprises further instructions that, in response to being executed on the device, cause the device to segment video frames into region-layers by determining a dominant color or a dominant motion for the second region layer, such that the second region layer comprises a foreground or a background of the video frame and segmenting the second region layer based on the dominant color or the dominant motion into third and fourth region layers, such that the regions mask indicates the pixels of the video frame are included in the first, third, or fourth region layer.

Further to the seventh embodiments, the first region layer comprises a foreground of the video frame and the second region layer comprises a background of the video frame and the machine readable medium comprises further instructions that, in response to being executed on the device, cause the device to segment video frames into region-layers by segmenting the first region layer based on one of dominant color or dominant motion into third and fourth region layers and segmenting the second region layer based one of dominant color or dominant motion into fifth and sixth region layers, such that the regions mask indicates the pixels of the video frame are included in the third, fourth, fifth, or sixth region layer.

In one or more eighth embodiments, at least one machine readable medium comprises a plurality of instructions that, in response to being executed on a device, cause the device to segment video frames into region-layers by determining a local motion vector field based on a video frame and a reference video frame, determining a dominant motion vector from the local motion vector field, differencing the local motion vector field and the dominant motion vector to generate a difference motion field, segmenting the video frame into region-layers based on the difference motion field, and providing a regions mask corresponding to the video frame based on the region-layers, the regions mask indicating pixels of the video frame are included in one of a first or second region-layer.

Further to the eighth embodiments, determining the dominant motion vector comprises generating a histogram corresponding to the local motion vector field, determining a peak of the histograms, and defining the dominant motion vector as a motion vector corresponding to the peak the histogram.

Further to the eighth embodiments, segmenting the video frame into region-layers based on the difference motion field comprises generating a histogram corresponding to the local motion vector field, generating a binarization threshold based on the histogram, and applying the binarization threshold to the difference motion field to generate a binarized global/local probability map.

Further to the eighth embodiments, the machine readable medium comprises further instructions that, in response to being executed on the device, cause the device to segment video frames into region-layers by determining a dominant color or a dominant motion for the second region layer, such that the second region layer comprises a foreground or a background of the video frame and segmenting the second region layer based on the dominant color or the dominant motion into third and fourth region layers, such that the regions mask indicates the pixels of the video frame are included in the first, third, or fourth region layer.

Further to the eighth embodiments, the first region layer comprises a foreground of the video frame and the second region layer comprises a background of the video frame and the machine readable medium comprises further instructions that, in response to being executed on the device, cause the device to segment video frames into region-layers by segmenting the first region layer based on one of dominant color or dominant motion into third and fourth region layers and segmenting the second region layer based one of dominant color or dominant motion into fifth and sixth region layers, such that the regions mask indicates the pixels of the video frame are included in the third, fourth, fifth, or sixth region layer.

In one or more ninth embodiments, at least one machine readable medium may include a plurality of instructions that in response to being executed on a computing device, causes the computing device to perform a method according to any one of the above embodiments.

In one or more tenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for segmenting video frames into region-layers comprising:
    determining a local motion vector field based on a video frame and a reference video frame;
    determining affine or perspective parametric global motion parameters based on the video frame, the reference video frame, and the local motion vector field;
    mapping the global motion parameters to a global motion vector field;
    differencing the local motion vector field and the global motion vector field and mapping the difference to a global/local probability map, wherein the global/local probability map comprises a plurality of probabilities, each probability corresponding to a location within the video frame and indicating a probability the location comprises local motion; and
    providing a regions mask corresponding to the video frame based on the global/local probability map, the regions mask indicating pixels of the video frame are included in one of a first or second region layer.

2. The method of claim 1, further comprising:
    generating a dominant motion for the video frame; and
    providing the regions mask based at least in part on the dominant motion.

3. The method of claim 1, wherein determining the local motion vector field comprises:
    down sampling the video frame and the reference video frame;
    performing a local motion search of the down sampled reference video frame based on blocks of the down sampled video frame to generate a first motion vector field;
    up sampling the first motion vector field;
    performing a first block size refined motion search and a second block size refined motion search based on the up sampled motion vector field to generate a first block size motion vector field and a second block size motion vector field, wherein the first block size is greater than the second block size; and
    combining the first and second block size motion vector fields based on error reduction to generate the local motion vector field at a resolution corresponding to the second block size.

4. The method of claim 1, wherein determining the global motion parameters comprises:
    applying one of an affine model or a perspective model to the video frame and the reference video frame to determine the global motion parameters, wherein the global motion parameters model a translation from the reference video frame to the video frame.

5. The method of claim 1, wherein
when a motion differencing method is a first value, differencing the local motion vector field and the global motion vector field comprises determining a first plurality of differences between the local motion vector field and the global motion vector field each as a first sum of absolute value differences x and y values of local and global motion vectors; and
when the motion differencing method is a second value, differencing the local motion vector field and the global motion vector field comprises determining a second plurality of differences between the local motion vector field and the global motion vector field each based on differences of local and global motion vectors in a polar coordinate domain.

6. The method of claim 1, wherein providing the regions mask corresponding to the video frame based on the global/local probability map comprises:
generating a binarization threshold;
applying the binarization threshold to the global/local probability map to generate a binary global/local probability map; and
mapping the binary global/local probability map to the regions mask.

7. The method of claim 6, further comprising, prior to mapping the binary global/local probability map to the regions mask:
applying a morphological open/close operator to the binary global/local probability map; and
removing isolated small size segments from the binary dominant color map.

8. The method of claim 1, further comprising:
determining a dominant color or a dominant motion for the second region layer, wherein the second region layer comprises a foreground or a background of the video frame; and
segmenting the second region layer based on the dominant color or the dominant motion into third and fourth region layers, wherein the regions mask indicates the pixels of the video frame are included in the first, third, or fourth region layer.

9. The method of claim 1, wherein the first region layer comprises a foreground of the video frame and the second region layer comprises a background of the video frame, the method further comprising:
segmenting the first region layer based on one of dominant color or dominant motion into third and fourth region layers; and
segmenting the second region layer based one of dominant color or dominant motion into fifth and sixth region layers, wherein the regions mask indicates the pixels of the video frame are included in the third, fourth, fifth, or sixth region layer.

10. The method of claim 1, wherein the first region layer comprises a foreground of the video frame and the second region layer comprises a background of the video frame, the method further comprising:
segmenting the first region layer based on one of dominant color or dominant motion into third and fourth region layers;
segmenting the fourth region layer based on one of dominant color or dominant motion into fifth and sixth region layers; and
segmenting the second region layer based on dominant color into seventh and eighth region layers, wherein the regions mask indicates the pixels of the video frame are included in the third, fifth, sixth, seventh or eighth region layer.

11. A computer implemented method for segmenting video frames into region-layers comprising:
determining a local motion vector field based on a video frame and a reference video frame;
determining a dominant motion vector from the local motion vector field;
differencing the local motion vector field and the dominant motion vector to generate a difference motion field;
segmenting the video frame into region-layers by generating a histogram corresponding to the local motion vector field, generating a binarization threshold based on the histogram, and applying the binarization threshold to the difference motion field to generate a binarized global/local probability map; and
providing a regions mask corresponding to the video frame based on the region-layers, the regions mask indicating pixels of the video frame are included in one of a first or second region-layer.

12. The method of claim 11, wherein determining the dominant motion vector comprises:
determining a peak of the histogram; and
defining the dominant motion vector as a motion vector corresponding to the peak the histogram.

13. The method of claim 11, wherein differencing the local motion vector field and the dominant motion vector comprises differencing each motion vector of the local motion vector field with the dominant motion vector.

14. The method of claim 11, wherein segmenting the video frame into region-layers further comprises applying at least one of a median filter, a region border reclassifier, or a segment-mask smoother to the binarized global/local probability map.

15. The method of claim 11, further comprising:
determining a dominant color or a dominant motion for the second region layer, wherein the second region layer comprises a foreground or a background of the video frame; and
segmenting the second region layer based on the dominant color or the dominant motion into third and fourth region layers, wherein the regions mask indicates the pixels of the video frame are included in the first, third, or fourth region layer.

16. The method of claim 11, wherein the first region layer comprises a foreground of the video frame and the second region layer comprises a background of the video frame, the method further comprising:
segmenting the first region layer based on one of dominant color or dominant motion into third and fourth region layers; and
segmenting the second region layer based one of dominant color or dominant motion into fifth and sixth region layers, wherein the regions mask indicates the pixels of the video frame are included in the third, fourth, fifth, or sixth region layer.

17. A system for segmenting video frames into region-layers comprising:
a memory configured to store a video frame of a sequence of video frames; and
a processor coupled to the memory, the processor to determine a local motion vector field based on the video frame, to determine affine or perspective parametric global motion parameters based on the video frame, the reference video frame, and the local motion vector field, to map the global motion parameters to a global motion vector field, to difference the local motion vector field and the global motion vector field and map the difference to a global/local probability map, wherein the global/local probability map comprises a plurality of probabilities, each probability corresponding to a location within the video frame and indicating a probability the location comprises local motion, and to provide a regions mask corresponding to the video frame based on the global/local probability map, the regions mask indicating pixels of the video frame are included in one of a first or second region layer.

18. The system of claim 17, wherein, when a motion differencing method is a first value, the processor to difference the local motion vector field and the global motion vector field comprises the processor to determine a first plurality of differences between the local motion vector field and the global motion vector field each as a first sum of absolute value differences x and y values of local and global motion vectors and, when the motion differencing method is a second value, the processor to difference the local motion vector field and the global motion vector field comprises the processor to difference a second plurality of differences between the local motion vector field and the global motion vector field each based on differences of local and global motion vectors in a polar coordinate domain.

19. The system of claim 17, wherein the processor to provide the regions mask corresponding to the video frame based on the global/local probability map comprises the processor to generate a binarization threshold, to apply the binarization threshold to the global/local probability map to generate a binary global/local probability map, and to map the binary global/local probability map to the regions mask.

20. The system of claim 17, wherein the processor is further to determine a dominant color or a dominant motion for the second region layer, wherein the second region layer comprises a foreground or a background of the video frame and to segment the second region layer based on the dominant color or the dominant motion into third and fourth region layers, wherein the regions mask indicates the pixels of the video frame are included in the first, third, or fourth region layer.

21. The system of claim 17, wherein the first region layer comprises a foreground of the video frame and the second region layer comprises a background of the video frame, and the processor is further to segment the first region layer based on one of dominant color or dominant motion into third and fourth region layers and to segment the second region layer based one of dominant color or dominant motion into fifth and sixth region layers, wherein the regions mask indicates the pixels of the video frame are included in the third, fourth, fifth, or sixth region layer.

22. At least one non-transitory machine readable medium comprising a plurality of instructions that, in response to being executed on a device, cause the device to segment video frames into region-layers by:
determining a local motion vector field based on a video frame and a reference video frame;
determining affine or perspective parametric global motion parameters based on the video frame, the reference video frame, and the local motion vector field;
mapping the global motion parameters to a global motion vector field;
differencing the local motion vector field and the global motion vector field and mapping the difference to a global/local probability map, wherein the global/local probability map comprises a plurality of probabilities, each probability corresponding to a location within the video frame and indicating a probability the location comprises local motion; and
providing a regions mask corresponding to the video frame based on the global/local probability map, the regions mask indicating pixels of the video frame are included in one of a first or second region layer.

23. The non-transitory machine readable medium of claim 22, wherein
when a motion differencing method is a first value, differencing the local motion vector field and the global motion vector field comprises determining a first plurality of differences between the local motion vector field and the global motion vector field each as a first sum of absolute value differences x and y values of local and global motion vectors; and
when the motion differencing method is a second value, differencing the local motion vector field and the global motion vector field comprises determining a second plurality of differences between the local motion vector field and the global motion vector field each based on differences of local and global motion vectors in a polar coordinate domain.

24. The non-transitory machine readable medium of claim 22, wherein providing the regions mask corresponding to the video frame based on the global/local probability map comprises:
generating a binarization threshold;
applying the binarization threshold to the global/local probability map to generate a binary global/local probability map; and
mapping the binary global/local probability map to the regions mask.

25. The non-transitory machine readable medium of claim 22, the machine readable medium comprising further instructions that, in response to being executed on the device, cause the device to segment video frames into region-layers by:
determining a dominant color or a dominant motion for the second region layer, wherein the second region layer comprises a foreground or a background of the video frame; and
segmenting the second region layer based on the dominant color or the dominant motion into third and fourth region layers, wherein the regions mask indicates the pixels of the video frame are included in the first, third, or fourth region layer.

26. The non-transitory machine readable medium of claim 22, wherein the first region layer comprises a foreground of the video frame and the second region layer comprises a background of the video frame, the machine readable medium comprising further instructions that, in response to being executed on the device, cause the device to segment video frames into region-layers by:
segmenting the first region layer based on one of dominant color or dominant motion into third and fourth region layers; and
segmenting the second region layer based one of dominant color or dominant motion into fifth and sixth region layers, wherein the regions mask indicates the pixels of the video frame are included in the third, fourth, fifth, or sixth region layer.

* * * * *